(12) United States Patent
Rust et al.

(10) Patent No.: US 11,041,655 B2
(45) Date of Patent: Jun. 22, 2021

(54) AVIARY VENTILATION SYSTEM AND METHOD

(71) Applicant: Rose Acre Farms, Inc., Seymour, IN (US)

(72) Inventors: Marcus D. Rust, Remington, IN (US); Joseph M. Dart, West Lafayette, IN (US); David Hurd, Rensselaer, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 979 days.

(21) Appl. No.: 14/530,800

(22) Filed: Nov. 2, 2014

(65) Prior Publication Data
US 2015/0126105 A1    May 7, 2015

Related U.S. Application Data

(63) Continuation-in-part of application No. 14/217,548, filed on Mar. 18, 2014, now Pat. No. 9,538,731, and
(Continued)

(51) Int. Cl.
*F24F 7/007* (2006.01)
*F24F 13/00* (2006.01)
(Continued)

(52) U.S. Cl.
CPC .............. *F24F 13/00* (2013.01); *A01K 31/00* (2013.01); *Y10T 29/49826* (2015.01)

(58) Field of Classification Search
CPC .................................. F24F 13/00; A01K 31/00
See application file for complete search history.

(56) References Cited

U.S. PATENT DOCUMENTS

| 838,851 A | 12/1906 | Dropeskey |
| 1,500,081 A | 7/1924 | Knight |

(Continued)

FOREIGN PATENT DOCUMENTS

| BE | 787130 | 1/1972 |
| BE | 787130 | 1/1974 |

(Continued)

OTHER PUBLICATIONS

Definition of "Aviary," Oxford English Dictionary, Oxford University Press, 2020 (Year: 2020).*
(Continued)

*Primary Examiner* — Kenneth J Hansen
*Assistant Examiner* — Phillip Decker
(74) *Attorney, Agent, or Firm* — Ice Miller LLP

(57) ABSTRACT

The present embodiments provide a ventilation system for an aviary including at least one exterior wall disposed between a floor and a roof. The ventilation system includes a first fan disposed in one of the at least one exterior walls. A plenum is disposed on one of the at least one exterior walls. A second fan is disposed in flow communication with the plenum. The present embodiments also provide a method of constructing a ventilation system in an aviary, which aviary includes at least one exterior wall disposed between a floor and a roof, a first fan, a plenum, and a second fan. The method includes disposing the first fan in one of the at least one exterior walls. The method also includes disposing the plenum on one of the at least one exterior walls. The method also includes disposing the second fan in flow communication with the plenum.

8 Claims, 30 Drawing Sheets

Related U.S. Application Data a continuation-in-part of application No. 14/181,463, filed on Feb. 14, 2014, now Pat. No. 10,104,872, and a continuation-in-part of application No. 14/181,379, filed on Feb. 14, 2014, now Pat. No. 9,307,747, and a continuation-in-part of application No. 14/071,160, filed on Nov. 4, 2013, now Pat. No. 10,130,078.

(51) Int. Cl.
  *A01K 31/18* (2006.01)
  *A01K 31/00* (2006.01)

(56) References Cited

U.S. PATENT DOCUMENTS

| | | | |
|---|---|---|---|
| 1,632,367 A | | 6/1927 | Christiansen |
| 1,674,193 A | | 6/1928 | Coltrin |
| 1,755,520 A | | 4/1930 | Shoup |
| 1,876,325 A | | 9/1932 | Crawford |
| 1,949,085 A | | 2/1934 | Shallit |
| 2,096,356 A | | 10/1937 | Fox |
| 2,174,326 A | | 9/1939 | Leibenguth |
| 2,176,814 A | | 10/1939 | Hawkins |
| 2,257,734 A | | 10/1941 | Cornell |
| 2,457,818 A | * | 1/1949 | Helman ............... F24H 3/065 |
| | | | 126/110 AA |
| 2,565,521 A | | 8/1951 | Ratermann |
| 2,692,578 A | | 10/1954 | Manning |
| 2,695,006 A | | 11/1954 | Tellefson |
| 1,520,610 A | | 12/1954 | Stephens |
| 2,805,644 A | | 9/1957 | Lieberman |
| 2,882,857 A | | 4/1959 | Ernst et al. |
| 2,956,539 A | | 10/1960 | Boening |
| 2,970,567 A | | 2/1961 | Rubin |
| 2,997,021 A | * | 8/1961 | Bailey ..................... A01K 41/00 |
| | | | 119/311 |
| 3,000,290 A | * | 9/1961 | Rodick .................... F24F 7/08 |
| | | | 454/252 |
| 3,002,494 A | | 10/1961 | Murray |
| 3,046,940 A | | 7/1962 | Kurtz |
| 3,062,185 A | | 11/1962 | Kurtz |
| 3,119,375 A | | 1/1964 | Ernst |
| 3,124,101 A | | 3/1964 | Wierenga, Sr. |
| 3,124,102 A | | 3/1964 | Kurtz et al. |
| 3,134,358 A | | 5/1964 | Byrnes |
| 3,139,065 A | | 6/1964 | Willauer, Jr. |
| 3,164,129 A | | 1/1965 | Rigterink |
| 3,208,430 A | | 9/1965 | Ernst |
| 3,242,904 A | | 3/1966 | Rannou |
| 3,274,973 A | | 9/1966 | Woods et al. |
| 3,297,324 A | * | 1/1967 | Evans ..................... A01K 15/02 |
| | | | 273/397 |
| 3,312,194 A | | 4/1967 | Ernst |
| 3,319,606 A | | 5/1967 | Virgil |
| 3,339,528 A | | 9/1967 | Summerour |
| 3,355,037 A | | 11/1967 | Dodd |
| 3,396,702 A | * | 8/1968 | Trussell ............... A01K 31/005 |
| | | | 119/455 |
| 3,464,389 A | | 9/1969 | Seiderman |
| 3,485,214 A | | 12/1969 | Burkholder |
| 3,541,968 A | | 11/1970 | Van Huis |
| 3,552,359 A | | 1/1971 | Graves et al. |
| 3,581,709 A | | 6/1971 | Van Huis et al. |
| 3,618,734 A | | 11/1971 | Khan |
| 3,791,348 A | | 2/1974 | Marnett |
| 3,796,189 A | | 3/1974 | Blondeel |
| 3,867,903 A | | 2/1975 | Fleshman |
| 3,892,201 A | | 7/1975 | Crawford |
| 3,900,006 A | * | 8/1975 | Shockley, Jr. ......... A01K 31/005 |
| | | | 119/457 |
| 3,976,032 A | | 8/1976 | Ramser et al. |
| 3,978,819 A | | 9/1976 | Lovitt |
| 4,008,690 A | | 2/1977 | Van Huis |
| 4,011,837 A | | 3/1977 | Ksioszk |
| 4,020,793 A | | 5/1977 | Morrison |
| 4,023,531 A | | 5/1977 | Thompson |
| 4,134,545 A | * | 1/1979 | Westbrook ............... F24F 7/06 |
| | | | 237/53 |
| 4,141,320 A | | 2/1979 | Hatfield |
| 4,151,811 A | | 5/1979 | Truhan |
| 4,173,947 A | | 11/1979 | Whiteside |
| 4,188,911 A | | 2/1980 | Rafaely |
| 4,228,729 A | * | 10/1980 | Messick ................. E04D 13/17 |
| | | | 454/238 |
| 4,242,809 A | | 1/1981 | Elder |
| 4,249,461 A | | 2/1981 | Christenson |
| 4,250,837 A | | 2/1981 | Cocklereece |
| 4,315,481 A | | 2/1982 | Coile et al. |
| 4,321,887 A | | 3/1982 | Martin et al. |
| 4,379,439 A | | 4/1983 | Baur |
| 4,416,219 A | | 11/1983 | Dill |
| 4,430,960 A | | 2/1984 | Nagel et al. |
| 4,437,433 A | | 3/1984 | Nijhof |
| 4,462,334 A | * | 7/1984 | Kim ...................... A01K 31/00 |
| | | | 119/436 |
| 4,474,137 A | | 10/1984 | Walters |
| 4,480,588 A | | 11/1984 | Holladay et al. |
| 4,574,737 A | | 3/1986 | Bugeja |
| 4,653,430 A | | 3/1987 | Mass et al. |
| 4,766,849 A | | 8/1988 | Kawabata et al. |
| 4,841,909 A | | 6/1989 | Siciliano |
| 4,930,446 A | * | 6/1990 | Huisinga ............... A01K 1/0047 |
| | | | 119/448 |
| 4,936,257 A | | 6/1990 | Kuhlmann |
| 5,036,797 A | * | 8/1991 | Koozer ................ A01K 1/0058 |
| | | | 119/448 |
| 5,094,186 A | | 3/1992 | Andersen |
| 5,145,460 A | | 9/1992 | Smith |
| 5,174,242 A | | 12/1992 | Takeuchi |
| 5,279,254 A | | 1/1994 | Dowty |
| 5,413,068 A | | 5/1995 | Segal |
| 5,474,025 A | | 12/1995 | Lee |
| 5,477,810 A | * | 12/1995 | Wilkison, III ......... A01K 1/031 |
| | | | 119/459 |
| 5,492,082 A | | 2/1996 | Krevinghaus |
| 5,570,657 A | | 11/1996 | Kuhlmann |
| 5,596,949 A | | 1/1997 | Fanguy |
| 5,662,068 A | | 9/1997 | Childs |
| 5,666,905 A | * | 9/1997 | MacKin ............... A01K 1/0047 |
| | | | 119/448 |
| 5,713,302 A | | 2/1998 | Walter |
| 5,749,321 A | | 5/1998 | Ikuse |
| 5,827,118 A | * | 10/1998 | Johnson ................. F24F 3/161 |
| | | | 454/187 |
| 5,897,285 A | | 4/1999 | Wanderscheid |
| 5,924,383 A | | 7/1999 | Smith |
| 6,119,634 A | | 9/2000 | Myrick |
| 6,217,437 B1 | | 4/2001 | Murray |
| 6,234,114 B1 | | 5/2001 | Dyer |
| 6,286,456 B1 | | 9/2001 | Michaelis |
| 6,321,687 B1 | * | 11/2001 | Lemmon ............. A01K 1/0047 |
| | | | 119/448 |
| 6,394,031 B1 | | 5/2002 | Moller |
| 6,412,439 B1 | | 7/2002 | Otto-Lubker et al. |
| 6,598,562 B1 | | 7/2003 | Dutkiewicz et al. |
| 6,637,374 B2 | | 10/2003 | Hawks |
| 6,688,835 B1 | | 2/2004 | Buher |
| 6,691,645 B1 | | 2/2004 | Ayers |
| 6,810,833 B2 | | 11/2004 | Bonner |
| 6,883,464 B2 | | 4/2005 | Kirch |
| 6,968,807 B2 | | 11/2005 | Kuhlmann |
| 7,011,045 B1 | | 3/2006 | Zehner |
| 7,036,457 B2 | | 5/2006 | Uchiyama |
| 7,320,294 B2 | | 1/2008 | Irwin |
| 7,350,364 B2 | | 4/2008 | Meerpohl |
| 7,467,602 B2 | | 12/2008 | Yoshida |
| 7,818,894 B2 | | 10/2010 | Noyes et al. |
| 7,827,938 B2 | | 11/2010 | Kuehlmann |
| 8,117,994 B1 | | 2/2012 | Goodlow |
| 8,132,535 B2 | * | 3/2012 | Correa ................. A01K 1/0029 |
| | | | 119/437 |
| 8,205,577 B2 | | 6/2012 | Sia |
| 8,312,846 B1 | | 11/2012 | Murray |

(56) References Cited

U.S. PATENT DOCUMENTS

| | | |
|---|---|---|
| 8,651,053 B2 | 2/2014 | Reid |
| 8,776,727 B1 | 7/2014 | Nelligan |
| 8,991,123 B2* | 3/2015 | Micka .................. E04H 5/08 52/302.1 |
| 9,347,451 B2* | 5/2016 | Priest .................. A01K 1/0047 |
| 10,130,078 B2 | 11/2018 | Rust et al. |
| 10,375,935 B2 | 8/2019 | Rust et al. |
| 2004/0144326 A1 | 7/2004 | Smith |
| 2004/0144329 A1 | 7/2004 | Kuhlmann |
| 2005/0115522 A1 | 6/2005 | Bishop |
| 2008/0173250 A1 | 7/2008 | Dowty |
| 2008/0302312 A1 | 12/2008 | Steffey |
| 2009/0084323 A1 | 4/2009 | Tsubai |
| 2009/0300860 A1 | 12/2009 | Campbell |
| 2011/0061601 A1* | 3/2011 | Correa ................. A01K 1/0029 119/437 |
| 2012/0055414 A1* | 3/2012 | Correa ................. A01K 1/0029 119/448 |
| 2015/0122190 A1 | 5/2015 | Rust et al. |
| 2015/0122191 A1 | 5/2015 | Rust et al. |
| 2015/0122192 A1 | 5/2015 | Rust et al. |
| 2015/0122193 A1 | 5/2015 | Rust et al. |
| 2015/0122195 A1 | 5/2015 | Rust et al. |
| 2015/0126105 A1 | 5/2015 | Rust et al. |
| 2015/0230432 A1 | 8/2015 | Rust et al. |
| 2015/0230433 A1 | 8/2015 | Dart |
| 2016/0227726 A1* | 8/2016 | Priest .................. A01K 1/0047 |
| 2018/0007869 A1* | 1/2018 | Rust ................... A01K 1/0058 |

FOREIGN PATENT DOCUMENTS

| | | | |
|---|---|---|---|
| CH | 662244 A5 | 9/1987 | |
| DE | 1947908 | 6/1971 | |
| DE | 1947908 A1 * | 6/1971 | |
| DE | 20317631 | 3/2004 | |
| DE | 20317631 U1 | 4/2004 | |
| EP | 0904690 A1 | 3/1999 | |
| EP | 1477057 A1 | 11/2004 | |
| EP | 3209121 | 10/2014 | |
| EP | 3209121 B1 | 10/2014 | |
| EP | 2 878 195 A2 | 6/2015 | |
| FR | 2628191 A1 * | 9/1989 | ............. A01K 31/00 |
| GB | 289033 | 7/1928 | |
| GB | 591306 A | 8/1947 | |
| GB | 631222 | 10/1949 | |
| GB | 653190 | 5/1951 | |
| GB | 735476 | 8/1955 | |
| JP | 8172965 | 7/1996 | |
| JP | 8172966 | 7/1996 | |
| NL | 2000735 | 1/2009 | |
| WO | 2016062701 A1 | 4/2016 | |
| WO | WO 2016/062701 A1 | 4/2016 | |

OTHER PUBLICATIONS

"Het etagesysteem voor leghennen; Ontwikkeling en toetsing van een volieresysteem voor leghennen" (1980-1987), Dec. 1, 1987 (Dec. 1, 1987), XP055195185, Netherlands.

"Tiered Floor System for Laying Hens-development and testing of a henhouse system for laying hens" (1980-1987), Dec. 1, 1987 (Dec. 1, 1987) XP055195185, Netherlands, English translation.
(EP141911765.8) European Patent Office, European Search Report, dated Jul. 1, 2015.
(EP141911765.8) European Patent Office, Written Opinion of the European Search Report, dated Jul. 1, 2015.
"Massive Investment in Scottish Barn Egg Production" The Poultry Site (Feb. 20, 2014).
"Ein 2-Etagen-Lautstall Für Leghennen" Karl-Ludwig Borchert, Braunschweig-Völkenrode (1985), XP002065271.
"A 2-tier coop for laying hens" Karl-Ludwig Borchert, Braunschweig-Völkenrode (1985), XP002065271, English Translation.
"Alternatieve huisvesting voor leghennen" Ing. A. Cappon, C. ter Beek, W.F. Frederiks, and ir. J.A.M. Voermans (Jun. 1986), XP55194182.
"Alternative housing for laying hens" Ing. A. Cappon, C. ter Beek, W.F. Frederiks, and ir. J.A.M. Voermans (Jun. 1986), XP55194182, English Translation.
Big Dutchman, Natura60 & Natura70 The Modern aviaries for barn and free range egg productions, product brochure, Mar. 2010.
Agricultural Mfg. & Textiles, Inc., FingerBelt Laced With Fingers, Internet article, May 16, 2006, Agricultural Mfg. & Textiles, Inc.
Big Dutchman, The Modern Aviary for Layers in Floor Management, Internet article, Sep. 12, 2012-Aug. 13, 2013.
Big Dutchman, Natura70: Flexible, efficient and profitable, Internet article, Sep. 12, 2012-Aug. 13, 2013.
Big Dutchman, Group Laying Nest for Optimum Egg Quality, Internet article, Sep. 12, 2012-Aug. 13, 2013.
Poultry Times. Net, CSES Research Examines Worker Health, Internet newspaper article, Oct. 4, 2013.
Th.G.C.M. Fiks—Van Niekerk, B.F.J. Reuvekamp, R.A. Van Emous, M.A.W. Ruis, "Praktijk Rapport Pluimvee 6, Systeem van de toekomst voor leghennen", Praktijkonderzoek Veehouderij, Wageningen UR, Mar. 2003, Lelystad.
Th.G.C.M. Fiks—Van Niekerk, B.F.J. Reuvekamp, R.A. Van Emous, M.A.W. Ruis, "Research Report Poultry 6, System of the Future for Laying Hens", Institute for Animal Husbandry, Wageningen UR, Mar. 2003, Lelystad, English Translation.
First Examination Report, Systems and Methods for an Aviary, IP No. 701660, New Zealand Intellectual Property Office, dated Oct. 14, 2016.
(EP17824682.3) European Patent Office, Written Opinion of the European Search Report, dated. Mar. 3, 2020.
Big Dutchman, Natura—Rearing the modern multi-level system for pullet rearing. Feb. 2005.
Big Dutchman, The Modem Aviary for Layers in Floor Management, Internet article. Aug. 13, 2013.
Big Dutchman, Natura, The Modern System for Rearing of Healthy Pullets, Internet Article. Jun. 21, 2016.
Big Dutchman, Natura Sunrise, Multi-tier cage-free floor system for those who require cage-free and organic certification, Internet Article. Jun. 21, 2016.
(EP14191765.8) European Patent Office, Written Opinion of the European Search Report, dated Jun. 23, 2015.
Big Dutchman, Natura 60, Select access multi tier aviary for barn an free range egg production, Internet Article. Jul. 2017.
Big Dutchman, Natura—Rearing the modem multi-level system for pullet rearing. Feb. 2005.

* cited by examiner

AVIARY VENTILATION SYSTEM AND METHOD

CROSS-REFERENCE TO RELATED APPLICATIONS

The present application claims priority to and is a continuation in part of U.S. patent application Ser. No. 14/071,160, filed Nov. 4, 2013, and having the title "AVIARY CAGE WITH EGG AND MANURE REMOVAL SYSTEM AND METHOD FOR CONSTRUCTING THE SAME," U.S. patent application Ser. No. 14/181,379, filed Feb. 14, 2014, and having the title "AVIARY CAGE," U.S. patent application Ser. No. 14/181,463, filed Feb. 14, 2014, and having the title "CAGE-FREE AVIARY," U.S. patent application Ser. No. 14/217,548, filed Mar. 18, 2014, and having the title "AVIARY CAGE WITH MANURE REMOVAL SYSTEM AND METHOD FOR CONSTRUCTING THE SAME," each of which is herein incorporated by reference in its entirety.

TECHNICAL FIELD OF THE DISCLOSED EMBODIMENTS

The embodiments herein generally relate to aviaries and, more particularly, to an aviary ventilation system and method.

BACKGROUND OF THE DISCLOSED EMBODIMENTS

Generally, aviaries include at least one fan to circulate air within the aviary. Often a vent is positioned at a front of the aviary to permit air to enter the aviary. A fan may be positioned at a back of the aviary to draw the air through the aviary. This form of aviary ventilation is referred to as tunnel ventilation. The air drawn through the aviary cools the aviary, assists in the drying of manure in the aviary, and removes harmful gases. Therefore, depending on the season, tunnel ventilation can be advantageous (when the weather is warm) or disadvantageous (when the air outside is cooler than is healthy for the birds in the aviary).

Unfortunately, tunnel ventilation is not recommended for use during cooler months. If cold air is drawn into the aviary and directly contacts hens, the hens become stressed. Stressed hens tend to cluster together for warmth, and this can result in dangerous conditions due to overcrowding. If tunnel ventilation is not operating and the aviary is sealed to outside airflow, gases dangerous to poultry health such as ammonia can build up and create additional stress for the birds.

A need remains for a ventilation system that can be used in cooler months without stressing poultry in the aviary. A need also remains for a ventilation system that facilitates airflow in an aviary by efficiently circulating warm air through the aviary to reduce hot spots and cold spots while also improving manure drying in the aviary.

SUMMARY OF THE DISCLOSED EMBODIMENTS

In an embodiment, a ventilation system for an aviary including at least one exterior wall disposed between a floor and a roof is provided. The ventilation system includes a first fan disposed in one of the at least one exterior walls. A plenum is disposed on one of the at least one exterior walls. A second fan is disposed in flow communication with the plenum.

In an embodiment, a method of constructing a ventilation system in an aviary is provided, which aviary includes at least one exterior wall disposed between a floor and a roof, a first fan, a plenum, and a second fan. The method includes disposing the first fan in one of the at least one exterior walls. The method also includes disposing the plenum on one of the at least one exterior walls. The method also includes disposing the second fan in flow communication with the plenum.

In an embodiment, a method of operating a ventilation system in an aviary is provided, wherein the aviary includes a first fan, a second fan, a back wall, a front wall, a plenum having a top opening and a bottom opening, and a cage tower having a grate, a belt, and a scratching floor. The method includes disposing the first fan in a back wall. The method also includes disposing the second fan in flow communication with the plenum. The method also includes drawing air from the top opening of the plenum to the bottom opening of the plenum through the second fan. The method also include discharging the air toward the front wall. The method also includes at least one of drawing the air back through the second fan through the plenum and discharging the air from the aviary through the first fan.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
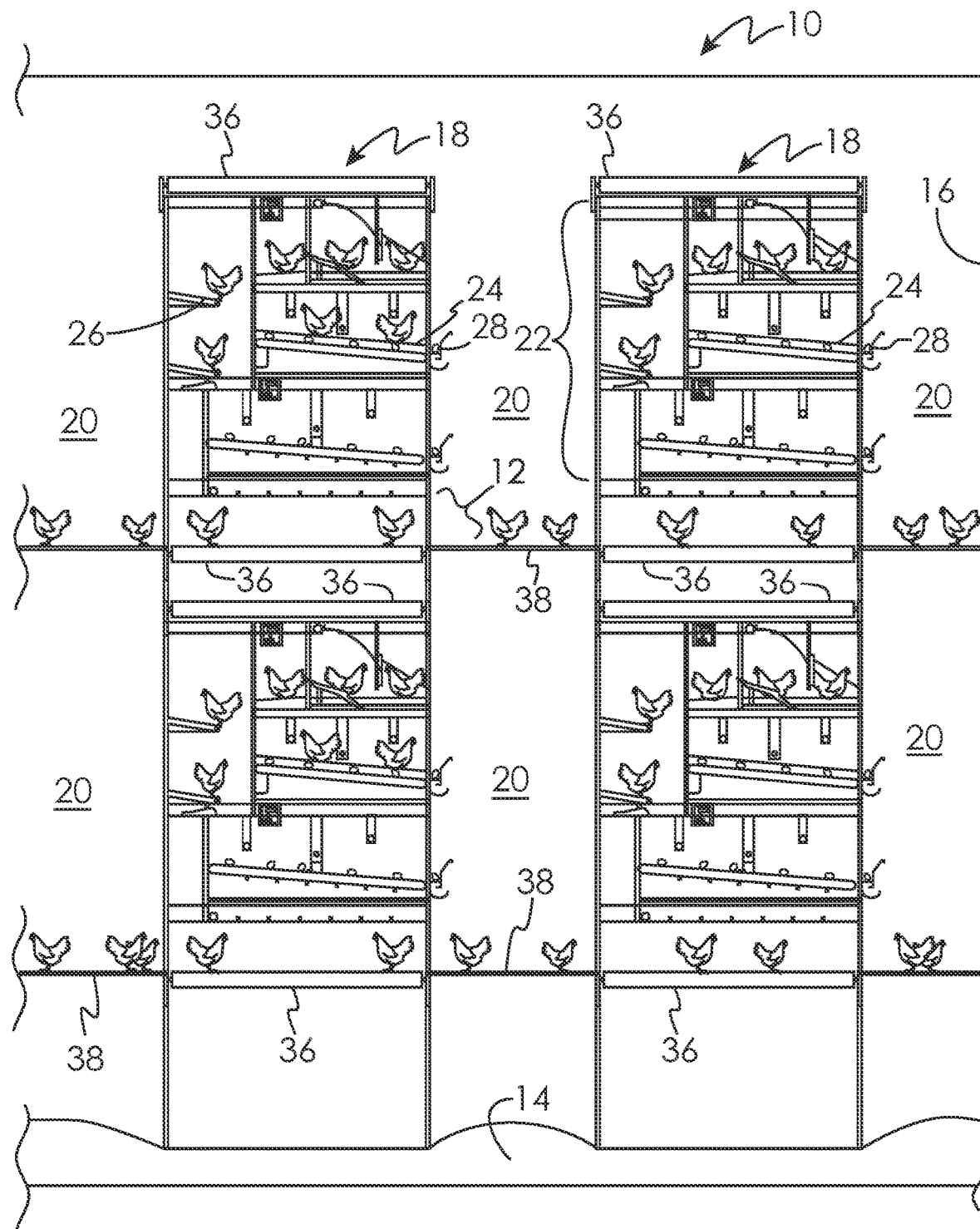
FIG. 1 is a front view of an aviary cage formed in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present embodiments provide aviaries having open space that may include a floor serving as a pecking area where hens can move freely, peck the floor with their beaks, and scratch the floor with their feet. By permitting space for the hens to move freely, the aviary cages of the present embodiments satisfy the requirements to be considered "cage free" birds. See http://en.wikipedia.org/wiki/Cage-free. In other words, the hens are not continuously confined to a caged area. The present embodiments allow the removal of freshly laid eggs, which eggs may be sold under the label "cage free" because they were laid outside of a nest box environment. The present embodiments also prevent eggs from becoming contaminated due to slow retrieval thereof from the scratching areas or cage floors (during which time the eggs could be infiltrated by bacteria).

Some embodiments include at least one belt extending through the cage tower below the nesting area to remove a deposit from at least part of the cage tower. A deposit may include, but is not limited to, one or more items such as manure, an egg, litter, feathers, feed, or a dead bird. In one embodiment, the belt extends through the cage tower along the length of the cage tower. In one embodiment, the belt extends approximately 400 feet along the length of the cage tower. In one embodiment, the belt carries manure from the cage tower to a collection area (not shown) positioned outside of the cage tower. By removing deposits, particularly manure, from at least part of the cage tower, ammonia levels within the aviary are significantly reduced. Additionally, the need for an individual to enter the cage and clean the cage by hand is greatly reduced. Accordingly, the present embodiments permit one person to care for 150,000 to 200,000 birds, compared with the 3-5 people per 150,000 to 200,000 birds required when known cages and aviaries are used. The present embodiments also eliminate the requirement for extreme body positions, including squatting for extended periods of time and crawling and lying on the floor while loading and unloading the cage and while gathering eggs from the cage. The present embodiments further reduce potential respiratory hazards and infection hazards to the workers. If a hen lays an egg outside of the nesting area, the egg will be collected by the belt and carried to an egg collection area (not shown) positioned outside of the cage tower.

It should be noted that the various elements of each of the embodiments described below may be combined in any manner to form new embodiments of an aviary.

Figure 2:
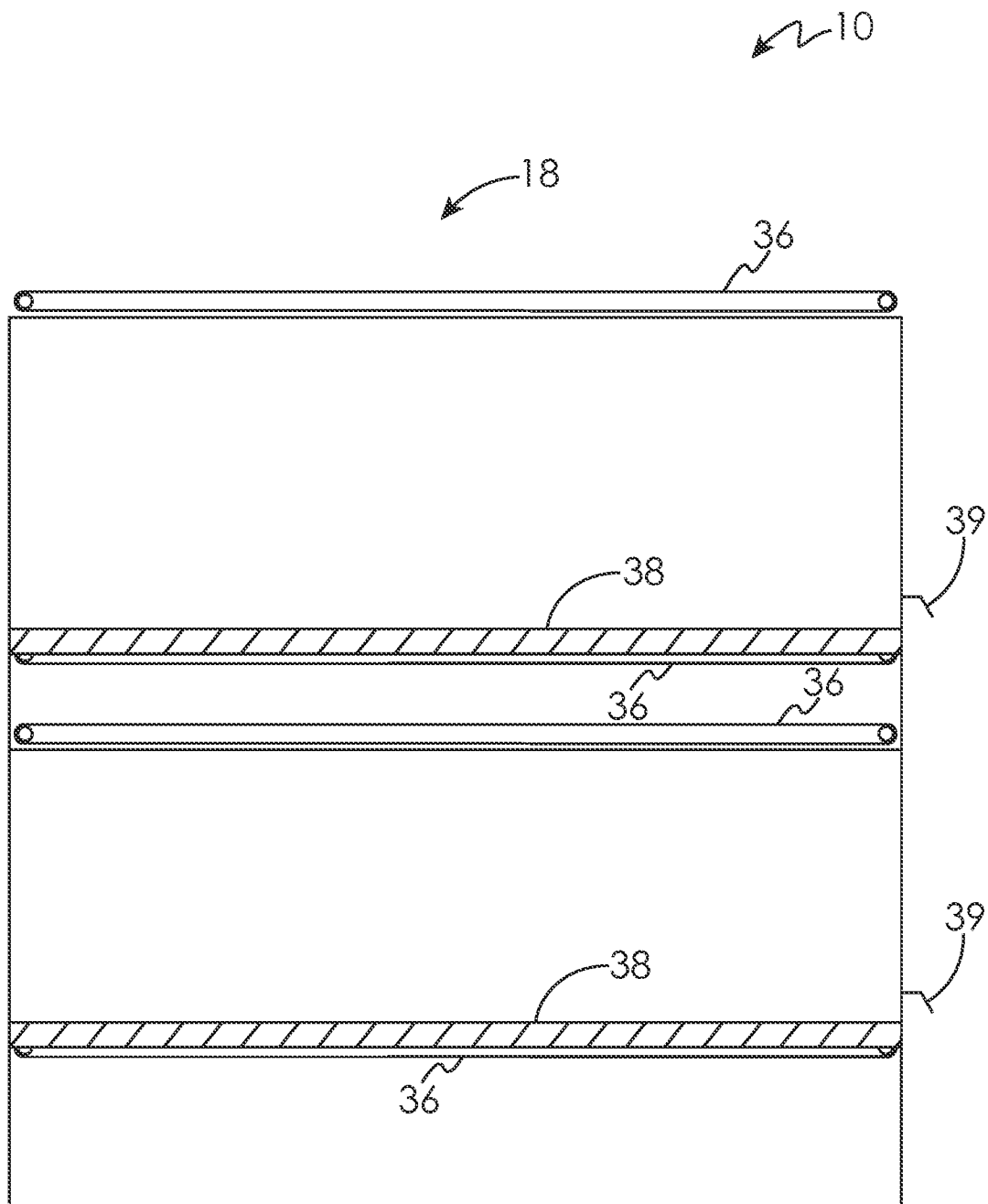
FIG. 2 is a side view of the aviary cage shown in FIG. 1 without the interior components of the cage towers.
Figure 3:
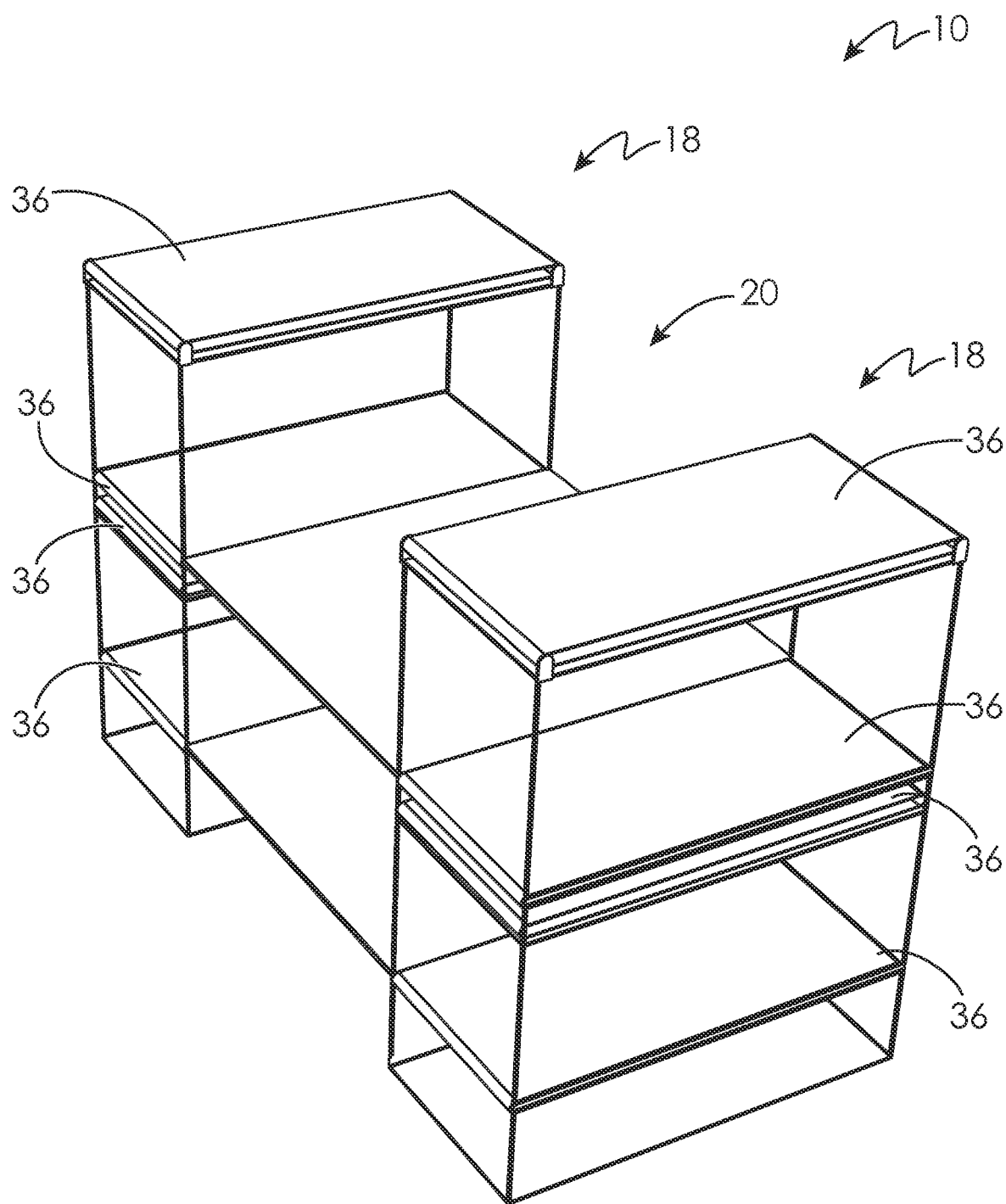
FIG. 3 is a top perspective view of the aviary cage shown in FIG. 1 without the interior components of the cage towers.

FIGS. 1-3 illustrate an aviary 10 configured with a manure removal system 12 according to one embodiment. The aviary 10 may include a concrete floor 14 enclosed by exterior walls 16. The exterior walls 16 enclose at least two cage towers 18 where hens may be caged. Although the present embodiment illustrates only two cage towers 18, it should be noted that the aviary 10 may be constructed with any number of cage towers 18, including a single cage tower 18. An open space 20 extends between the two cage towers 18 to provide an inspection area. In an embodiment having more than two cage towers 18, an open space 20 may extend between each adjacent cage tower 18. In an embodiment having a single cage tower 18, an open space 20 is present on at least one side of the cage tower 18. In an embodiment, open space 20 is positioned between the cage tower 18 and the respective exterior wall 16.

Each cage tower 18 includes at least one nesting area 22. The nesting area 22, as illustrated, may include various sloped nesting platforms 24 where a hen may sit to lay eggs. The nesting platforms 24 may be offset from sloped platforms 26 that allow the hens to move freely up and down the cage tower 18 to a desirable nesting area 22. As the hens lay their eggs, the eggs are collected in egg conveyors 28 that extend along the sides of the nesting platforms 24. The egg conveyors 28 carry the eggs from the nesting area 22 to a collection area.

In one embodiment, the belt 36 forms a floor of the cage tower 18. Accordingly, the birds are allowed to move freely and walk on the belt 36. In addition to collecting eggs and manure, the belt 36 may also remove dead birds from at least part of a cage tower 18. The illustrated embodiment includes a belt 36 positioned beneath each nesting area 22. In addition to the belts 36 positioned below the nesting area 22, a belt 36 is likewise positioned above each nesting area 22. The belts 36 above each nesting area 22 provide additional space for the hens to move freely. Deposits, which may include, but are not limited to, manure, eggs, litter, feathers, feed, or dead birds, within the aviary 10 are collected on the belts 36.

Figure 11:
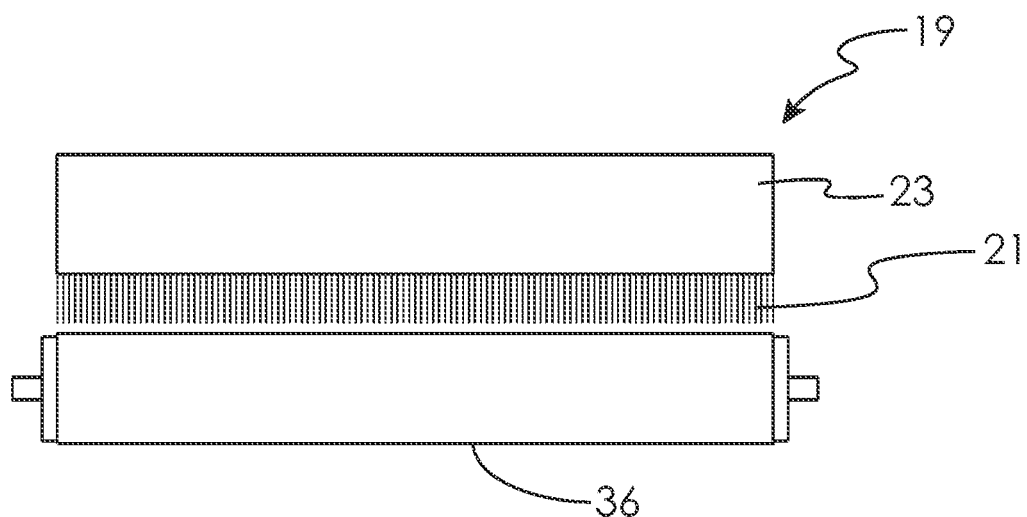
FIG. 11 is a front view of a gate formed in accordance with another embodiment.
Figure 12:
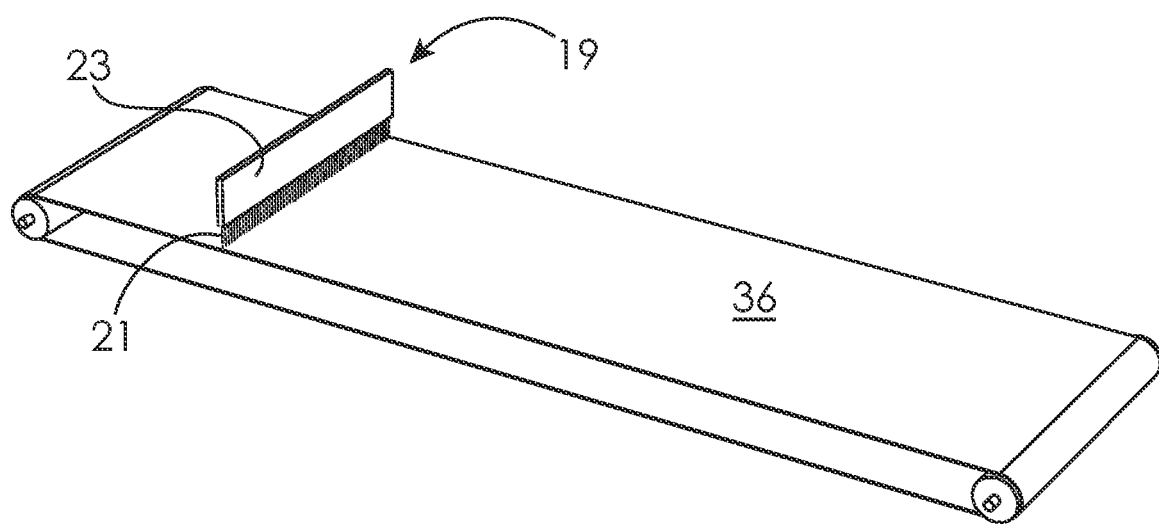
FIG. 12 is a side perspective view of the gate shown in FIG. 11.

In one embodiment, as illustrated in FIGS. 11 and 12, at least one gate 19 is positioned along each belt 36 to permit deposits on the belt 36 to pass thereunder and/or therethrough and to prevent birds from traveling beyond the gate. In the illustrated embodiment, the gate 19 includes plastic strips 21 extending downward from a solid partition 23. In the illustrated embodiment, the plastic strips 21 may be positioned approximately 1½ inches from the belt 36. If a deposit on the belt 36 in the illustrated embodiment is taller than the 1½ inch gap between the gate 19 and the belt 36, then the plastic strips 21 move when in contact with such a deposit to allow the deposit to pass therethrough. In an embodiment, the gate 19 may be positioned so that its lower edge is in contact with the belt 36. In an embodiment, the gate 19 may include plastic strips. In one embodiment, the gate 19 including plastic strips may be positioned so that the lower edges of the plastic strips are in contact with the belt 36. In an embodiment, the gate 19 may include a hinged door that moves to permit deposits larger than a gap between the hinged door and the belt 36 to pass thereunder. In an embodiment, the gate 19 may comprise one or more hinged doors to permit deposits larger than a gap between the hinged doors and the belt 36 to pass thereunder. In an embodiment, the gate 19 may comprise one or more swinging doors to permit deposits larger than a gap between the swinging doors and the belt 36 to pass thereunder. In an embodiment, an electric fence may be positioned on the gate 19 to prevent live birds from entering the gate 19. Alternately, an electric fence may be spaced apart from the gate 19 to prevent birds from reaching and entering the gate 19. In embodiments including at least one gate 19, birds are prevented from leaving a part of the aviary 10, while deposits are permitted to travel away from that part of the aviary 10.

In the illustrated embodiment, a scratching floor 38 extends from the cage tower 18. In some embodiments, the scratching floor is solid. In an embodiment having more than one cage tower 18, a scratching floor 38 may extend between any adjacent cage towers 18. Additionally, a scratching floor 38 may extend between the cage tower 18 and the respective exterior wall 16. In an embodiment having more than two cage towers 18, a scratching floor may extend from adjacent cage towers 18 but not be continuous between adjacent cage towers 18.

Figure 4:
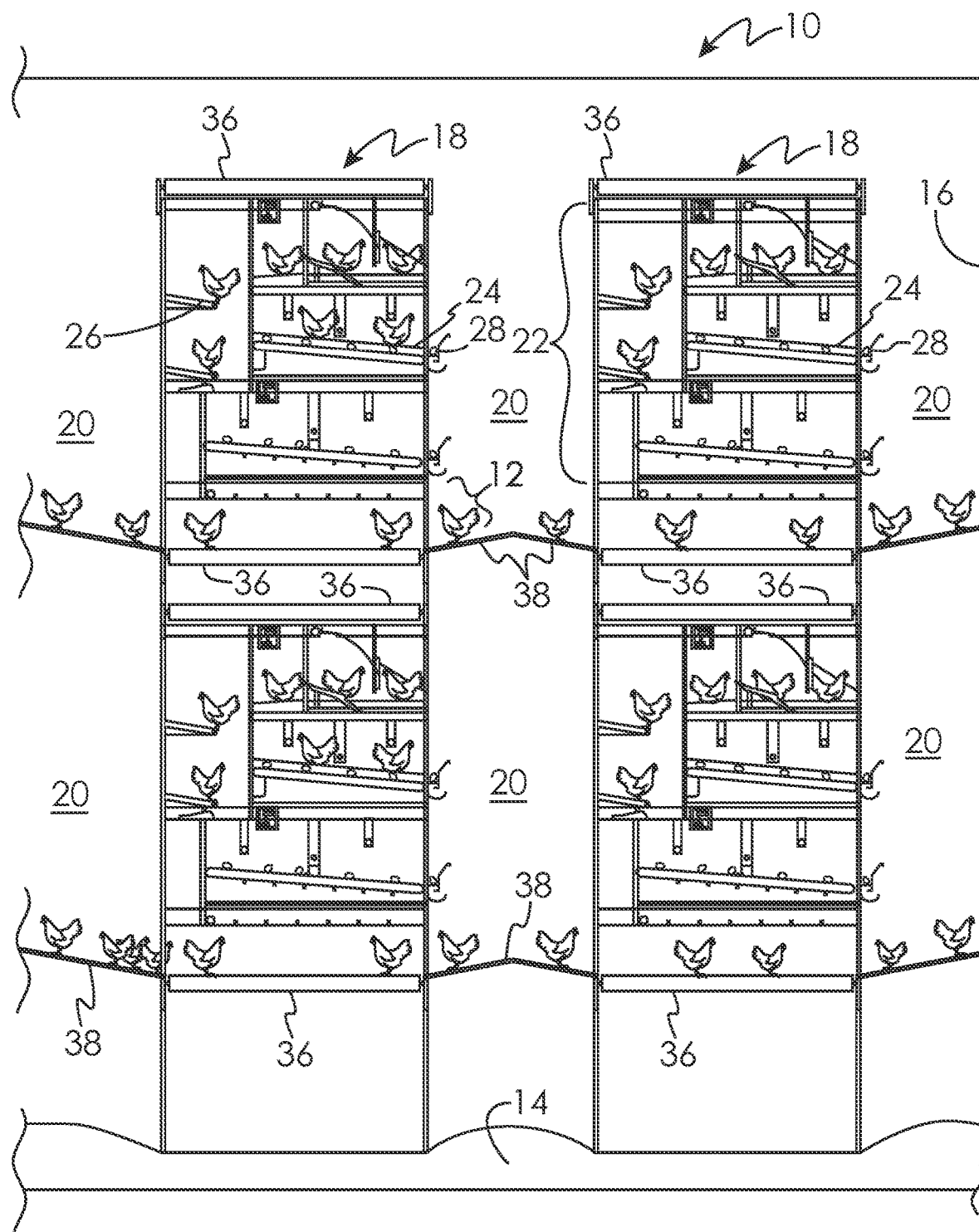
FIG. 4 is a front view of an aviary cage formed in accordance with another embodiment.
Figure 5:
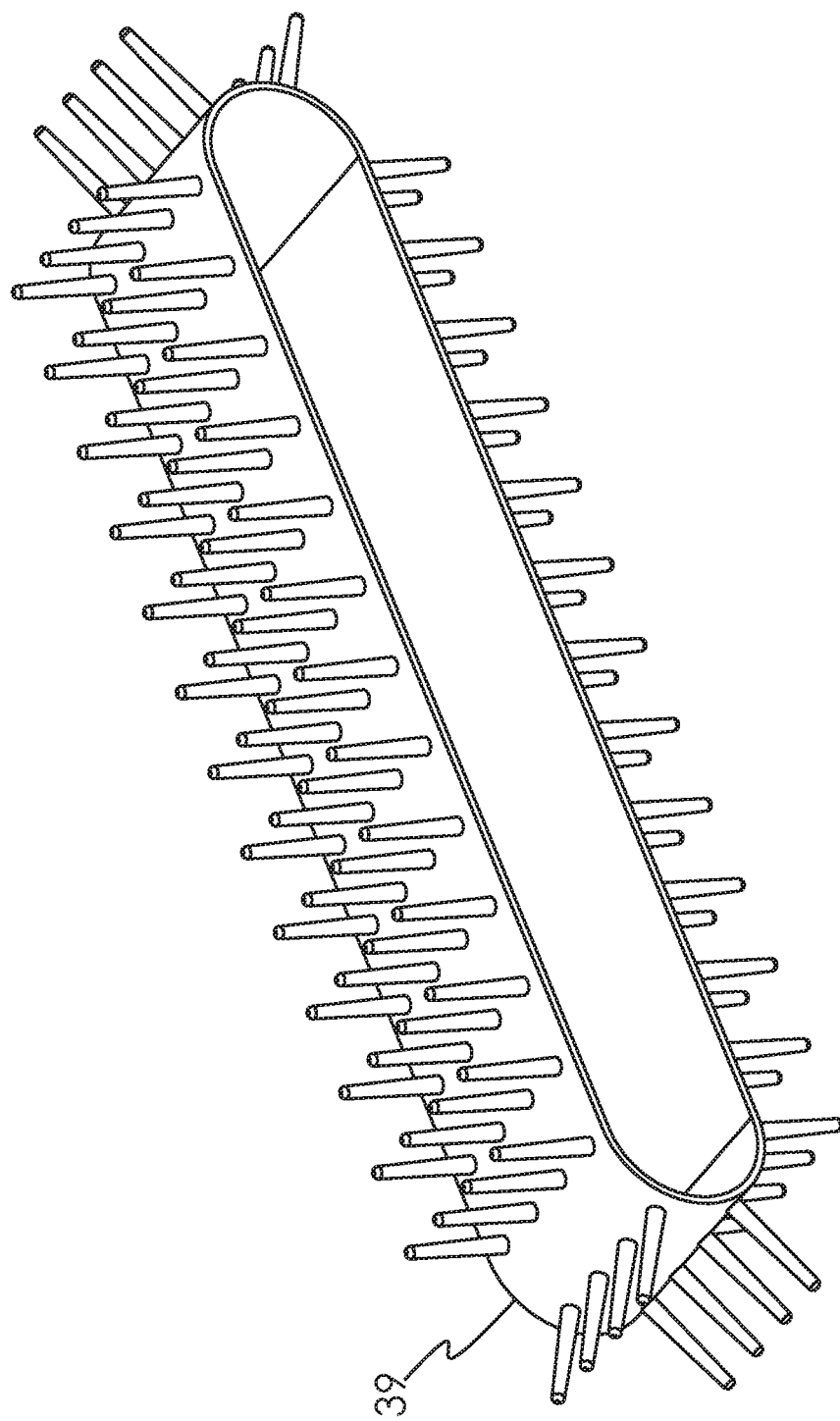
FIG. 5 is a side perspective view of a conventional egg finger belt.

The scratching floor 38 is oriented with respect to at least one belt 36. In one embodiment, the scratching floor 38 is planar with a belt 36 from which the scratching floor 38 extends. Alternatively, the scratching floor 38 is sloped to allow deposits to move back toward the belt 36, as shown in FIG. 4. The scratching floor 38 extends into the open space 20 of the aviary 10. The scratching floor 38 provides yet another pecking area for the hens to utilize while they are not nesting. In particular, the scratching floor 38 provides a scratching area for the birds within the aviary 10. When the birds scratch the scratching floor 38, they scratch much of the deposits made on the scratching floor 38 onto the respective belt 36. Accordingly, since it is common for birds to defecate in a scratching area, the scratching floor 38 becomes relatively self-cleaning as the hens scratch. The scratching floor 38 is configured so that the deposits are scratched back to the respective belt 36. Such configuration greatly reduces the amount of ammonia captured within the aviary 10 and also reduces the required frequency for cleaning of the aviary 10. Any eggs laid on the scratching floor 38 may be directed back toward the belt 36 by the scratching of the hens. These eggs are then collected on the belt 36 and removed from the belt 36. In one embodiment, the eggs are removed through the use of any conventional egg finger belt 39, shown in FIGS. 2 and 5, positioned at the end of the belt 36.

It should be noted that the cage tower 18 illustrated includes two nesting areas 22 positioned in a stacked configuration. Each nesting area 22 may have its own belt 36 extending therebelow. Each belt 36 may be joined to a corresponding belt 36 of the adjacent cage tower 18 by a scratching floor 38. As will be appreciated by one of skill in the art, the configuration of the nesting areas 22, belts 36, and scratching floor 38 can be unstacked to have just one level of nesting areas 22, belts 36, and a scratching floor 38 or can be repeated any number of times to create the desired number of levels in a stacked configuration within the aviary 10. As will also be appreciated by one of skill in the art, each level may contain multiple nesting areas 22 set adjacent each other to permit or prohibit, as desired, bird movement from one nesting area to another.

The present invention also provides a method of constructing an aviary 10 for deposit removal. The method includes positioning a belt 36 beneath a nesting area 22 to remove a deposit therefrom. In one embodiment, the belt 36 is configured to capture eggs laid outside of the nesting area 22. The method also includes extending a scratching floor 38 from the belt 36. In one embodiment, the scratching floor 38 is planar with the belt 36 from which the scratching floor 38 extends. In another embodiment, the scratching floor 38 is sloped toward the belt 36 to facilitate the movement of deposits, with or without the assistance of gravity, from the scratching floor 38 onto the belt 36. In one embodiment, the scratching floor 38 forms a scratching area for birds in the aviary 10. In one embodiment, the scratching area is configured for the birds to scratch manure on the scratching floor 38 onto the belt 36. In one embodiment, a belt 36 is also positioned along a top of the nesting area 22. In one embodiment, a belt 36 is also positioned along a floor 14 of the aviary 10.

In one embodiment, the method includes positioning at least two nesting areas 22 in a stacked configuration. The method also includes extending a belt 36 below each nesting area 22. The method also includes extending a scratching floor 38 from a belt 36 to a corresponding belt 36 of an adjacent nesting area 22.

In one embodiment, the method includes positioning at least two nesting areas 22 in a stacked configuration. The method also includes extending a belt 36 below each nesting area 22. The method also includes extending a scratching floor 38 from each belt 36, but not making the scratching floor 38 extending from a belt 36 of a first nesting area 22 continuous with a scratching floor 38 extending from a corresponding belt 36 of an adjacent nesting area 22.

Figure 6:
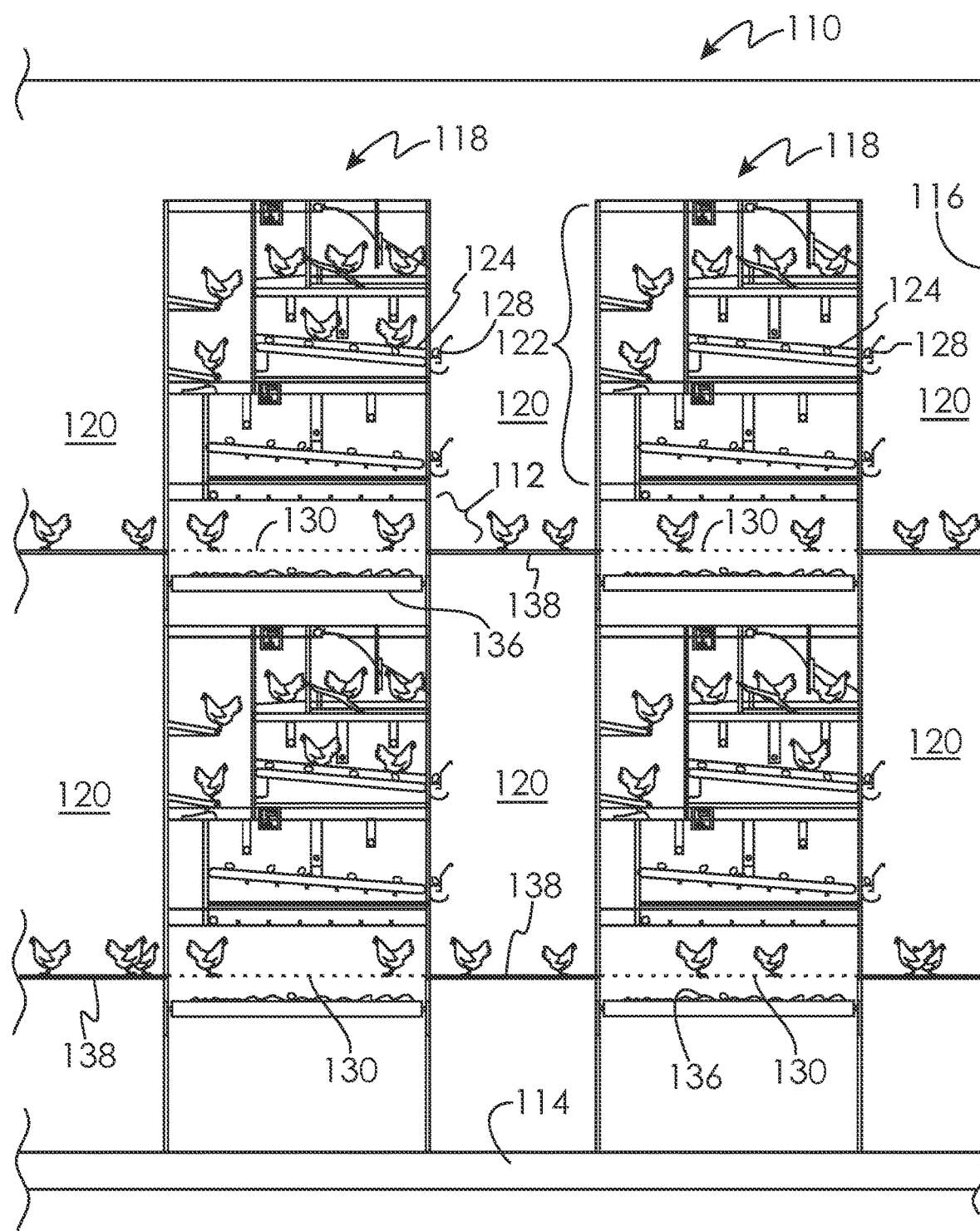
FIG. 6 is a front view of an aviary cage formed in accordance with another embodiment.
Figure 7:
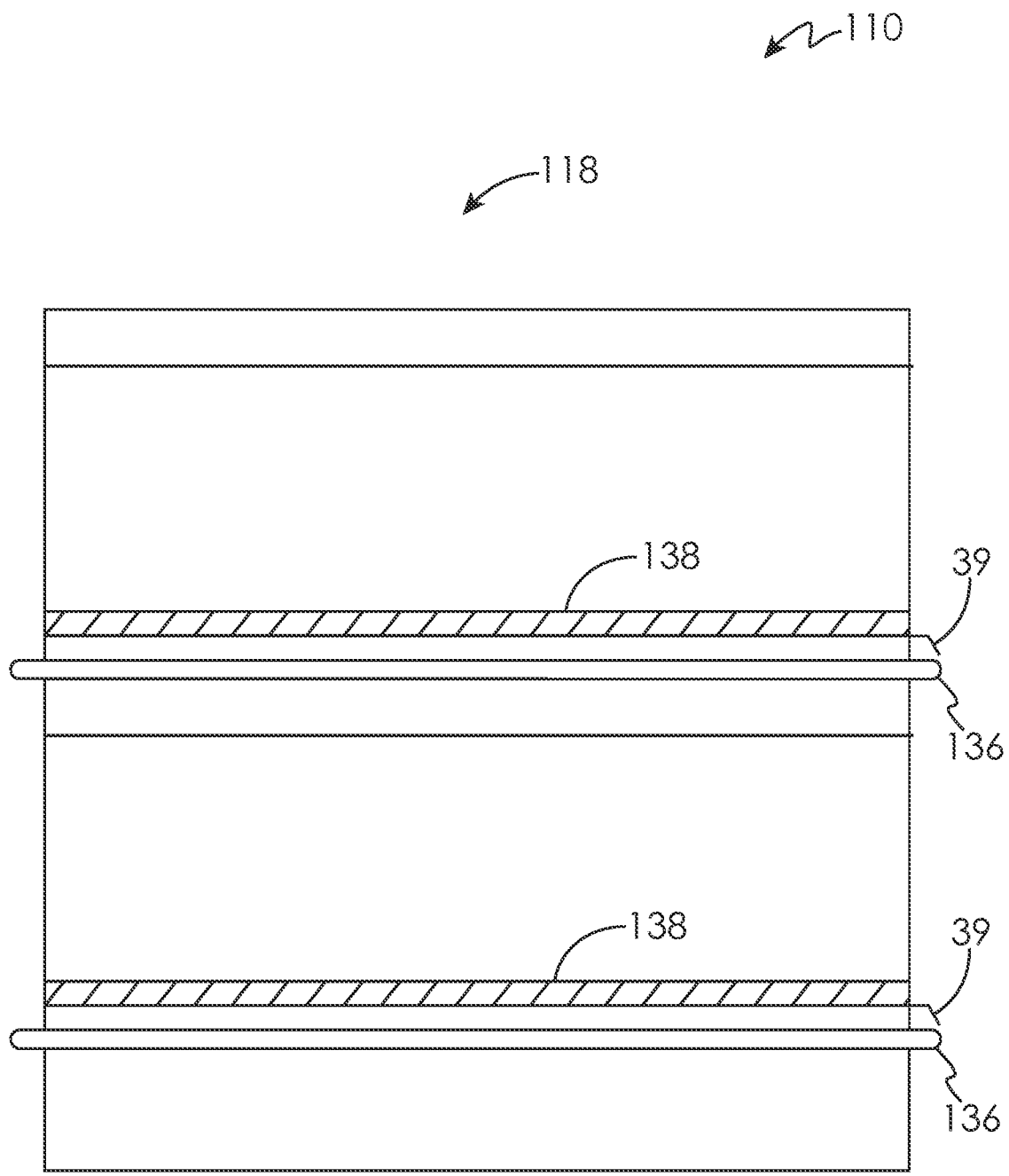
FIG. 7 is a side view of the aviary cage shown in FIG. 6 without the interior components of the cage towers.
Figure 8:
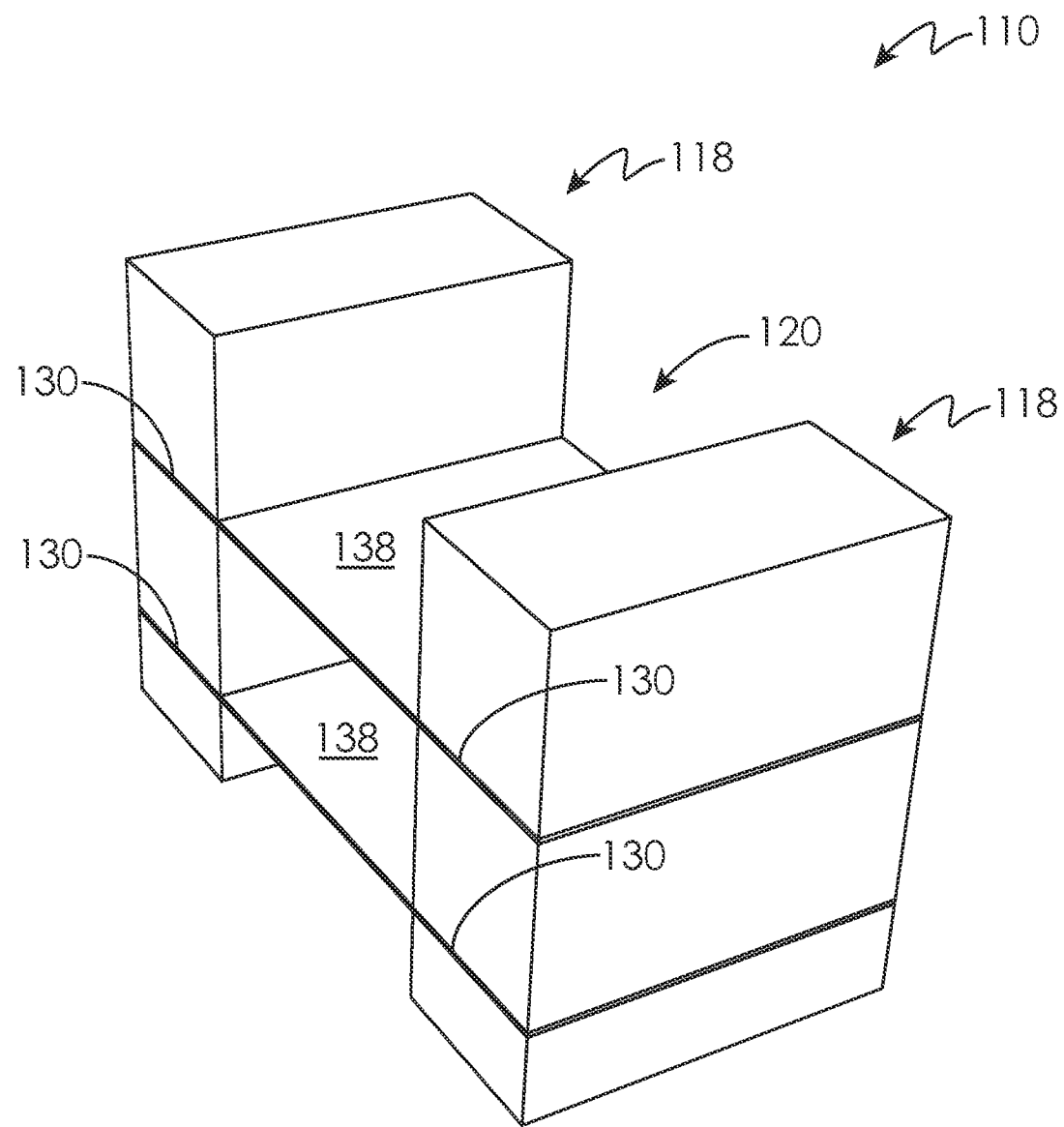
FIG. 8 is a top perspective view of the aviary cage shown in FIG. 6 without the interior components of the cage towers.

FIGS. 6-8 illustrate an aviary 110 configured with a manure removal system 112. The aviary 110 includes a concrete floor 114 enclosed by exterior walls 116. The exterior walls 116 enclose at least one cage tower 118 where hens are caged to lay eggs. Although the illustrated embodiment shows only two cage towers 118, it should be noted that the aviary 110 may be constructed with any number of cage towers 118, including a single cage tower 118. An open space 120 extends between the two cage towers 118. In an embodiment having more than two cage towers 118, an open space 120 extends between each adjacent cage tower 118. In an embodiment having a single cage tower 118, an open space 120 is present on at least one side of the cage tower 118. In an embodiment, open space 120 is likewise positioned between cage tower 118 and the respective exterior wall 116.

Each cage tower 118 includes at least one nesting area 122. The nesting area 122, as illustrated, may include various nesting platforms 124 where the hen may sit to lay eggs. The nesting platforms 124 allow the hens to move freely up and down the cage tower 118 to a desirable nesting area 122. As the hens lay their eggs, the eggs are collected in egg conveyors 128 that extend along the sides of the nesting platforms 124. The egg conveyors 128 carry the eggs from the nesting area 122 to an egg collection area (not shown).

Figure 9:
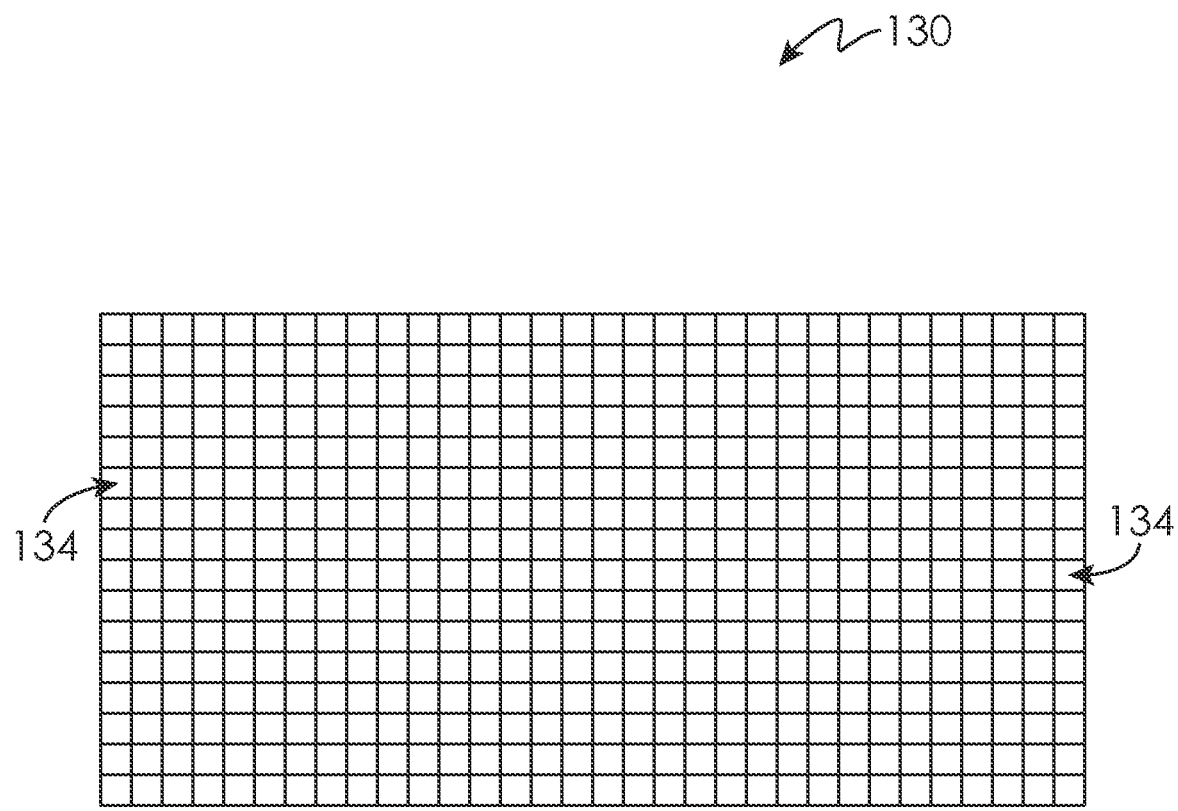
FIG. 9 is a top view of a mesh floor.

A mesh floor 130, as shown in FIG. 9, is positioned beneath each nesting area 122. In particular, the hens may leave the nesting area 122 and gather on the mesh floor 130. Like the open space 120, the mesh floor 130 provides an area for the hens to peck and scratch. The mesh floor 130 is formed from metal, plastic, or the like. The mesh floor 130 includes openings 134 therein that are sized to receive an egg therethrough, but are also spaced so as to support a hen. The openings 134 allow deposits such as, by way of example and not of limitation, manure, feed, litter, feathers, and eggs to pass therethrough.

A belt 136 extends below the mesh floor 130 to remove deposits that fall through openings 134 in the mesh floor 130. In one embodiment, the belt 136 extends substantially the length of the cage tower 118 and carries manure from the cage tower 118 to a collection area (not shown) positioned outside of the cage tower 118. Moreover, if a hen lays an egg outside of the nesting area 122 on the mesh floor 130, the egg is likewise collected by the belt 136 and carried to an egg collection area (not shown).

Figure 10:
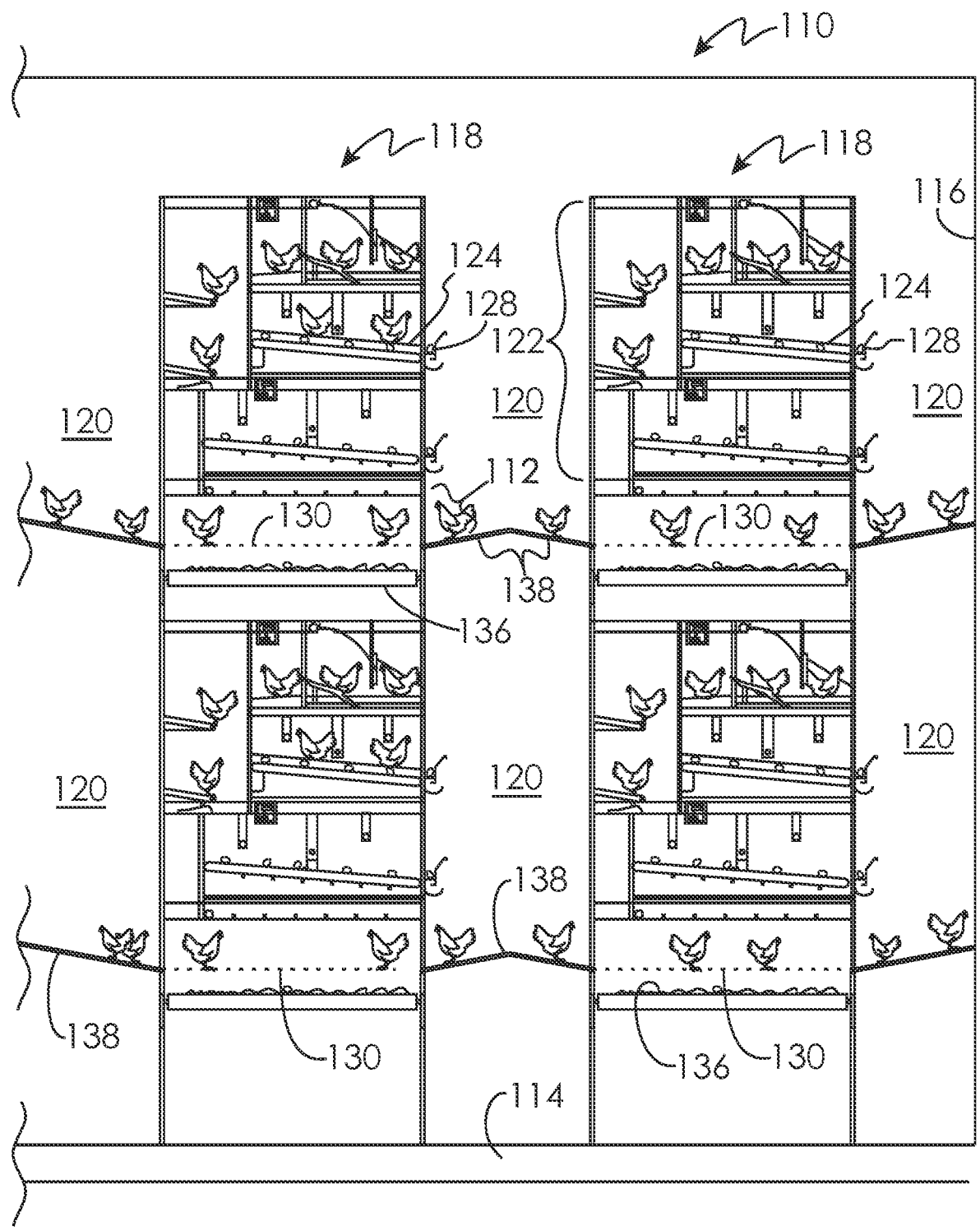
FIG. 10 is a front view of an aviary cage formed in accordance with another embodiment.

In the illustrated embodiment, a scratching floor 138 extends between the mesh floors 130 of the cage towers 118. In an embodiment having more than two cage towers 118, a scratching floor 138 may extend between any adjacent cage towers 118. In an embodiment having a single cage tower 118, a scratching floor 138 may extend from the cage tower 118. Additionally, a scratching floor 138 may extend between a cage tower 118 and an adjacent exterior wall 116. In one embodiment, the scratching floor 138 is planar with the mesh floors 130 between which the scratching floor 138 extends. Alternatively, the scratching floor 138 may be sloped toward the mesh floor 130, as illustrated in FIG. 10. The scratching floor 138 extends into the open space 120 of the aviary 110.

The scratching floor 138 provides yet another pecking area for the hens to utilize while they are not nesting. In particular, the scratching floor 138 provides a scratching area for the hens to scratch and peck within the aviary 110. When the birds scratch, they may scratch deposits on the scratching floor 138 through the mesh floor 130 and onto the belt 136. Accordingly, since it is common for birds to defecate in their scratching area, the scratching floor 138 becomes self-cleaning as the hens scratch. The scratching floor 138 is configured so that the deposits are scratched back to the mesh floor 130. Such configuration greatly reduces the amount of ammonia captured within the aviary 110 while also reducing the requirement for frequent cleaning of the aviary 110. Any eggs laid on the scratching floor 138 may be directed back toward the mesh floor 30 by the scratching of the hens. These eggs are then collected on the belt 136 and removed from the belt 136. In one embodiment, the eggs are removed through the use of any conventional egg finger belt 39, shown in FIGS. 5 and 7, positioned at the end of the belt 136.

It should be noted that the cage towers 118 illustrated each include at least two nesting areas 122 positioned in a stacked configuration. Each nesting area 122 has its own mesh floor 130 and belt 136 extending therebelow. Each mesh floor 130 is joined to a corresponding mesh floor 130 of the adjacent cage tower 118 by a scratching floor 138. As will be appreciated by one of skill in the art, the configuration of the nesting areas 122, mesh floors 130, belts 136, and scratching floors 138 can be repeated any number of times in a stacked configuration within the aviary 110. As well, a single belt 136 may underlie multiple nesting areas 122 in a single level in a cage tower 118.

The present invention also provides a method of constructing an aviary 110 to facilitate deposit removal. The method includes positioning a mesh floor 130 beneath a nesting area 122. The method also includes positioning a belt 136 below the mesh floor 130 to remove deposits that fall through openings 134 in the mesh floor 130. In one embodiment, the belt 136 is configured to capture eggs laid outside of the nesting area 122. The method also includes extending a scratching floor 138 from the mesh floor 130 to a mesh floor 130 of an adjacent nesting area 122. In one embodiment, the scratching floor 138 is planar with the mesh floors 130 between which the scratching floor 138 extends. Alternatively, the scratching floor 138 can be sloped toward the mesh floor 130. In one embodiment, the scratching floor 138 forms a scratching area for birds in the aviary 110. In one embodiment, the scratching area is configured for the birds to scratch deposits on the scratching floor 138 from the scratching floor 138 to the mesh floor 130 and through the mesh floor 130 to the belt 136.

Figure 13:
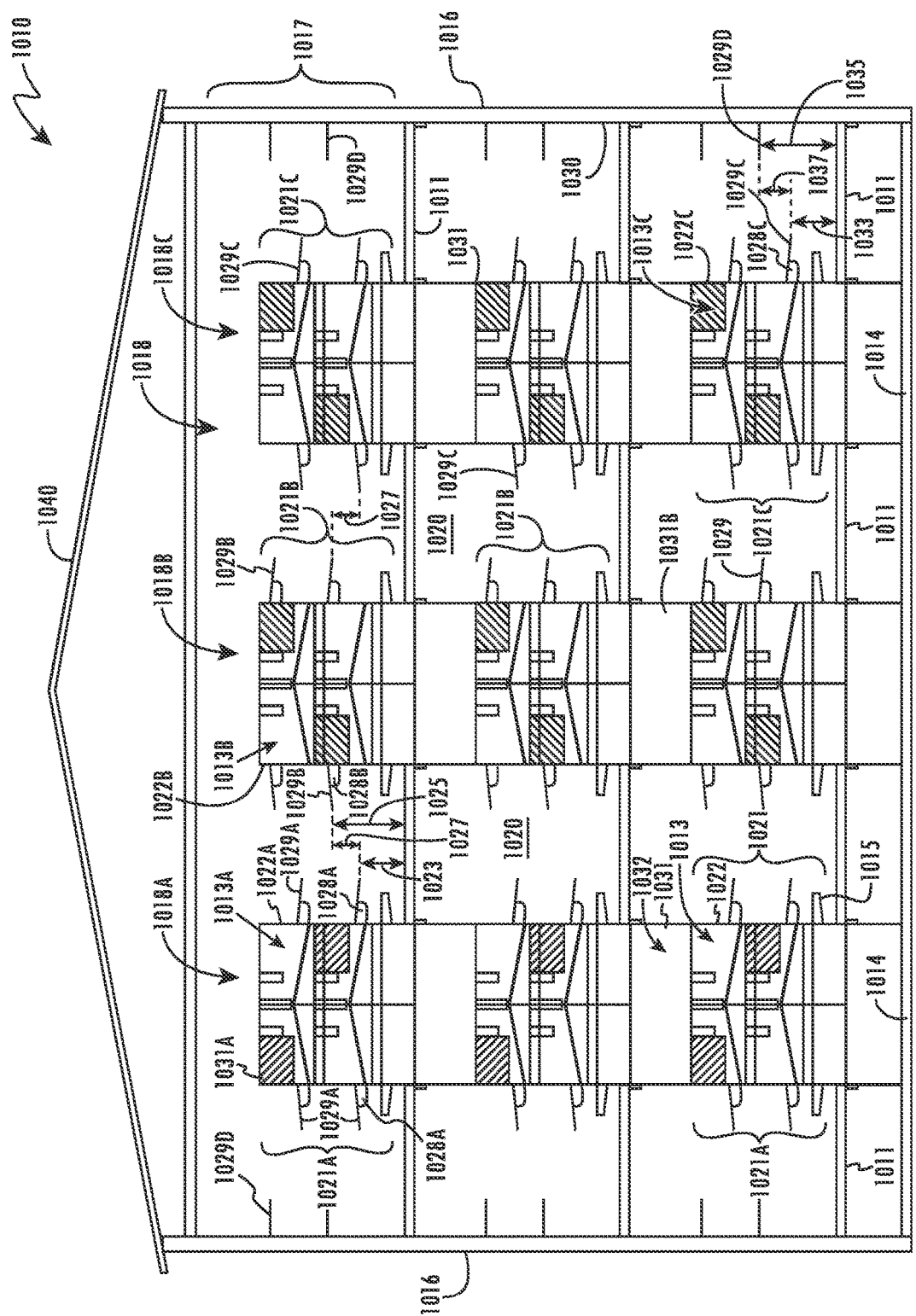
FIG. 13 is a front view of an aviary formed in accordance with another embodiment.

FIG. 13 illustrates an aviary 1010 having a floor 1014 and which is enclosed by exterior walls 1016 and a roof 1040. The exterior walls 1016 define an interior surface 1030. The exterior walls 1016 enclose at least one cage tower 1018 where hens may be caged. Although the illustrated embodiment includes three cage towers 1018, it should be noted that the aviary 1010 may be constructed with any number of cage towers 1018, including a single cage tower 1018. In an embodiment with multiple cage towers 1018, an aisle 1020 extends between each cage tower 1018 to provide an inspection area and space in which the birds housed in the aviary 1010 may move. In an embodiment having a single cage tower 1018, an aisle 1020 is present on at least one side of the cage tower 1018. In an embodiment, an aisle 1020 is positioned between a cage tower 1018 and the respective exterior wall 1016. At least one scratching floor 1011 extends between each at least one cage tower 1018. In an embodiment, at least one scratching floor 1011 is positioned between a cage tower 1018 and the respective exterior wall 1016.

Each at least one cage tower 1018 includes at least one aviary cage 1021. Each at least one aviary cage 1021 includes a first outside surface 1022 enclosing an inside area 1013. Each at least one cage tower 1018 includes an outside surface 1031 enclosing an inside area 1032. At least one bump rail 1015 extends from the outside surface 1031 and into the aisle 1020 to allow equipment to be maneuvered through the aisle 1020 without damaging the at least one cage tower 1018 or the at least one aviary cage 1021. The bump rail 1015 may be used by the birds as a perch.

Figure 14:
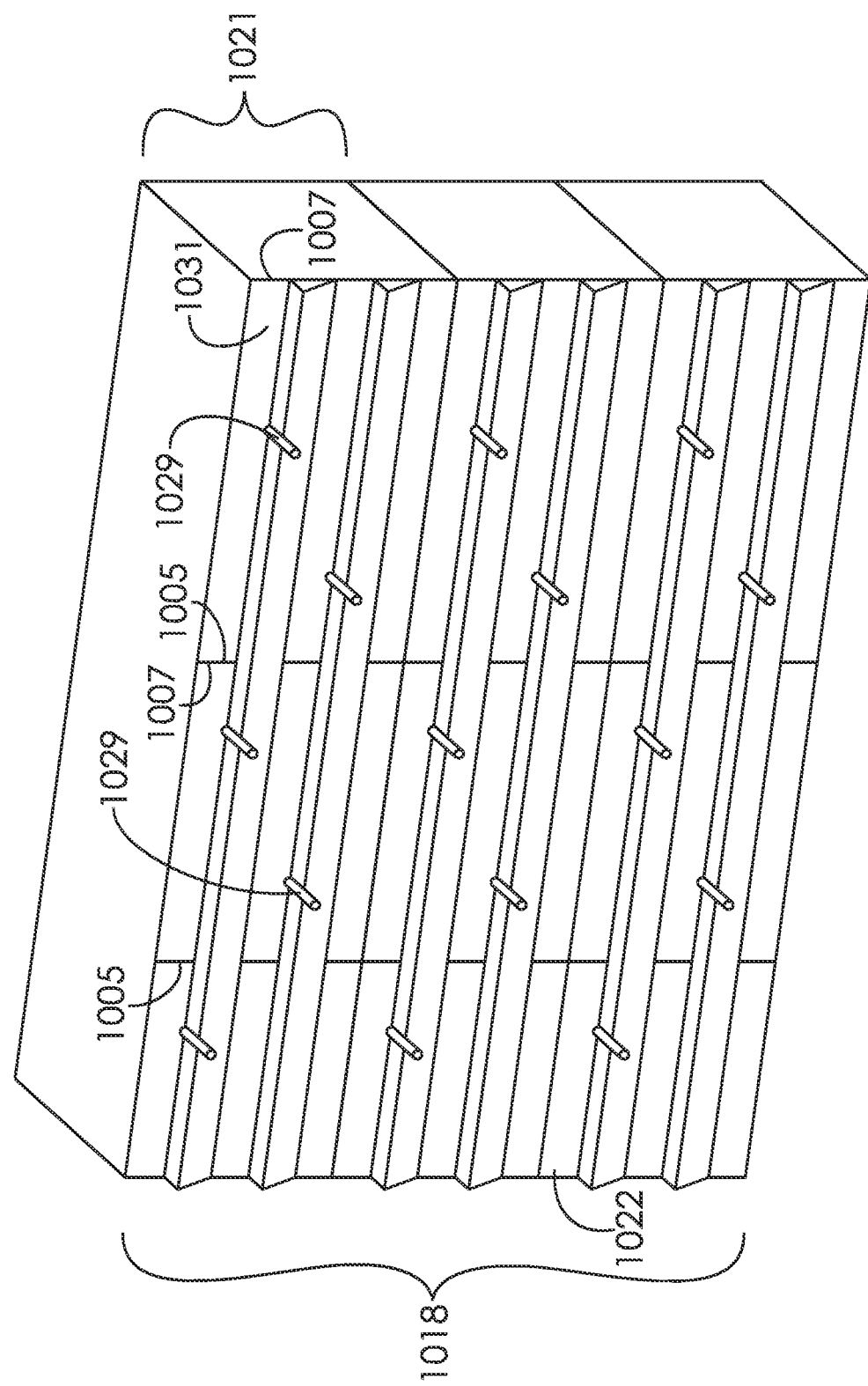
FIG. 14 illustrates a side view of a cage tower formed in accordance with another embodiment.

In an embodiment, the aviary 1010 includes at least two cage towers 1018A and 1018B. In an embodiment, a first cage tower 1018A includes a first aviary cage 1021A, and a second cage tower 1018B includes a second aviary cage 1021B, which second aviary cage 1021B is similar to the first aviary cage 1021A. In the illustrated embodiment, a third cage tower 1018C includes a third aviary cage 1021C, which third aviary cage 1021C is similar to the first aviary cage 1021A and the second aviary cage 1021B. In an embodiment, multiple first aviary cages 1021A are stacked on top of one another. In an embodiment, each aviary cage 1021 has a first end 1005 and a second end 1007. In an embodiment, a level in at least one cage tower 1018 is formed by placing at least two aviary cages 1021 in a row, with the first end 1005 of a first aviary cage 1021 adjacent the second end 1007 of a second aviary cage 1021, as shown in FIG. 14. In an embodiment, each first aviary cage 1021A has a first outside surface 1022A enclosing an inside area 1013A. In an embodiment, multiple second aviary cages 1021B are stacked on top of one another. In an embodiment, each second aviary cage 1021B includes an outside surface 1022B enclosing an inside area 1013B. In an embodiment, multiple third aviary cages 1021C are stacked on top of one another. In an embodiment, each third aviary cage 1021C includes an outside surface 1022C enclosing an inside area 1013C. The second aviary cage 1021B is positioned adjacent the first aviary cage 1021A and an aisle 1020 is formed therebetween. The second aviary cage 1021B is also positioned adjacent the third aviary cage 1021C and an aisle 1020 is formed therebetween.

In an embodiment, a scratching floor 1011 extends between at least one aviary cage 1021 and the interior surface 1030 of an adjacent exterior wall 1016. In an embodiment, a scratching floor 1011 extends between the first aviary cage 1021A and the second aviary cage 1021B. In an embodiment, a scratching floor 1011 extends between the second aviary cage 1021B and the third aviary cage 1021C. In an embodiment, a scratching floor 1011 extends from the outside surface 1031 of the cage tower 1018.

In an embodiment, the scratching floor 1011 is configured so that a worker can walk across the scratching floor 1011 between the cage towers 1018A and 1018B. In an embodiment, a scratching floor 1011 is configured so that a worker can walk between cage tower 1018A and the respective exterior wall 1016. In an embodiment, the scratching floor 1011 is configured so that a worker can walk across the scratching floor 1011 between the cage towers 1018C and 1018B. In an embodiment, a scratching floor 1011 is configured so that a worker can walk between cage tower 1018C and the respective exterior wall 1016. The scratching floor 1011 serves as a scratching area where hens can move freely, peck the floor with their beaks, and scratch the scratching floor 1011 with their feet. In one embodiment, the scratching floor 1011 is sloped (not shown) toward the respective aviary cage 1021 to allow deposits to move back toward the aviary cage 1021. In an embodiment including a belt positioned under each aviary cage 1021, the scratching floor 1011 is sloped toward the respective belt to allow deposits to move back toward the belt.

The first outside surface 1022 of the at least one aviary cage 1021 includes a first perch 1029 extending into the aisle 1020. In an embodiment, each perch 1029 may extend a portion of the length of the at least one cage tower 1018. In an embodiment, each perch 1029 may extend substantially the entire length of the at least one cage tower 1018. In an embodiment, the interior surface 1030 of the exterior wall 1016 includes a second perch 1029D extending into the aisle 1020. In an embodiment, each perch 1029D may extend a portion of the length of the interior surface 1030 of the exterior wall 1016 of the aviary 1010. In an embodiment, each perch 1029D may extend substantially the entire length of the interior surface 1030 of the exterior wall 1016.

In some embodiments, the perch 1029, 1029D is solid. In one embodiment, the perch 1029, 1029D may be square. In one embodiment, the perch 1029, 1029D may be round. In one embodiment, a square perch 1029, 1029D may have a width of ¾ inches to 2 inches. In one embodiment, a round perch 1029, 1029D may have a diameter of ¾ inches to 2 inches. The width or diameter of the perch 1029, 1029D is configured to allow a hen to stand on the perch 1029, 1029D.

Referring to an embodiment, a first perch 1029A extends from the first outside surface 1022A and is positioned above a first egg conveyor 1028A that extends from the first outside surface 1022A and that extends substantially the length of the first cage tower 1018A. When hens lay their eggs, the eggs may be collected in the first egg conveyor 1028A. The first egg conveyor 1028A carries the eggs from the aviary cage 1021A to a collection area. The first perch 1029A extends into the aisle 1020 at a first vertical distance 1023 from the scratching floor 1011. A second perch 1029B extends from the second outside surface 1022B and is positioned above a second egg conveyor 1028B that extends from the second outside surface 1022B and that extends substantially the length of the second cage tower 1018B. The second egg conveyor 1028B carries the eggs from the aviary cage 1021B to a collection area. The second perch 1029B extends into the aisle 1020 at a second vertical distance 1025 from the scratching floor 1011. The first vertical distance 1023 is not equal to the second vertical distance 1025.

In an embodiment, each of the perches 1029A, 1029B may extend a portion of the length of the respective cage tower 1018A, 1018B. In an embodiment, each of the perches 1029A, 1029B may extend the entire length of the respective cage tower 1018A, 1018B. In some embodiments, the perches 1029A, 1029B are solid. In one embodiment, the perches 1029A, 1029B may be square. In one embodiment, the perches 1029A, 1029B may be round. In one embodiment, the perches 1029A, 1029B may be square or round. The width or diameter of the perches 1029A, 1029B is configured to allow a hen to stand on the perches 1029A, 1029B.

In an embodiment, the first vertical distance 1023 and the second vertical distance 1025 define a third vertical distance 1027. The third vertical distance 1027 is configured to permit a bird to hop from the first perch 1029A to the second perch 1029B or vice versa.

It will be understood by one of ordinary skill in the art of aviary design that the offset cage and perch design may be replicated for as many cage tower combinations as are desired in an aviary 1010. In each case of an adjacent set of cage towers 1018, the perches 1029 of each cage tower 1018 should be offset from the perches 1029 of the adjacent cage tower 1018 by the third vertical distance 1027 to enable a bird to hop from perch 1029 to perch 1029 through aisle 1020 in a ladder-like manner.

In an embodiment, the first aviary cage 1021A may include multiple first egg conveyors 1028A, and the second aviary cage 1021B may include multiple second egg conveyors 1028B, wherein the first egg conveyors 1028A and the second egg conveyors 1028B are staggered vertically relative to each other along the first and second outside surfaces 1031A, 1031B of the cage towers 1018A, 1018B. In an embodiment, the first aviary cage 1021A may include multiple first perches 1029A, and the second aviary cage 1021B may include multiple second perches 1029B, wherein the first perches 1029A and the second perches 1029B are staggered vertically relative to each other along the first and second outside surfaces 1022A, 1022B of the aviary cages 1021A, 1021B.

In the illustrated embodiments, the scratching floors 1011 form similarly configured levels 1017 in the aviary 1010, wherein each level 1017 may be accessed by a worker. A hen may walk, peck, scratch, socialize, sleep, and lay eggs, as the bird desires, in the inside area 1013 and the inside area 1032. These same hen activities can be carried out on the at least one scratching floor 1011. The at least one aviary cage 1021 may house a specific group of birds or it may be open to birds from other aviary cages 1021. In an embodiment, the cage tower 1018 may be configured to allow the birds to move freely up and down the cage tower 1018. In an embodiment, the cage tower 1018 may be configured to keep birds in the aviary 1010 segregated by vertical level 1017. In an embodiment, the cage tower 1018 may be configured to keep birds segregated horizontally within a level 1017 of the cage tower 1018. When the hens lay their eggs, the eggs may be collected in egg conveyors 1028 that extend substantially the length of the cage tower 1018. The egg conveyor 1028 carries the eggs from the aviary cage 1021 to a collection area.

Each perch 1029 and each bump rail 1015 provide yet other areas for the hens to utilize when they are not confined to the at least one aviary cage 1021. In particular, hens may sit, hop, walk, scratch, socialize, sleep, and lay eggs from or on any perch 1029 and/or any bump rail 1015.

When a first perch 1029A and a second perch 1029B are included in an embodiment, the first vertical distance 1023 and the second vertical distance 1025 define a third vertical distance 1027, which third vertical distance is configured to facilitate the behavior of birds to hop from one surface to another and thereby create a ladder effect between the outside surfaces 1022A, 1022B of the aviary cages 1021A, 1021B and, concomitantly, the outside surfaces 1031A, 1031B of the cage towers 1018A, 1018B.

In one embodiment, an angle formed between the first perch 1029A and the second perch 1029B is no greater than 45°, which facilitates the behavior of birds to hop or fly from one surface to another. In one embodiment, a plurality of first and second perches 1029A, 1029B are spaced apart about the outside surfaces 1031A, 1031B of the respective cage towers 1018A, 1018B. In an embodiment, each perch 1029A, 1029B extends into the aisle 1020 to provide usable vertical space that creates additional habitable cubic inches for the birds, thereby enabling the aviary 1010 to be considered cage free.

In an embodiment, the first aviary cage 1021A may include multiple first perches 1029A, corresponding to the number of first egg conveyors 1028A, and the second aviary cage 1021B may include multiple second perches 1029B, corresponding to the number of second egg conveyors 1028B, wherein the first perches 1029A and the second perches 1029B are staggered in relation to each other along the first and second outside surfaces 1031A, 1031B of the cage towers 1018A, 1018B. In one embodiment, the first perches 1029A and the second perches 1029B are staggered vertically on the first and second outside surfaces 1031A, 1031B of the cage towers 1018A, 1018B. In one embodiment, the first perches 1029A and the second perches 1029B are staggered horizontally along the first and second outside surfaces 1031A, 1031B of the cage towers 1018A, 1018B.

In the illustrated embodiment, a cage tower 1018C is positioned adjacent the exterior wall 1016 and includes an aviary cage 1021C adjacent the scratching floor 1011. An egg conveyor 1028C extends from an outside surface 1022C of the aviary cage 1021C and into the aisle 1020. A perch 1029C extends from the outside surface 1022C of the aviary cage 1021C and is positioned above the egg conveyor 1028C. A perch 1029D extends from the interior surface 1030 of the exterior wall 1016 and into the aisle 1020.

In an embodiment, a perch 1029C is elevated at a first vertical distance 1033 from the scratching floor 1011, and a perch 1029D is positioned at a second vertical distance 1035 from the scratching floor 1011. In an embodiment, the first vertical distance 1033 and the second vertical distance 1035 define a third vertical distance 1037, which third vertical distance 1037 is configured to facilitate the behavior of birds to hop from one surface to another and thereby create a ladder effect between the aviary cage 1021C and the exterior wall 1016. In one embodiment, an angle formed between the perch 1029C and the perch 1029D is no greater than 45°, which configuration facilitates the behavior of birds to hop from one surface to another. In one embodiment, a plurality of perches 1029C is spaced apart about the outside surface 1031C of the cage tower 1018C. In one embodiment, a plurality of perches 1029D is spaced apart about the interior surface 1030 of the exterior wall 1016. Each perch 1029C, 1029D extends into the aisle 1020 to provide usable vertical space that creates additional habitable cubic inches for the birds, thereby enabling the aviary 1010 to be considered cage free.

As illustrated in FIG. 14, each of the perches 1029 may be offset horizontally with respect to one another. The perches 1029 are offset in a spaced apart arrangement to accommodate the behavior of birds to hop from one surface to another and thereby create a ladder effect on the outside surface 1022 of the aviary cage 1021 and, concomitantly, the outside surface 1031 of the cage tower 1018. In an embodiment (not shown), the perches 1029 are sloped downward from the cage tower 1018. In an embodiment, the perches 1029 extend from the outside surface 1022 parallel to the scratching floor 1011. In an embodiment (not shown), the perches 1029 may extend upward from the outside surface 1022 relative to the cage tower 1018.

Figure 15:
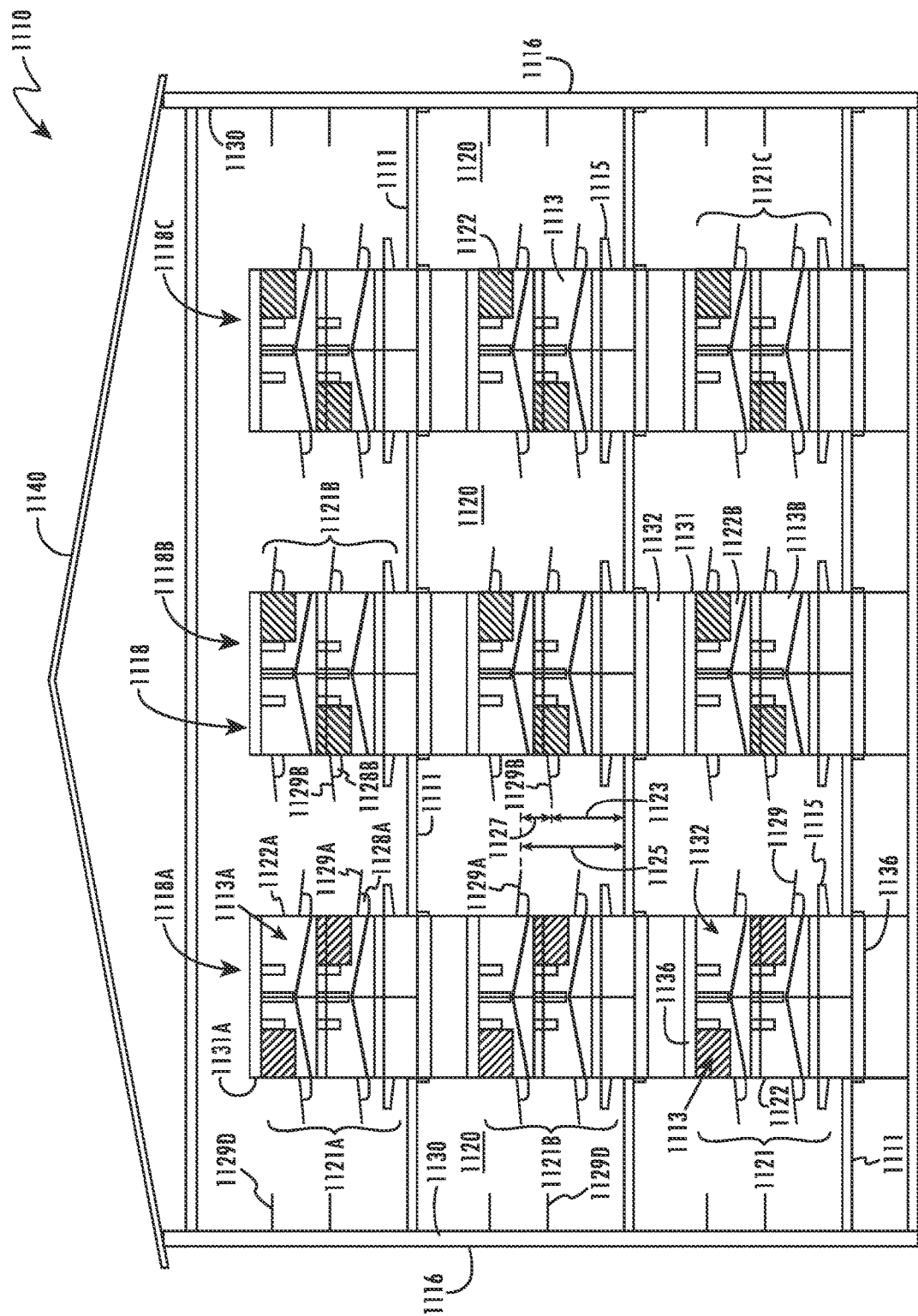
FIG. 15 is a front view of an aviary formed in accordance with another embodiment.

FIG. 15 illustrates an aviary 1110 having a floor 1114, exterior walls 1116, and a roof 1140. The exterior walls 1116 define an interior surface 1130. The exterior walls 1116 enclose at least one cage tower 1118 where hens may be caged. In an embodiment with multiple cage towers 1118, an aisle 1120 extends between each cage tower 1118 to provide an inspection area and space in which the birds housed in the aviary 1110 may move. In an embodiment having a single cage tower 1118, an aisle 1120 is present on at least one side of the cage tower 1118. In an embodiment, an aisle 1120 is positioned between an end tower 1118 and the respective exterior wall 1116. At least one scratching floor 1111 extends between each at least one cage tower 1118. In an embodiment, at least one scratching floor 1111 is positioned between an end cage tower 1118 and the respective exterior wall 1116.

Each at least one cage tower 1118 includes at least one aviary cage 1121. Each at least one aviary cage 1121 includes a first outside surface 1122 enclosing an inside area 1113. Each at least one cage tower 1118 includes an outside surface 1131 enclosing an inside area 1132. At least one bump rail 1115 extends from the outside surface 1131 and into the aisle 1120 to allow equipment to be maneuvered through the aisle 1120 without damaging the at least one cage tower 1118 or the at least one aviary cage 1121. The bump rail 1115 may be used by the birds as a perch.

Figure 16:
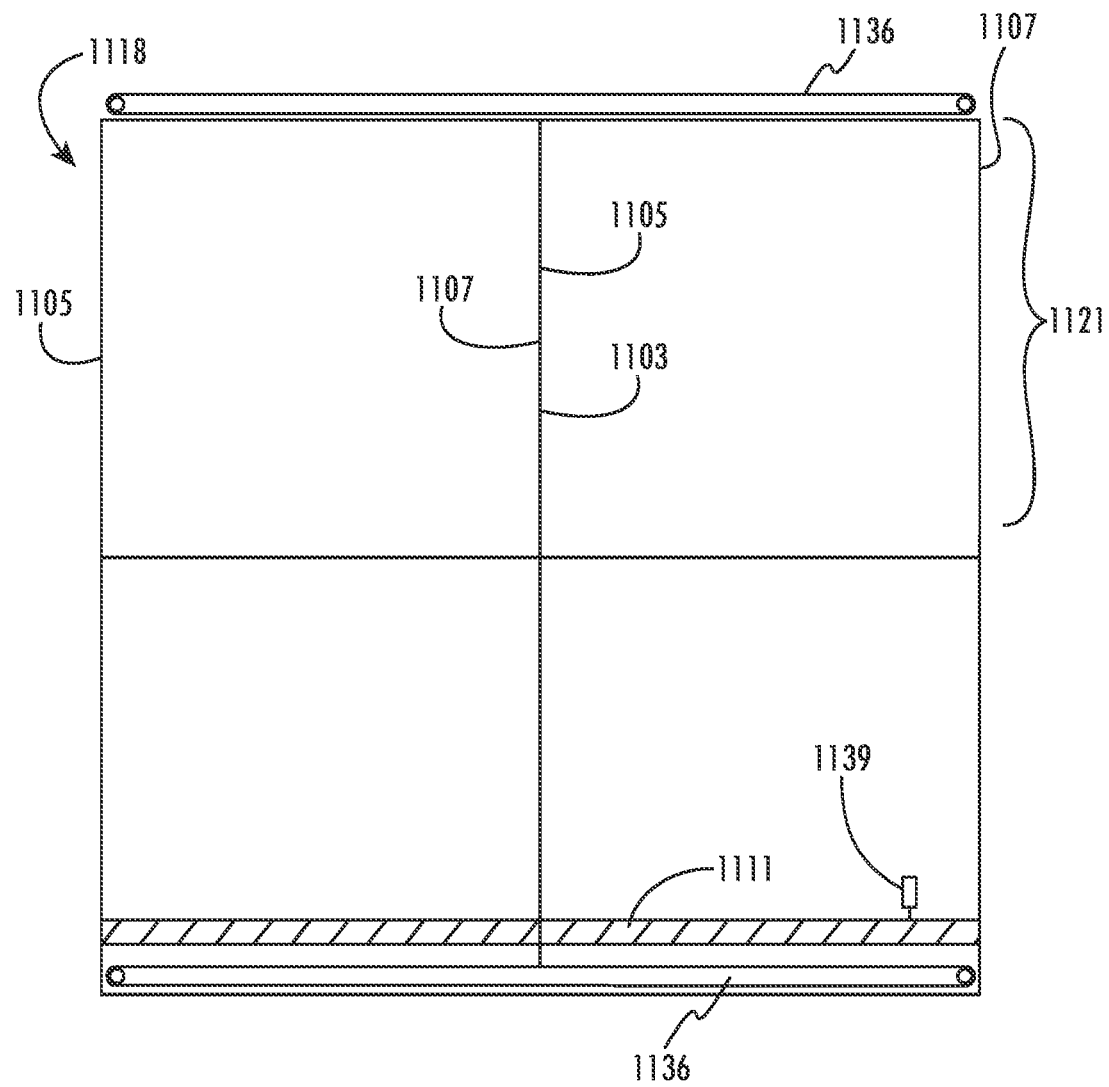
FIG. 16 is a side view of a cage in a cage tower shown in FIG. 15.

FIGS. 15 and 16 illustrate at least one cage tower 1118. In an embodiment, the aviary 1110 includes at least two cage towers 1118A, 1118B. In an embodiment, a first cage tower 1118A includes a first aviary cage 1121A, and a second cage tower 1118B includes a second aviary cage 1121B, which second aviary cage 1121B is similar to the first aviary cage 1121A. In the illustrated embodiment, a third cage tower 1118C includes a third aviary cage 1121C, which third aviary cage 1121C is similar to the first aviary cage 1121A and the second aviary cage 1121B. In an embodiment, multiple first aviary cages 1121A are stacked on top of one another. In an embodiment, aviary cage 1121 has a first end 1105 and a second end 1107. In an embodiment, a level in at least one cage tower 1118 is formed by placing at least two aviary cages 1121 in a row, with the first end 1105 of a first aviary cage 1121 adjacent the second end 1107 of a second aviary cage 1121. In an embodiment, a divider 1103 may be positioned between the adjacent aviary cages 1121. For example, the divider 1103 may be positioned at the juncture of the first end 1105 of the first aviary cage 1121 and the second end 1107 of the second aviary cage 1121. In that embodiment, the divider 1103 prevents birds from roaming between the first aviary cage 1121 and the second aviary cage 1121. In another embodiment (not shown), a gap may be positioned between the first end 1105 of the first aviary cage 1121 and the second end 1107 of the second aviary cage 1121. In that embodiment, the gap may be sized to prevent birds from traversing the gap and roaming between the first aviary cage 1121 and the second aviary cage 1121.

In an embodiment, each first aviary cage 1121A has a first outside surface 1122A enclosing an inside area 1113A. In an embodiment, multiple second aviary cages 1121B are stacked on top of one another. In an embodiment, each second aviary cage 1121B includes a second outside surface 1122B enclosing an inside area 1113B. In an embodiment, multiple third aviary cages 1121C are stacked on top of one another. In an embodiment, each third aviary cage 1121C includes a third outside surface 1122C enclosing an inside area 1113C. The second aviary cage 1121B is positioned adjacent the first aviary cage 1121A and an aisle 1120 is formed therebetween. The second aviary cage 1121B is also positioned adjacent the third aviary cage 1121C and an aisle 1120 is formed therebetween.

In an embodiment, a scratching floor 1111 extends between at least one aviary cage 1121 and the interior surface 1130 of an adjacent exterior wall 1116. In an embodiment, a scratching floor 1111 extends between the first aviary cage 1121A and the second aviary cage 1121B. In an embodiment, a scratching floor 1111 extends between the second aviary cage 1121B and the third aviary cage 1121C. In an embodiment, a scratching floor 1111 extends from the outside surface 1131 of the cage tower 1118.

In an embodiment, the scratching floor 1111 is configured so that a worker can walk across the scratching floor 1111 between the cage towers 1118A and 1118B. In an embodiment, a scratching floor 1111 is configured so that a worker can walk between cage tower 1118A and the respective exterior wall 1116. In an embodiment, the scratching floor 1111 is configured so that a worker can walk across the scratching floor 1111 between the cage towers 1118C and 1118B. In an embodiment, a scratching floor 1111 is configured so that a worker can walk between cage tower 1118C and the respective exterior wall 1116. The scratching floor 1111 serves as a scratching area where hens can move freely, peck the floor with their beaks, and scratch the scratching floor 1111 with their feet. In one embodiment, the scratching floor 1111 is sloped (not shown) toward the respective aviary cage 1121 to allow deposits to move back toward the aviary cage 1121. In an embodiment including a belt 1136 positioned under each aviary cage 1121, the scratching floor 1111 is sloped toward the respective belt 1136 to allow deposits to move back toward the belt 1136.

The first outside surface 1122 of the at least one aviary cage 1121 includes a first perch 1129 extending into the aisle 1120. In an embodiment, each perch 1129 may extend a portion of the length of the at least one cage tower 1118. In an embodiment, each perch 1129 may extend substantially the length of the at least one cage tower 1118. In an embodiment, the interior surface 1130 of the exterior wall 1116 includes a second perch 1129D extending into the aisle 1120. In an embodiment, each perch 1129D may extend a portion of the length of the interior surface 1130 of the exterior wall 1116 of the aviary 1110. In an embodiment, each perch 1129D may extend substantially the length of the interior surface 1130 of the exterior wall 1116.

Referring to an embodiment, a first perch 1129A extends from the first outside surface 1122A of the first aviary cage 1121A and is positioned above a first egg conveyor 1128A that extends from the first outside surface 1122A and that extends substantially the length of the first cage tower 1118A. When the hens lay their eggs, the eggs may be collected in the first egg conveyor 1128A. The first egg conveyor 1128A carries the eggs from the aviary cage 1121A to a collection area. The first perch 1129A extends into the aisle 1120 at a first vertical distance 1123 from the scratching floor 1111. A second perch 1129B extends from the second outside surface 1122B of the second aviary cage 1121B and is positioned above a second egg conveyor 1128B that extends from the second outside surface 1122B and that extends substantially the length of the second cage tower 1118B. The second egg conveyor 1128B carries the eggs from the aviary cage 1121B to a collection area. The second perch 1129B extends into the aisle 1120 at a second vertical distance 1125 from the scratching floor 1111. The first vertical distance 1123 is not equal to the second vertical distance 1125.

In an embodiment, the first vertical distance 1123 and the second vertical distance 1125 define a third vertical distance 1127. The third vertical distance 1127 is configured to permit a bird to hop from the first perch 1129A to the second perch 1129B or vice versa.

It will be understood by one of ordinary skill in the art of aviary design that the offset cage and perch design may be replicated for as many cage tower combinations as are desired in an aviary 1110. In each case of an adjacent set of cage towers 1118, the perches 1129 of each cage tower 1118 should be offset from the perches 1129 of the adjacent cage tower 1118 by the third vertical distance 1127 to enable a bird to hop from perch 1129 to perch 1129 through aisle 1120 in a ladder-like manner.

In an embodiment, the first cage tower 1118A may include multiple first egg conveyors 1128A, and the second cage tower 1118B may include multiple second egg conveyors 1128B, wherein the first egg conveyors 1128A and the second egg conveyors 1128B are staggered vertically relative to each other along the first and second outside surfaces 1131A, 1131B of the cage towers 1118A, 1118B. In an embodiment, the first cage tower 1118A may include multiple first perches 1129A, and the second cage tower 1118B may include multiple second perches 1129B, wherein the first perches 1129A and the second perches 1129B are staggered vertically relative to each other along the first and second outside surfaces 1131A, 1131B of the cage towers 1118A, 1118B.

When a first perch 1129A and a second perch 1129B are included in an embodiment, the first vertical distance 1123 and the second vertical distance 1125 define a third vertical distance 1127, which third vertical distance is configured to facilitate the behavior of birds to hop from one surface to another and thereby create a ladder effect between the outside surfaces 1122A, 1122B of the aviary cages 1121A, 1121B and, concomitantly, the outside surfaces 1131A, 1131B of the cage towers 1118A, 1118B.

At least one belt 1136 extends through each cage tower 1118 to remove a deposit from at least part of the cage tower

1118. In one embodiment, the belt 1136 extends through each cage tower 1118 substantially the length of the cage tower 1118. In one embodiment, the belt 1136 extends approximately 400 feet along the length of each cage tower 1118. In one embodiment, the belt 1136 carries deposits from the cage tower 1118 to a collection area (not shown) positioned outside of the cage tower 1118.

A scratching floor 1111 extends between the first aviary cage 1121A and the second aviary cage 1121B. The scratching floor 1111 is oriented with respect to and positioned adjacent to a respective belt 1136. In one embodiment, the scratching floor 1111 is planar with the respective adjacent belt 1136. In one embodiment, the scratching floor 1111 is sloped to allow deposits to move back toward the respective belt 1136. When the birds scratch the scratching floor 1111, they scratch much of the deposits made on the scratching floor 1111 onto the belt 1136. Accordingly, since it is common for birds to defecate in a scratching area, the scratching floor 1111 becomes relatively self-cleaning as the hens scratch. The scratching floor 1111 is configured so that the deposits are scratched back to the respective belt 1136. Such configuration reduces the required frequency for cleaning of the aviary 1110. Any eggs laid on the scratching floor 1111 may be directed back toward the belt 1136 by the scratching of the hens. These eggs are then collected from the belt 1136 and removed from the belt 1136.

In one embodiment, the belt 1136 forms a floor of the aviary cage 1121. Accordingly, the birds are allowed to move freely and walk on the belt 1136.

Figure 17:
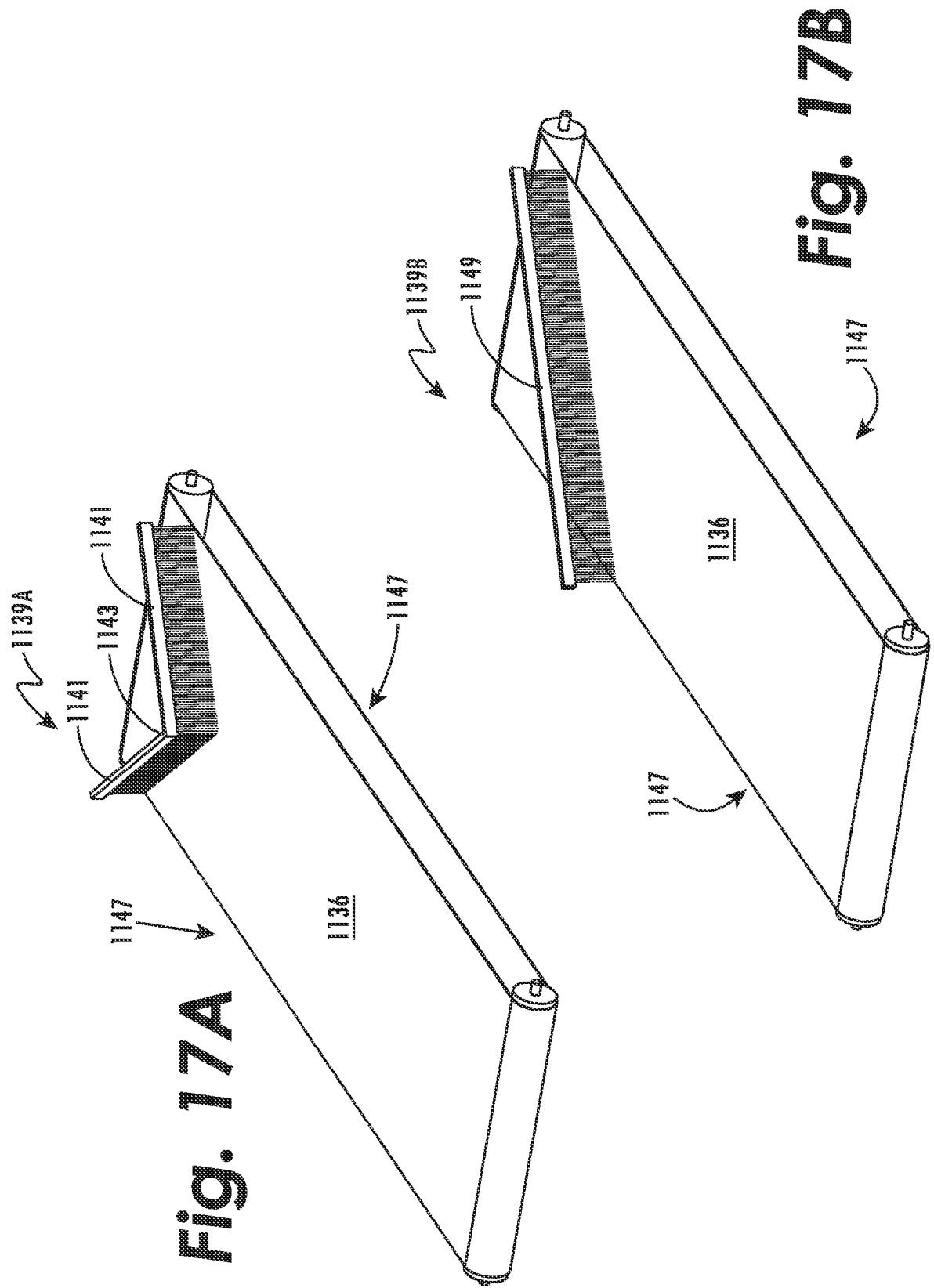
FIG. 17A is a perspective top view of an egg collector formed in accordance with an embodiment.
FIG. 17B is a perspective top view of an egg collector formed in accordance with another embodiment.

In one embodiment, eggs are removed from the belt 1136 through the use of an egg remover 1139 positioned at the end of the belt 1136. FIG. 17A shows one embodiment of an egg remover 1139A. In the illustrated embodiment, the egg remover 1139A includes two brushes 1141 that meet at a point 1143. From the point 1143, each brush 1141 extends toward a side 1147 of the belt 1136. In particular, each brush 1141 extends at an angle toward a side 1147 of the belt 1136 in the direction of movement of the belt 1136, wherein the brushes 1141 extend over the full width of the belt 1136. In an embodiment, the brushes 1141 are round. In that embodiment, the brushes 1141 rotate in a direction that moves material to at least one side 1147 of the belt 1136. In one embodiment, the brush 1141 may be an auger-shaped brush. In an embodiment, the brushes 1141 are flat and divert the eggs toward a side 1147 of the belt 1136. Additionally, in one embodiment, a finger belt (not shown) is utilized to move the eggs to a side 1147 of the belt 1136. In yet another embodiment, any egg conveying apparatus, including but not limited to a roller having a flange, can be utilized to move the eggs to a side 1147 or both sides 1147 of the belt 1136.

FIG. 17B shows another embodiment of an egg remover 1139B. The egg remover 1139B includes a single brush 1149 that extends the width of the belt 1136 at an angle from one side 1147 of the belt 1136 to the other side 1147 of the belt 1136. In an embodiment, the brush 1149 is round. In that embodiment, the brush 1149 rotates in a direction that moves material to the downstream end of the brush 1149 with respect to the direction of movement of the belt 1136. In an embodiment, the brush 1149 is flat and moves material to the downstream end of the brush 1149 with respect to the direction of movement of the belt 1136.

Each brush 1141, 1149 is formed from a material having a rigidity that enables the brush 1141, 1149 to move eggs toward at least one side 1147 of the belt 1136. However, the rigidity is such that the brush 1141, 1149 is incapable of moving deceased birds. Rather, deceased birds pass through and/or under the brush 1141, 1149 and are deposited at an end of the belt 1136. Additionally, the brush 1141, 1149 is positioned above the belt 1136 to enable deposits other than eggs to pass under the brush 1141, 1149.

Figure 18:
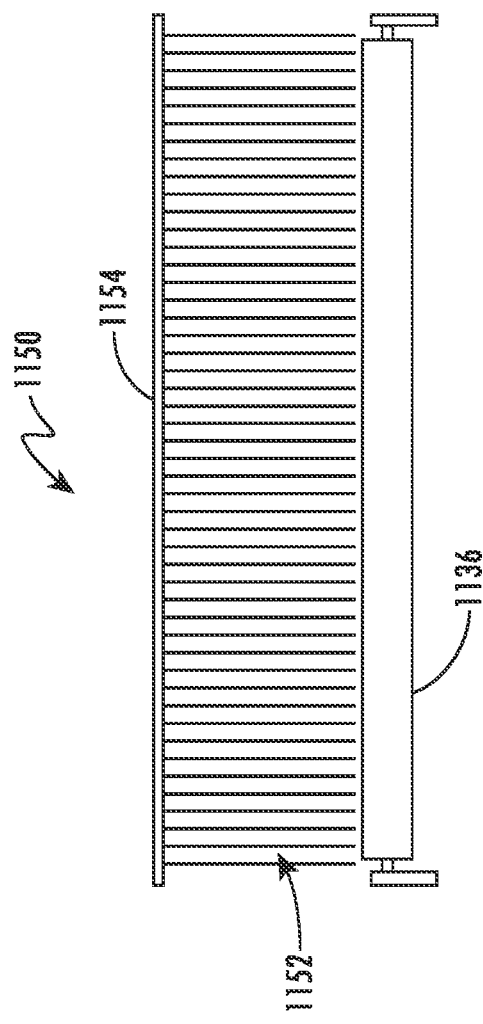
FIG. 18 is a front view of a gate formed in accordance with another embodiment.
Figure 19:
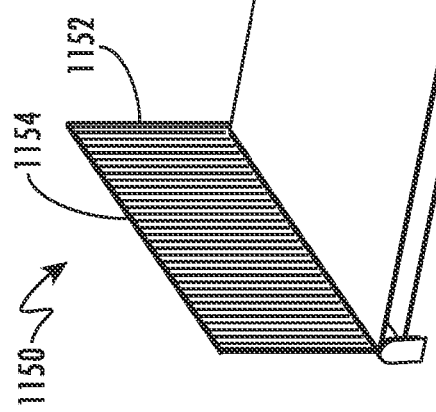
FIG. 19 is a side perspective view of the gate shown in FIG. 18.

In one embodiment, illustrated in FIGS. 18 and 19, at least one gate 1150 is positioned along at least one belt 1136 to permit deposits on the belt 1136 to pass thereunder and/or therethrough and to prevent birds from traveling beyond the gate 1150. In one embodiment, the gate 1150 includes openings 1152 operative to enable deposits to pass therethrough. In an embodiment, the gate 1150 includes overlapping plastic or cloth strips operative to enable deposits to pass therethrough and/or thereunder and to prevent birds from traveling beyond the gate 1150. Additionally, in one embodiment, the gate 1150 includes a hinge 1154 operative to rotate the gate 1150 and thereby enable larger deposits, such as eggs and dead animals, to move past the gate 1150. In an embodiment, an electric fence may be positioned on the gate 1150 to prevent live birds from entering the gate 1150. In an embodiment, an electric fence may be spaced apart from the gate 1150 to prevent birds from reaching and entering the gate 1150. In embodiments including at least one gate 1150, birds are prevented from leaving a part of the aviary 1110 while deposits are permitted to travel away from that part of the aviary 1110.

Figure 20:
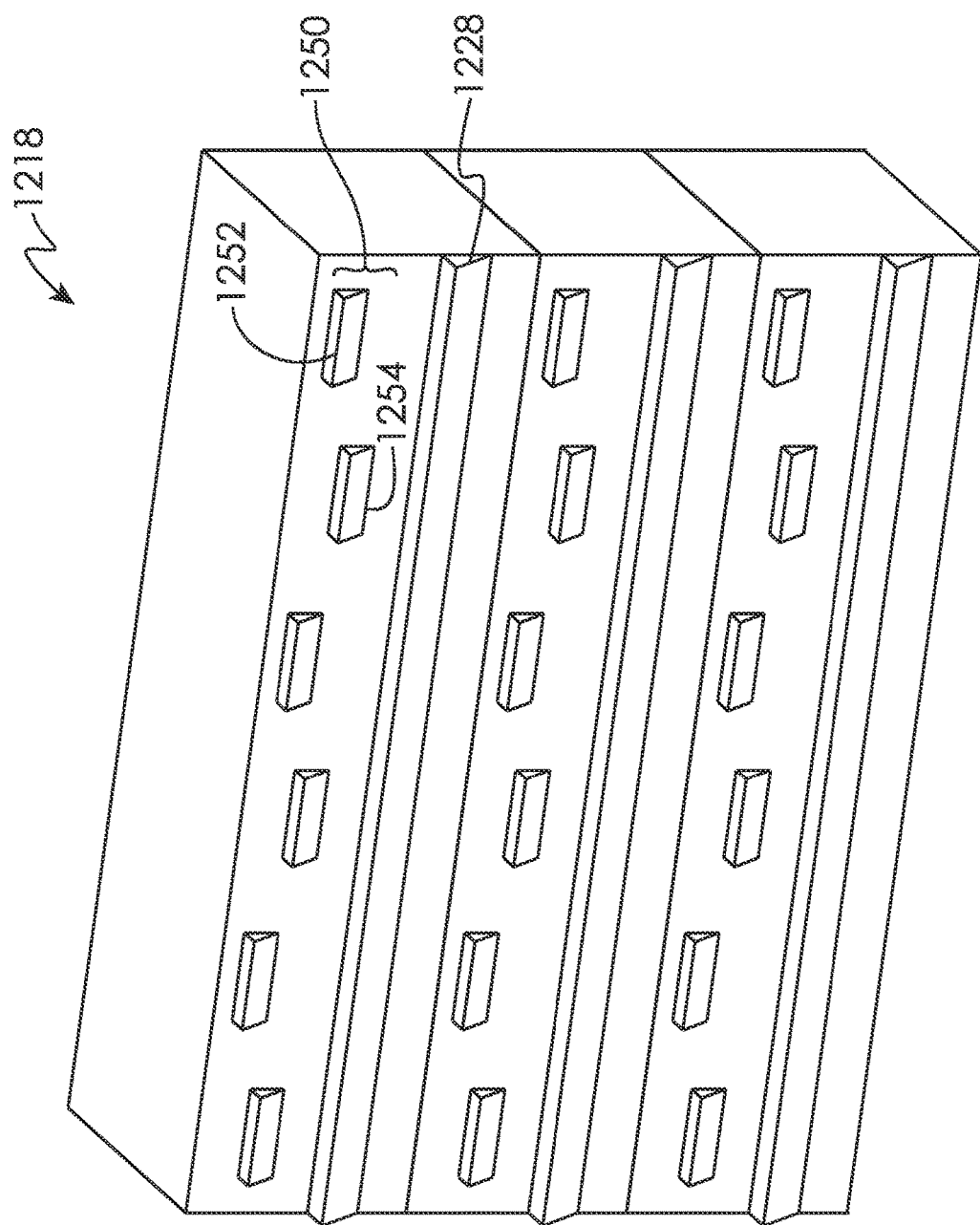
FIG. 20 illustrates a side perspective view of a cage tower formed in accordance with another embodiment.

In one embodiment shown in FIG. 20, a plurality of perches 1250 is spaced apart about an outside of a cage tower 1218. First perches 1252 and second perches 1254 may be offset horizontally with respect to one another. In an embodiment, the first perches 1252 and the second perches 1254 may be offset vertically with respect to one another. The perches 1250, if they are offset from each other, may be offset by a hopping distance for a bird. The perches 1250 may be positioned above and below the egg conveyors 1228. Each perch 1250 extends into an aisle formed between adjacent cage towers 1218 or into an aisle formed between a cage tower 1218 and an exterior wall 1216. The usable vertical space created by the perches 1250 provides additional habitable cubic inches for the birds.

In one embodiment, a method of constructing an aviary 1010 is provided. The method includes positioning a first cage tower 1018A adjacent to a second cage tower 1018B, wherein the first cage tower 1018A includes a first aviary cage 1021A, and the second cage tower 1018B includes a second aviary cage 1021B. In an embodiment, the method may include stacking multiple first aviary cages 1021A on top of one another. In an embodiment, each aviary cage 1021 has a first end 1005 and a second end 1007. In an embodiment, the method may include forming a level in at least one cage tower 1018 by placing at least two aviary cages 1021 in a row, with the first end 1005 of a first aviary cage 1021 adjacent the second end 1007 of a second aviary cage 1021. In an embodiment, each first aviary cage 1021A includes a first outside surface 1022A enclosing an inside area 1013A. In an embodiment, the method may include stacking multiple second aviary cages 1121B on top of one another. In an embodiment, each second aviary cage 1021B includes a second outside surface 1022B enclosing an inside area 1013B. The method may include extending an aisle 1020 between the first aviary cage 1021A and the second aviary cage 1021B.

In an embodiment, the method may include extending a scratching floor 1011 from a first aviary cage 1021A through the aisle 1020 to a second aviary cage 1021B. The method may include extending a first perch 1029A from the first outside surface 1022A of the first aviary cage 1021A and into the aisle 1020 at a first vertical distance 1023 from a scratching floor 1011. The method may include extending a second perch 1029B from the second outside surface 1022B of the second aviary cage 1021B and into the aisle 1020 at a second vertical distance 1025 from the scratching floor 1011. In an embodiment, the first vertical distance 1023 and the second vertical distance 1025 define a third vertical distance 1027 in a spaced apart arrangement to accommodate the behavior of birds to hop from one surface to another and thereby create a ladder effect between the outside surfaces 1022A, 1022B of the aviary cages 1021A and 1021B.

Each of the first cage tower 1018A and the second cage tower 1018B may include at least one belt 1136 positioned within the inside area 1013A, 1013B. The method further includes positioning the first perch 1029A and the second perch 1029B adjacent the respective belt 1136. In one embodiment, the respective belt 1136 forms at least one floor of each cage tower 1018A, 1018B. The at least one belt 1136 is configured to remove a deposit from at least part of the respective cage tower 1018A, 1018B. An egg remover 1139 may be positioned at an end of each belt 1136 to remove eggs from the belt 1136. The egg remover 1139 may include at least one brush 1149 to direct material to at least one side 1147 of the belt 1136.

In an embodiment, the method may include positioning a gate 1150 in relation to each belt 1136 to prevent animals from leaving the respective aviary cage 1021A, 1021B. The gate 1150 may include openings 1152 to enable debris to pass therethrough. Additionally, the gate 1150 may include a hinge 1154 to rotate the gate 1150 and thereby enable eggs and dead animals to move past the gate 1150.

Figure 21:
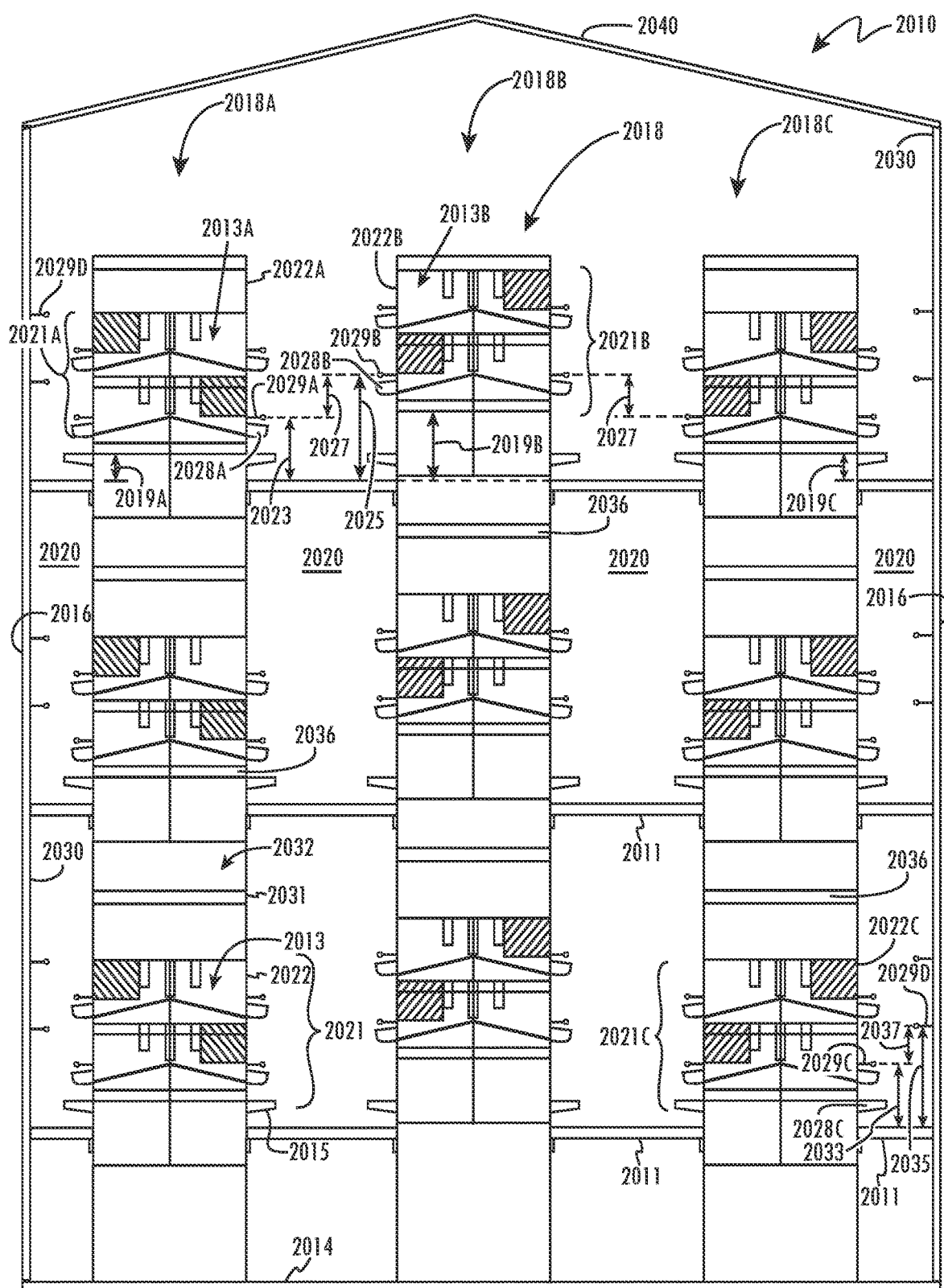
FIG. 21 is a front view of an aviary formed in accordance with another embodiment.

FIG. 21 illustrates an aviary 2010 having a floor 2014, which aviary 2010 is enclosed by exterior walls 2016 and a roof 2040. The exterior walls 2016 define an interior surface 2030. The exterior walls 2016 enclose at least one cage tower 2018 where hens may be caged. Although the illustrated embodiment shows three cage towers 2018, it should be noted that the aviary may be constructed with any number of cage towers 2018, including a single cage tower 2018. In an embodiment with multiple cage towers 2018, an aisle 2020 extends between each cage tower 2018 to provide an inspection area and space in which the birds housed in the aviary 2010 may move. In an embodiment, an aisle 2020 is positioned between a cage tower 2018 and the respective exterior wall 2016. In an embodiment, at least one scratching floor 2011 extends between each at least one cage tower 2018. In an embodiment, at least one scratching floor 2011 is positioned between a cage tower 2018 and the respective exterior wall 2016.

Each at least one cage tower 2018 includes at least one aviary cage 2021. Each at least one aviary cage 2021 includes a first outside surface 2022 enclosing an inside area 2013. Each at least one cage tower 2018 includes an outside surface 2031 enclosing an inside area 2032. At least one bump rail 2015 extends from the outside surface 2031 and into the aisle 2020 to allow equipment to be maneuvered through the aisle 2020 without damaging the at least one cage tower 2018 or the at least one aviary cage 2021. The bump rail 2015 may be used by the birds as a perch.

In an embodiment, a first cage tower 2018A includes a first aviary cage 2021A, and a second cage tower 2018B includes a second aviary cage 2021B, which second aviary cage 2021B is similar to the first aviary cage 2021A. In the illustrated embodiment, a third cage tower 2018C includes a third aviary cage 2021C, which third aviary cage 2021C is similar to the first aviary cage 2021A and the second aviary cage 2021B. In an embodiment, multiple first aviary cages 2021A are stacked on top of one another. In an embodiment, each first aviary cage 2021A has a first outside surface 2022A enclosing an inside area 2013A. In an embodiment, multiple second aviary cages 2021B are stacked on top of one another. In an embodiment, each second aviary cage 2021B includes a second outside surface 2022B enclosing an inside area 2013B. In an embodiment, multiple third aviary cages 2021C are stacked on top of one another. In an embodiment, each third aviary cage 2021C includes a third outside surface 2022C enclosing an inside area 2013C. The second aviary cage 2021B is positioned adjacent the first aviary cage 2021A and an aisle 2020 is formed therebetween. The second aviary cage 2021B is also positioned adjacent the third aviary cage 2021C and an aisle 2020 is formed therebetween. In an embodiment, the second aviary cage 2021B is positioned at a height 2019B from the scratching floor 2011 that is greater than a height 2019A of the first aviary cage 2021A from the scratching floor 2011. In an embodiment, the second aviary cage 2021B is positioned at a height 2019B from the scratching floor 2011 that is greater than a height 2019C of the third aviary cage 2021C from the scratching floor 2011. In an embodiment, the height 2019A is substantially equal to the height 2019C. In another embodiment, the height 2019A is not equal to the height 2019C.

In an embodiment, a scratching floor 2011 extends between at least one aviary cage 2021 and the interior surface 2030 of an adjacent exterior wall 2016. In an embodiment, a scratching floor 2011 extends between the first aviary cage 2021A and the second aviary cage 2021B. In an embodiment, a scratching floor 2011 extends between the second aviary cage 2021B and the third aviary cage 2021C. In an embodiment, a scratching floor 2011 extends from the outside surface 2031 of the cage tower 2018.

In an embodiment, the scratching floor 2011 is configured so that a worker can walk across the scratching floor 2011 between the cage towers 2018A and 2018B. In an embodiment, a scratching floor 2011 is configured so that a worker can walk between cage tower 2018A and the respective exterior wall 2016. In an embodiment, the scratching floor 2011 is configured so that a worker can walk across the scratching floor 2011 between the cage towers 2018C and 2018B. In an embodiment, a scratching floor 2011 is configured so that a worker can walk between cage tower 2018C and the respective exterior wall 2016. The scratching floor 2011 serves as a scratching area where hens can move freely, peck the floor with their beaks, and scratch the scratching floor 2011 with their feet. In one embodiment, the scratching floor 2011 is sloped (not shown) toward the respective aviary cage 2021 to allow deposits to move back toward the aviary cage 2021. In an embodiment including a belt 2036 positioned under each aviary cage 2021, the scratching floor 2011 is sloped toward the respective belt 2036 to allow deposits to move back toward the belt 2036.

The first outside surface 2022 of the at least one aviary cage 2021 includes a first perch 2029 extending into the aisle 2020. In an embodiment, each perch 2029 may extend a portion of the length of the at least one cage tower 2018. In an embodiment, each perch 2029 may extend substantially the length of the at least one cage tower 2018. In an embodiment, the interior surface 2030 of the exterior wall 2016 includes a second perch 2029D extending into the aisle 2020. In an embodiment, each perch 2029D may extend a portion of the length of the interior surface 2030 of the exterior wall 2016 of the aviary 2010. In an embodiment, each perch 2029D may extend substantially the length of the interior surface 2030 of the exterior wall 2016.

Referring to an embodiment, a first perch 2029A extends from the first outside surface 2022A of the first aviary cage 2021A and is positioned above a first egg conveyor 2028A that extends from the first outside surface 2022A and that extends substantially the length of the first cage tower 2018A. When hens lay their eggs, the eggs may be collected in the first egg conveyor 2028A. The first egg conveyor 2028A carries the eggs from the aviary cage 2021A to a collection area. The first perch 2029A extends into the aisle 2020 at a first vertical distance 2023 from the scratching floor 2011. A second perch 2029B extends from the second outside surface 2022B of the second aviary cage 2021B and is positioned above a second egg conveyor 2028B that extends from the second outside surface 2022B and that extends substantially the length of the second cage tower 2018B. The second egg conveyor 2028B carries the eggs from the aviary cage 2021B to a collection area. The second perch 2029B extends into the aisle 2020 at a second vertical distance 2025 from the scratching floor 2011. The first vertical distance 2023 is not equal to the second vertical distance 2025.

In an embodiment, the first vertical distance 2023 and the second vertical distance 2025 define a third vertical distance 2027. The third vertical distance 2027 is configured to permit a bird to hop from the first perch 2029A to the second perch 2029B or vice versa.

It will be understood by one of ordinary skill in the art of aviary design that the offset cage and perch design may be replicated for as many cage tower combinations as are desired in an aviary 2010. In each case of an adjacent set of cage towers 2018, the perches 2029 of each cage tower 2018 should be offset from the perches 2029 of the adjacent cage tower 2018 by the third vertical distance 2027 to enable a bird to hop from perch 2029 to perch 2029 through aisle 2020 in a ladder-like manner. In an embodiment, the first cage tower 2018A may include multiple first egg conveyors 2028A, and the second cage tower 2018B may include multiple second egg conveyors 2028B, wherein the first egg conveyors 2028A and the second egg conveyors 2028B are staggered vertically relative to each other along the first and second outside surfaces 2031A, 2031B of the cage towers 2018A, 2018B. In an embodiment, the first cage tower 2018A may include multiple first perches 2029A, and the second cage tower 2018B may include multiple second perches 2029B, wherein the first perches 2029A and the second perches 2029B are staggered vertically relative to each other along the first and second outside surfaces 2031A, 2031B of the cage towers 2018A, 2018B.

When a first perch 2029A and a second perch 2029B are included in an embodiment, the first vertical distance 2023 and the second vertical distance 2025 define a third vertical distance 2027, which third vertical distance is configured to facilitate the behavior of birds to hop from one surface to another and thereby create a ladder effect between the outside surfaces 2022A, 2022B of the aviary cages 2021A, 2021B and, concomitantly, the outside surfaces 2031A, 2031B of the cage towers 2018A, 2018B.

In an illustrated embodiment, a cage tower 2018C is positioned adjacent the exterior wall 2016 and includes an aviary cage 2021C adjacent the scratching floor 2011. An egg conveyor 2028C extends from an outside surface 2022C of the aviary cage 2021C and into the aisle 2020. A perch 2029C extends from the outside surface 2022C of the aviary cage 2021C and is positioned above the egg conveyor 2028C. A perch 2029D extends from the interior surface 2030 of the exterior wall 2016 and into the aisle 2020.

In an embodiment, the perch 2029C is elevated at a first vertical distance 2033 from the scratching floor 2011, and the perch 2029D is positioned at a second vertical distance 2035 from the scratching floor 2011. In an embodiment, the first vertical distance 2033 and the second vertical distance 2035 define a third vertical distance 2037, which third vertical distance 2037 is configured to facilitate the behavior of birds to hop from one surface to another and thereby create a ladder effect between the aviary cage 2021C and the exterior wall 2016.

In one embodiment, an angle formed between the perch 2029C and the perch 2029D is no greater than 45°, which configuration facilitates the behavior of birds to hop from one surface to another. In one embodiment, a plurality of perches 2029C is spaced apart about the outside surface 2031C of the cage tower 2018C. In one embodiment, a plurality of perches 2029D is spaced apart about the interior surface 2030 of the exterior wall 2016. Each perch 2029C, 2029D extends into the aisle 2020 to provide usable vertical space that creates additional habitable cubic inches for the birds, thereby enabling the aviary 2010 to be considered cage free.

In an embodiment, the perches 2029A, 2029B, 2029C are offset as a result of the aviary cages 2021A, 2021B, 2021C being positioned at different heights from the scratching floor 2011. Accordingly, by offsetting the heights 2019A, 2019B, 2019C of the aviary cages 2021A, 2021B, 2021C the perches 2029A, 2029B, 2029C become offset. Each of the perches 2029 are offset in a spaced apart arrangement to accommodate the behavior of birds to hop from one surface to another and thereby create a ladder effect on the outside surface 2022 of the aviary cage 2021 and, concomitantly, the outside surface 2031 of the cage tower 2018. In an embodiment, the perches 2029 are sloped downward from the cage tower 2018. In an embodiment, the perches 2029 extend from the outside surface 2022 parallel to the scratching floor 2011. In an embodiment, the perches 2029 may extend upward from the outside surface 2022 relative to the cage tower 2018.

Figure 22:
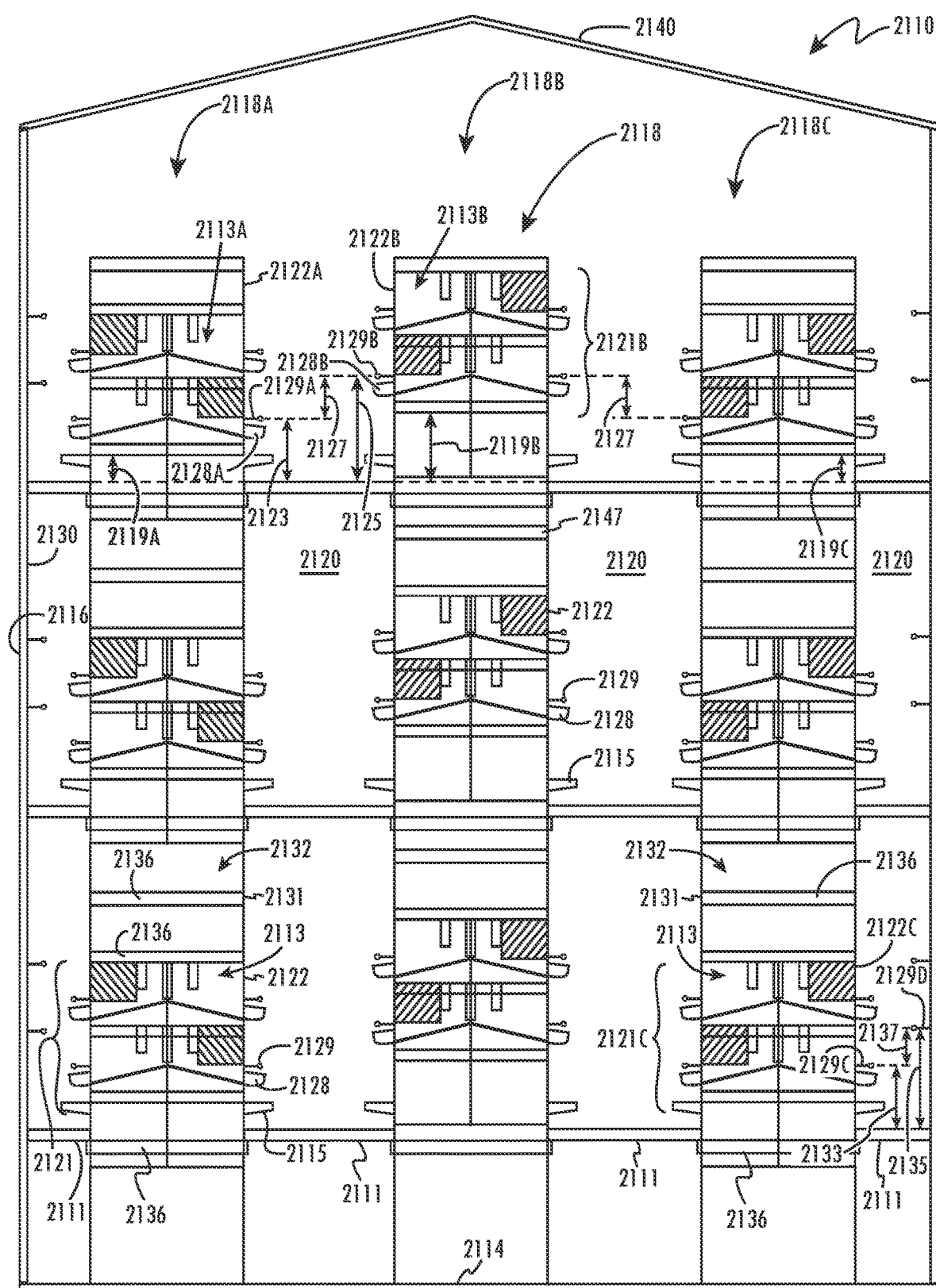
FIG. 22 is a front view of an aviary formed in accordance with another embodiment.

FIG. 22 illustrates an aviary 2110 having a floor 2114, which aviary 2110 is enclosed by exterior walls 2116 and a roof 2140. The exterior walls 2116 define an interior surface 2130. The exterior walls 2116 enclose at least one cage tower 2118 where hens may be caged. In an embodiment having multiple cage towers 2118, an aisle 2120 extends between each cage tower 2118 to provide an inspection area and space in which the birds housed in the aviary 2110 may move. In an embodiment, an aisle 2120 is positioned between an end cage tower 2118 and the respective exterior wall 2116. In an embodiment having multiple cage towers 2118, at least one scratching floor 2111 extends between each at least one cage tower 2118. In an embodiment, at least one scratching floor 2111 is positioned between an end cage tower 2118 and the respective exterior wall 2116

Figure 23:
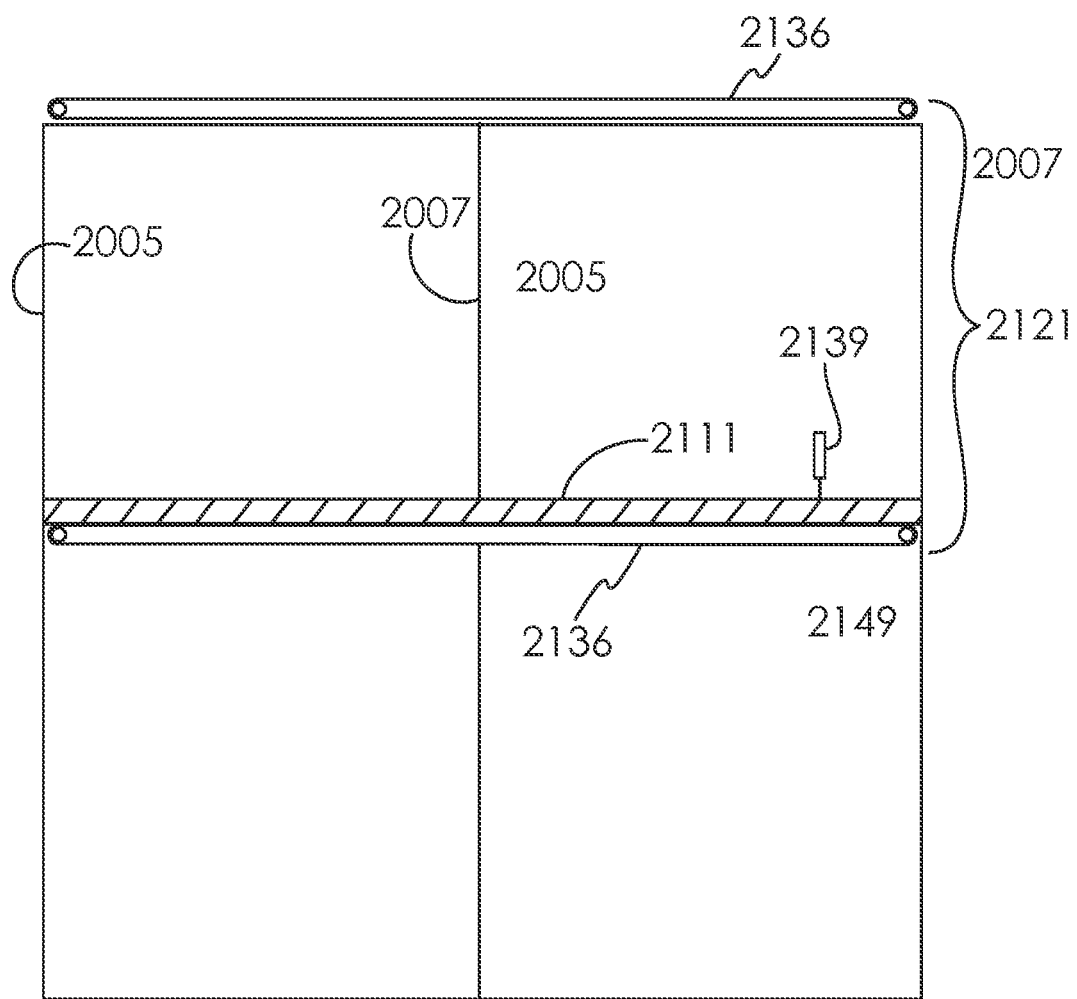
FIG. 23 is a side view of an aviary cage in a cage tower shown in FIG. 22.

FIGS. 22 and 23 illustrate at least one cage tower 2118. Each at least one cage tower 2118 includes at least one aviary cage 2121. Each at least one aviary cage 2121 includes a first outside surface 2122 enclosing an inside area 2113. Each at least one cage tower 2118 includes an outside surface 2131 enclosing an inside area 2132. At least one bump rail 2115 extends from the outside surface 2131 and into the aisle 2120 to allow equipment to be maneuvered through the aisle 2120 without damaging the at least one cage tower 2118 or the at least one aviary cage 2121. The bump rail 2115 may be used by the birds as a perch.

In an embodiment, a first cage tower 2118A includes a first aviary cage 2121A, and a second cage tower 2118B includes a second aviary cage 2121B, which second aviary cage 2121B is similar to the first aviary cage 2121A. In the illustrated embodiment, a third cage tower 2118C includes a third aviary cage 2121C, which third aviary cage 2121C is similar to the first aviary cage 2121A and the second aviary cage 2121B. In an embodiment, multiple first aviary cages 2121A are stacked on top of one another. In an embodiment, each first aviary cage 2121A has a first outside surface 2122A enclosing an inside area 2113A. In an embodiment, multiple second aviary cages 2121B are stacked on top of one another. In an embodiment, each second aviary cage 2121B includes a second outside surface 2122B enclosing an inside area 2113B. In an embodiment, multiple third aviary cages 2121C are stacked on top of one another. In an embodiment, each third aviary cage 2121C includes a third outside surface 2122C enclosing an inside area 2113C. The second aviary cage 2121B is positioned adjacent the first aviary cage 2121A and an aisle 2120 is formed therebetween. The second aviary cage 2121B is also positioned adjacent the third aviary cage 2121C and an aisle 2120 is formed therebetween. In an embodiment, the second aviary cage 2121B is positioned at a height 2119B from the scratching floor 2111 that is greater than a height 2119A of the first aviary cage 2121A from the scratching floor 2111. In an embodiment, the second aviary cage 2121B is positioned at a height 2119B from the scratching floor 2111 that is greater than a height 2119C of the third aviary cage 2121C from the scratching floor 2111. In an embodiment, the height 2119A is substantially equal to the height 2119C. In another embodiment, the height 2119A is not equal to the height 2119C.

In an embodiment, a scratching floor 2111 extends between at least one aviary cage 2121 and the interior surface 2130 of an adjacent exterior wall 2116. In an embodiment, a scratching floor 2111 extends between the first aviary cage 2121A and the second aviary cage 2121B. In an embodiment, a scratching floor 2111 extends between the second aviary cage 2121B and the third aviary cage 2121C. In an embodiment, a scratching floor 2111 extends from the outside surface 2131 of the cage tower 2118.

In an embodiment, the scratching floor 2111 is configured so that a worker can walk across the scratching floor 2111 between the cage towers 2118A and 2118B. In an embodiment, a scratching floor 2111 is configured so that a worker can walk between cage tower 2118A and the respective exterior wall 2116. In an embodiment, the scratching floor 2111 is configured so that a worker can walk across the scratching floor 2111 between the cage towers 2118C and 2118B. In an embodiment, a scratching floor 2111 is configured so that a worker can walk between cage tower 2118C and the respective exterior wall 2116. The scratching floor 2111 serves as a scratching area where hens can move freely, peck the floor with their beaks, and scratch the scratching floor 2111 with their feet. In one embodiment, the scratching floor 2111 is sloped (not shown) toward the respective aviary cage 2121 to allow deposits to move back toward the aviary cage 2121. In an embodiment including a belt 2136 positioned under each aviary cage 2121, the scratching floor 2111 is sloped toward the respective belt 2136 to allow deposits to move back toward the belt 2136.

The first outside surface 2122 of the at least one aviary cage 2121 includes a first perch 2129 extending into the aisle 2120. In an embodiment, each perch 2129 may extend a portion of the length of the at least one cage tower 2118. In an embodiment, each perch 2129 may extend substantially the length of the at least one cage tower 2118. In an embodiment, the interior surface 2130 of the exterior wall 2116 includes a second perch 2129D extending into the aisle 2120. In an embodiment, each perch 2129D may extend a portion of the length of the interior surface 2130 of the exterior wall 2116 of the aviary 2110. In an embodiment, each perch 2129D may extend substantially the length of the interior surface 2130 of the exterior wall 2116.

Referring to an embodiment, a first perch 2129A extends from the first outside surface 2122A of the first aviary cage 2121A and is positioned above a first egg conveyor 2128A that extends from the first outside surface 2122A and that extends substantially the length of the first cage tower 2118A. When the hens lay their eggs, the eggs may be collected in the first egg conveyor 2128A. The first egg conveyor 2128A carries the eggs from the aviary cage 2121A to a collection area. The first perch 2129A extends into the aisle 2120 at a first vertical distance 2123 from the scratching floor 2111. A second perch 2129B extends from the second outside surface 2122B of the second aviary cage 2121B and is positioned above a second egg conveyor 2128B that extends from the second outside surface 2122B and that extends substantially the length of the second cage tower 2118B. The second egg conveyor 2128B carries the eggs from the aviary cage 2121B to a collection area. The second perch 2129B extends into the aisle 2120 at a second vertical distance 2125 from the scratching floor 2111. The first vertical distance 2123 is not equal to the second vertical distance 2125.

In an embodiment, the first vertical distance 2123 and the second vertical distance 2125 define a third vertical distance 2127. The third vertical distance 2127 is configured to permit a bird to hop from the first perch 2129A to the second perch 2129B or vice versa. In such an embodiment, the perches 2129A, 2129B are offset as a result of the aviary cages 2121A, 2121B being positioned at different heights. Accordingly, by offsetting the heights 2119A, 2119B of the similar aviary cages 2121A, 2121B the perches 2129A, 2129B become offset.

It will be understood by one of ordinary skill in the art of aviary design that the offset cage and perch design may be replicated for as many cage tower combinations as are desired in an aviary 2110. In each case of an adjacent set of cage towers 2118, the perches 2129 of each cage tower 2118 should be offset from the perches 2129 of the adjacent cage tower 2118 by the third vertical distance 2127 to enable a bird to hop from perch 2129 to perch 2129 through aisle 2120 in a ladder-like manner. It will also be understood by one of ordinary skill that manufacturing, assembly, and installation time may be saved when building aviary 2110 when aviary cage units 2121 are similar to each other. Similar aviary cage units 2121 permit the construction of cage towers 2118 with perches 2129 that are offset in height from perches 2129 on cage towers 2118 that are separated by an aisle 2120 by simply installing the aviary cage unit 2121 in one cage tower 2118 at a height different from the height of installation for an aviary cage unit 2121 in an adjacent cage tower 2118.

In an embodiment, the first cage tower 2118A may include multiple first egg conveyors 2128A, and the second cage tower 2118B may include multiple second egg conveyors 2128B, wherein the first egg conveyors 2128A and the second egg conveyors 2128B are staggered vertically relative to each other along the first and second outside surfaces 2131A, 2131B of the cage towers 2118A, 2118B. In an embodiment, the first cage tower 2118A may include multiple first perches 2129A, and the second cage tower 21181B may include multiple second perches 2129B, wherein the first perches 2129A and the second perches 2129B are staggered vertically relative to each other along the first and second outside surfaces 2131A, 2131B of the cage towers 2118A, 2118B.

When a first perch 2129A and a second perch 2129B are included in an embodiment, the first vertical distance 2123 and the second vertical distance 2125 define a third vertical distance 2127, which third vertical distance is configured to facilitate the behavior of birds to hop from one surface to another and thereby create a ladder effect between the outside surfaces 2122A, 2122B of the aviary cages 2121A, 2121B and, concomitantly, the outside surfaces 2131A, 2131B of the cage towers 2118A, 2118B.

At least one belt 2136 extends through each cage tower 2118 to remove a deposit from at least part of the cage tower 2118. In one embodiment, the belt 2136 extends through each cage 2118 substantially the length of the cage tower 2118. In one embodiment, the belt 2136 extends approximately 400 feet along the length of each cage tower 2118. In one embodiment, the belt 2136 carries deposits from the cage tower 2118 to a collection area (not shown) positioned outside of the cage tower 2118.

A scratching floor 2111 extends between the first aviary cage 2121A and the second aviary cage 2121B. The scratching floor 2111 is oriented with respect to and positioned adjacent to a respective belt 2136. In one embodiment, the scratching floor 2111 is planar with the respective belt 2136. In an embodiment, the scratching floor 2111 is sloped to allow deposits to move back toward the respective belt 2136. When the birds scratch the scratching floor 2111, they scratch much of the deposits made on the scratching floor 2111 onto the belt 2136. Accordingly, since it is common for birds to defecate in a scratching area, the scratching floor 2111 becomes relatively self-cleaning as the hens scratch. The scratching floor 2111 is configured so that the deposits are scratched back to the respective belt 2136. Such configuration reduces the required frequency for cleaning of the aviary 2110. Any eggs laid on the scratching floor 2111 may be directed back toward the belt 2136 by the scratching of the hens. These eggs are then collected from the belt 2136 and removed from the belt 2136.

In one embodiment, the belt 2136 forms a floor of the aviary cage 2121. Accordingly, the birds are allowed to move freely and walk on the belt 2136.

In one embodiment, a method of constructing an aviary 2010 is provided. The method includes positioning a first cage tower 2018A adjacent to a second cage tower 2018B, wherein the first cage tower 2018A includes a first aviary cage 2021A, and the second cage tower 2018B includes a second aviary cage 2021B. In an embodiment, the method may include stacking multiple first aviary cages 2021A on top of one another. In an embodiment, each aviary cage 2021 has a first end 2005 and a second end 2007. In an embodiment, the method may include forming a level in at least one cage tower 2018 by placing at least two aviary cages 2021 in a row, with the first end 2005 of a first aviary cage 2021 adjacent the second end 2007 of a second aviary cage 2021. In an embodiment, each first aviary cage 2021A includes a first outside surface 2022A enclosing an inside area 2013A. In an embodiment, the method may include stacking multiple second aviary cages 2121B on top of one another. In an embodiment, each second aviary cage 2021B includes a second outside surface 2022B enclosing an inside area 2013B. The method may include extending an aisle 2020 between the first aviary cage 2021A and the second aviary cage 2021B. In an embodiment, the method may include positioning the second aviary cage 2021B at a height 2019B from the scratching floor 2011 that is greater than a height 2019A of the first aviary cage 2021A from the scratching floor 2011.

In an embodiment, the method may include extending a scratching floor 2011 from a first aviary cage 2021A through the aisle 2020 to a second aviary cage 2021B. The method may include extending a first perch 2029A from the first outside surface 2022A of the first aviary cage 2021A and into the aisle 2020 at a first vertical distance 2023 from a scratching floor 2011. The method may include extending a second perch 2029B from the second outside surface 2022B of the second aviary cage 2021B and into the aisle 2020 at a second vertical distance 2025 from the scratching floor 2011. In an embodiment, the first vertical distance 2023 and the second vertical distance 2025 define a third vertical distance 2027 in a spaced apart arrangement to accommodate the behavior of birds to hop from one surface to another and thereby create a ladder effect between the outside surfaces 2022A, 2022B of the aviary cages 2021A and 2021B.

Each of the first cage tower 2018A and the second cage tower 2018B may include at least one belt 2136 positioned within the inside area 2013A, 2013B. The method further includes positioning the first perch 2029A and the second perch 2029B adjacent the respective belt 2136. In one embodiment, the respective belt 2136 forms at least one floor of each cage tower 2018A, 2018B. The at least one belt 2136 is configured to remove a deposit from at least part of the respective cage tower 2018A, 2018B. An egg remover 2139 may be positioned at an end of each belt 2136 to remove eggs from the belt 2136. The egg remover 2139 may include at least one brush 2149 to direct material to at least one side 2147 of the belt 2136.

Figure 24:
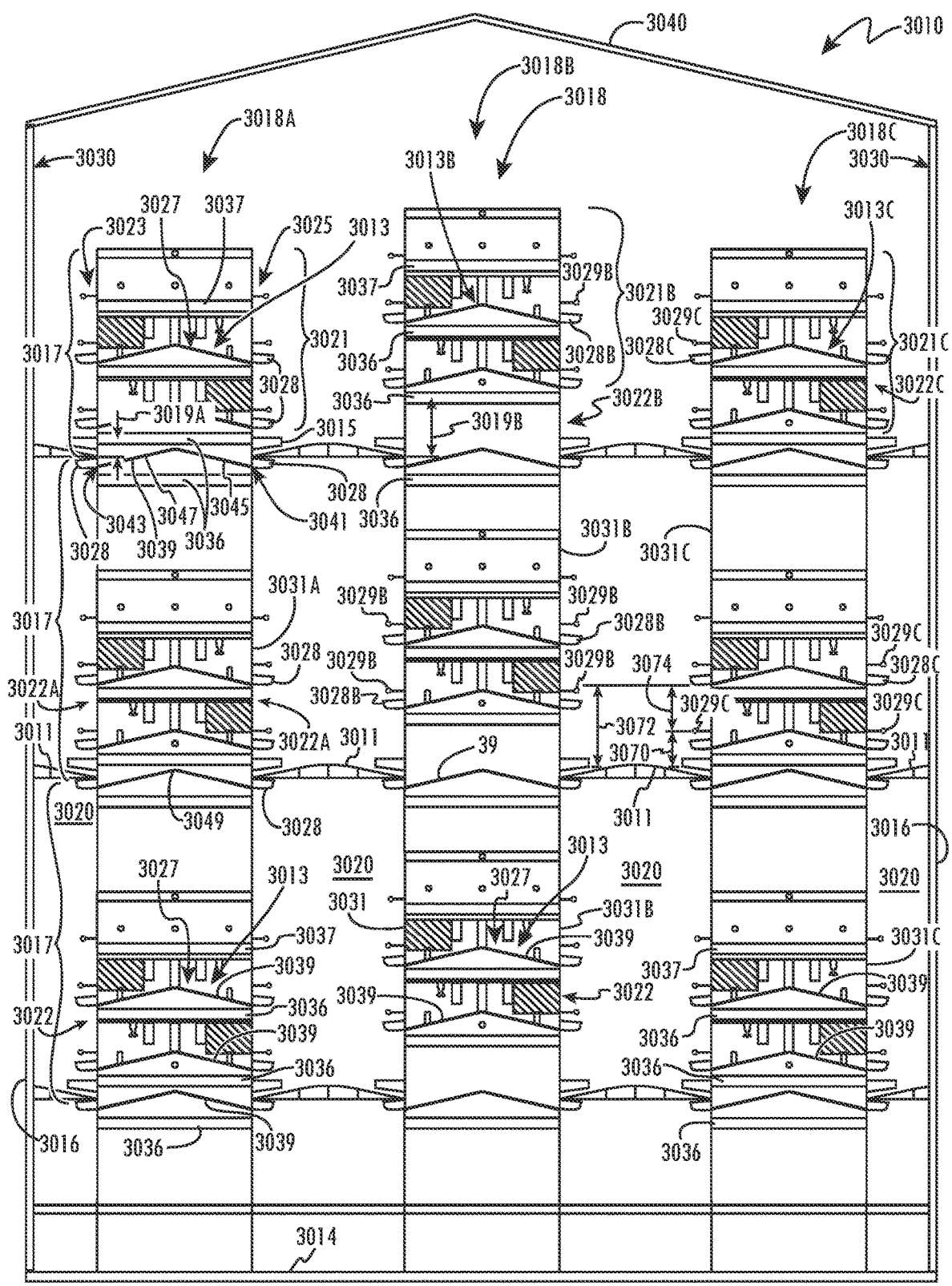
FIG. 24 is a front view of an aviary formed in accordance with another embodiment.

FIG. 24 illustrates an aviary 3010 having a floor 3014, which aviary 3010 is enclosed by exterior walls 3016 and a roof 3040. The exterior walls 3016 define an interior surface 3030. The exterior walls 3016 enclose at least one cage tower 3018 where hens may be caged. Each at least one cage tower 3018 includes an outside surface 3031 enclosing an inside area 3032. In an embodiment having multiple cage towers, an aisle 3020 extends between each cage tower 3018 to provide an inspection area and space in which the birds housed in the aviary 3010 may move. In an embodiment, an aisle 3020 is positioned between a cage tower 3018 and the respective exterior wall 3016. In an embodiment having multiple cage towers, at least one scratching floor 3011 extends between each at least one cage tower 3018. In an embodiment, a scratching floor 3011 extends between the interior surface 3030 of each exterior wall 3016 and the adjacent cage tower 3018.

Figure 25:
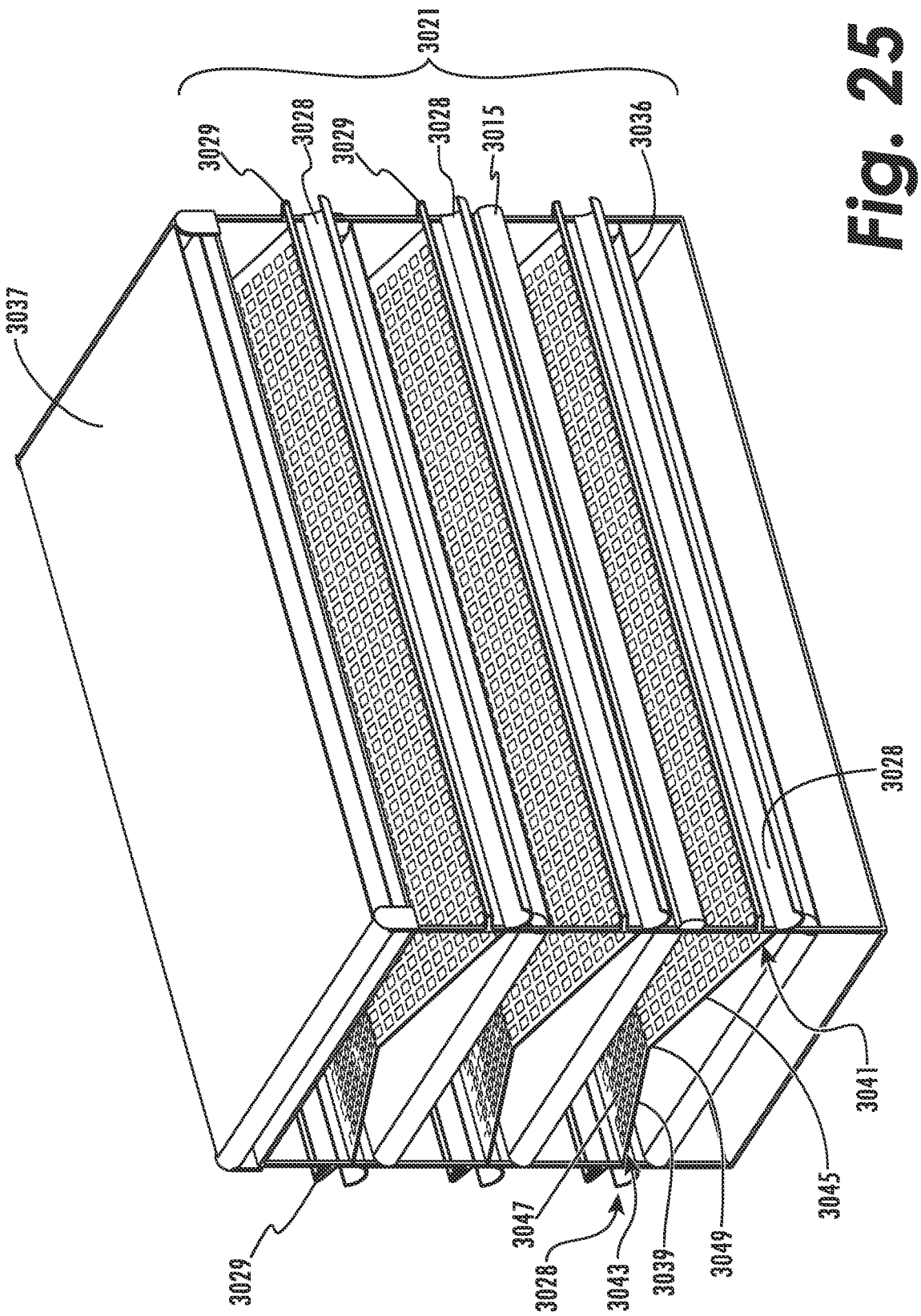
FIG. 25 is a side perspective view of an aviary cage shown in FIG. 24.
Figure 26:
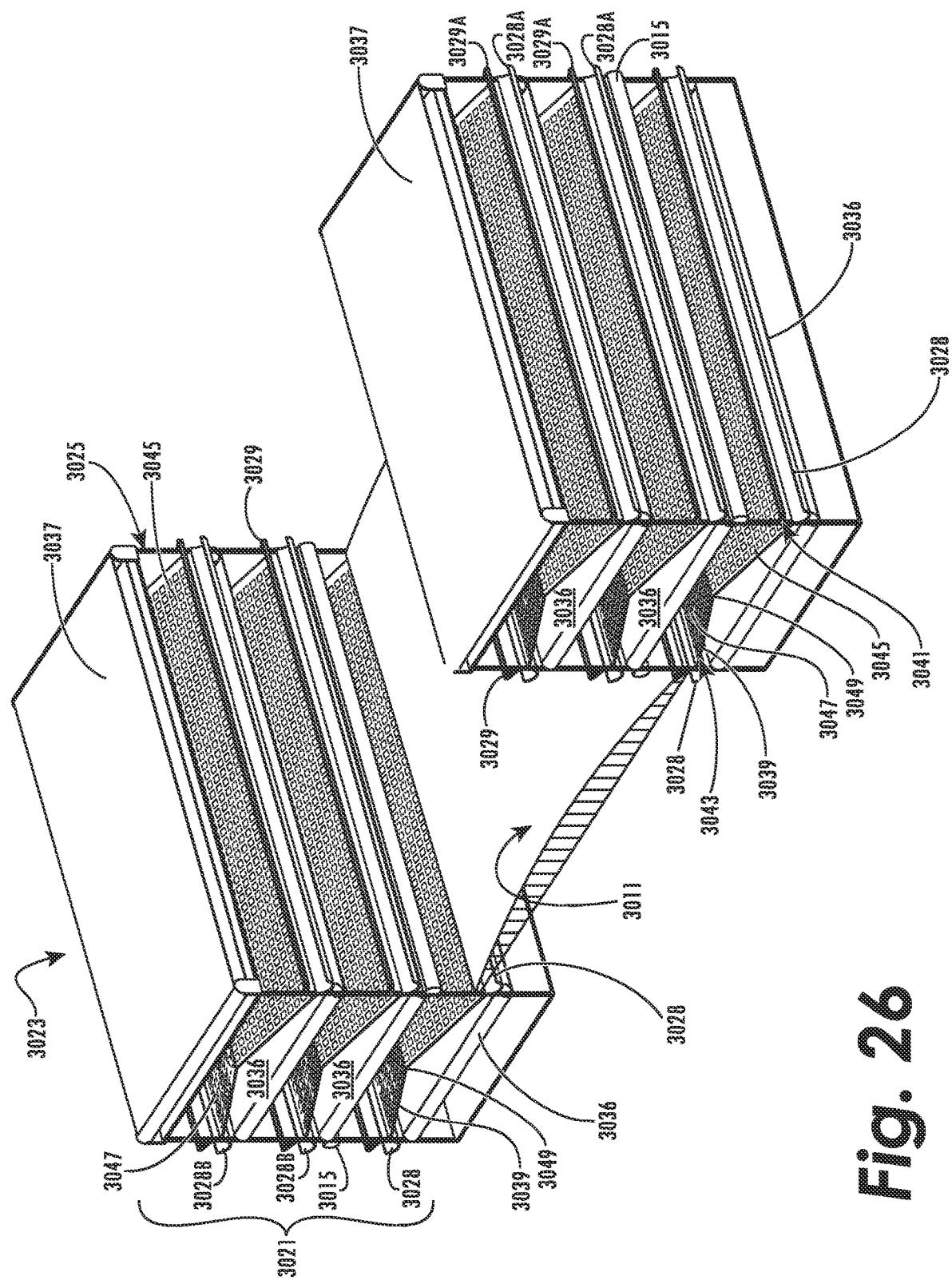
FIG. 26 is a side perspective view of a first aviary cage, a second aviary cage, and a scratching floor shown in FIG. 24.

FIGS. 25 and 26 illustrate at least one aviary cage 3021. Each at least one cage tower 3018 includes at least one aviary cage 3021. Each at least one aviary cage 3021 includes a first side 3025 and a second side 3023 enclosing an inside area 3013. At least one bump rail 3015 extends from each of the first side 3025 and the second side 3023 and into the respective aisle 3020 to allow equipment to be maneuvered through the aisle 3020 without damaging the at least one cage tower 3018 or the at least one aviary cage 3021. The bump rail 3015 may be used by the birds as a perch.

Each aviary cage 3021 includes at least one nesting area 3027. The nesting area 3027 provides space where a hen may sit to lay eggs. As the hens lay their eggs, the eggs are collected in egg conveyors 3028 that extend along the sides 3025 and 3023 of the aviary cage 3021. The egg conveyors 3028 carry the eggs from the nesting area 3027 to a collection area (not shown).

At least one belt 3036 extends through the cage tower 3018 to remove a deposit from at least part of the cage tower 3018. In an embodiment, a plurality of belts 3036 extends through the cage tower 3018 to remove deposits from at least part of the tower 3018. The plurality of belts 3036 are positioned at various vertical locations within each cage tower 3018. At least one belt 3036 of the plurality of belts 3036 is positioned below the nesting area 3027 of each aviary cage 3021. Additional belts 3036 of the plurality of belts 3036 extend through the nesting area 3027 of each aviary cage 3021. In one embodiment, at least one belt 3036 extends through the cage tower 3018 substantially the length of the cage tower 3018. In one embodiment, the belt 3036 extends approximately 400 feet along the length of the cage tower 3018. In one embodiment, the belt 3036 carries manure from the cage tower 3018 to a collection area (not shown) positioned outside of the cage tower 3018.

Figure 27:
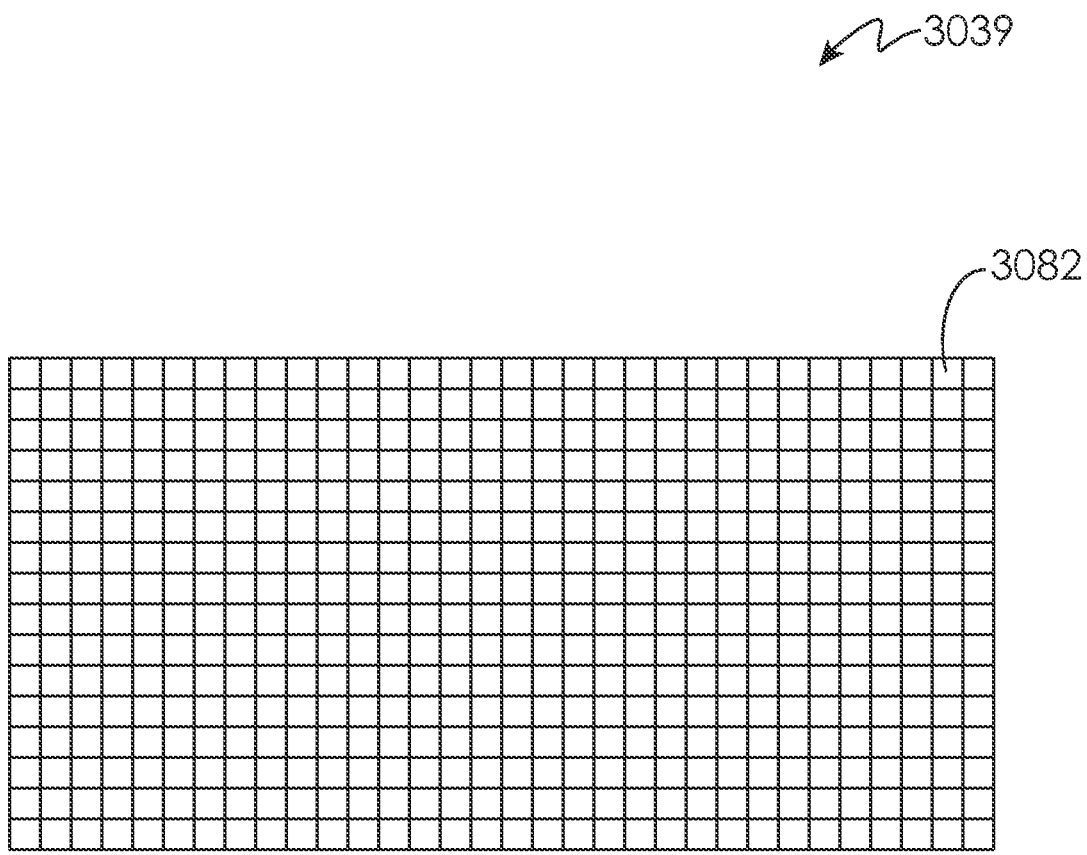
FIG. 27 is a top view of a mesh floor.

In one embodiment, a grate 3039 is positioned over the belt 3036. A portion of the grate 3039 is illustrated in FIG. 27. As illustrated in FIGS. 25-27, the grate 3039 includes openings 3082 therethrough that allow deposits, but not eggs, to pass through the grate 3039 to the belt 3036. The grate 3039 has a first end 3041 and a second end 3043. The first end 3041 extends to the first side 3025 of the aviary cage 3021. The second end 3043 extends to the second side 3023 of the aviary cage 3021. In an embodiment (not shown), the grate 3039 is flat. In an embodiment, the grate 3039 is shaped so that it is sloped toward each end 3041 and 3043. Each end 3041, 3043 of the grate 3039 is positioned adjacent an egg conveyor 3028. The egg conveyors 3028 are adapted to carry eggs from the aviary cage 3021 to a collection area (not shown). In one embodiment, a grate 3039 is positioned over each belt 3036.

In an embodiment, a first portion 3045 of the grate 3039 is angled downward toward an egg conveyor 3028 positioned adjacent the first end 3041 of the grate 3039. In this embodiment, a second portion 3047 of the grate 3039 is angled downward toward an egg conveyor 3028 positioned adjacent the second end 3043 of the grate 3039. In one embodiment, the first portion 3045 and second portion 3047 of the grate 3039 each extend from a centerline 3049 of the grate 3039. In one embodiment, the first portion 3045 and the second portion 3047 are angled from the centerline 3049 at approximately a 7° to 8° angle. Eggs laid on the second portion 3047 of grate 3039 roll to the respective egg conveyor 3028 adjacent the second end 3043 of the grate 3039, which is in the direction of arrow A (shown in FIG. 28). The egg conveyor 3028 carries the eggs to the collection area. Eggs laid on the first portion 3045 of the grate 3039 roll to the respective egg conveyor 3028 adjacent the first end 3041 of the grate 3039. In an embodiment in which the grate 3039 is flat, the hens scratch the eggs to an egg conveyor 3028.

In the illustrated embodiment, a scratching floor 3011 extends between adjacent cage towers 3018. In an embodiment, a scratching floor 3011 extends between the cage tower 3018 and the respective exterior wall 3016. In some embodiments, the scratching floor is solid. The scratching floor 3011 is oriented with respect to at least one belt 3036. In one embodiment, the scratching floor 3011 is oriented with respect to a belt 3036 that extends below the nesting area 3027 of an aviary cage 3021. In one embodiment, the scratching floor 3011 is sloped to allow deposits to move back toward the belt 3036. In one embodiment, the scratching floor 3011 is crowned so that each side of the scratching floor 3011 slopes toward a belt 3036. In particular, in the crowned scratching floor embodiment, the scratching floor 3011 is sloped toward the grate 3039. In one embodiment (not shown), the scratching floor 3011 is flat. In an embodiment, the ends 3041 and 3043 of the grate 3039 are positioned below the scratching floor 3011 so that the egg conveyors 3028 extend below the scratching floor 3011.

The scratching floor 3011 provides a pecking area for the hens to utilize while they are not nesting. In particular, the scratching floor 3011 provides a scratching area for birds within the aviary 3010. When the birds scratch the scratching floor 3011, they scratch much of the deposits made on the scratching floor 3011 onto the respective belt 3036. Accordingly, since it is common for birds to defecate in a scratching area, the scratching floor 3011 becomes relatively self-cleaning as the hens scratch.

Figure 28:
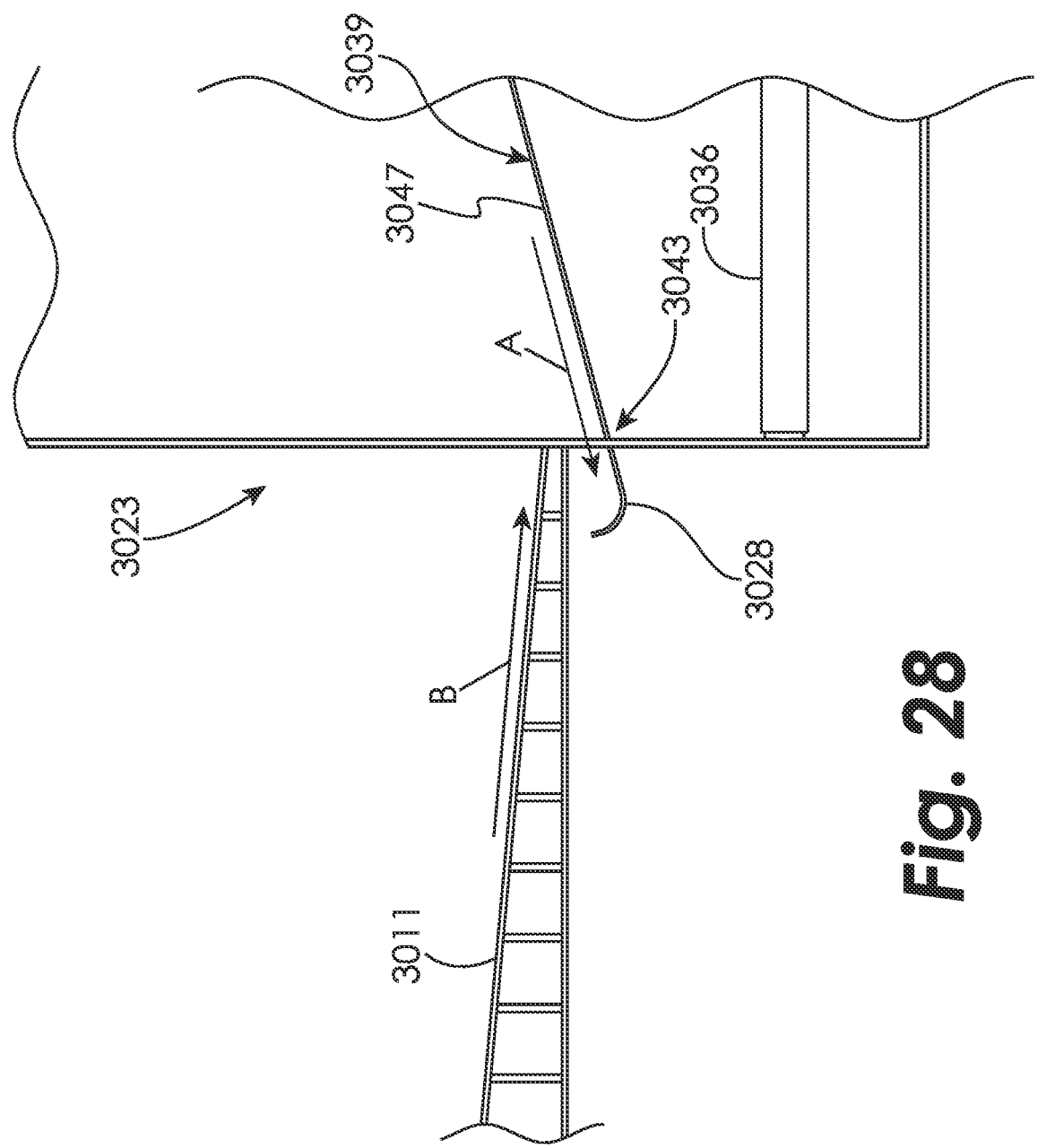
FIG. 28 is an expanded view of a scratching floor, a grate, a side of an aviary cage, and a belt formed in accordance with an embodiment.

Particularly, by way of example, deposits may be scratched from the scratching floor 3011 in the direction of arrow B (shown in FIG. 28) toward the grate 3039. Deposits may be scratched toward a grate 3039 from either direction on the scratching floor 3011. The deposits small enough to pass through the openings 3082 in the grate 3039 then pass through those openings 3082 and onto the belt 3036, from which they are removed from the aviary 3010. Such configuration greatly reduces the amount of ammonia captured within the aviary 3010 and also reduces the required frequency for cleaning of the aviary 3010. Those of skill in the art will appreciate that, while FIG. 28 illustrates the movement of a deposit toward the second end 3043 of the grate 3039, a mirror image of the movement of a deposit toward the first end 3041 of the grate 3039 may occur when a deposit is made on the first portion 3045 of the grate 3039 or on the scratching floor 3011 and scratched back toward the first end 3041 of the grate 3039.

Any eggs laid on the scratching floor 3011 are directed toward an egg conveyor 3028 by the scratching of the hens. By way of example and not of limitation, eggs laid on the scratching floor 3011 illustrated in FIG. 28 may be scratched in the direction of arrow B toward the grate 3039. Eggs may be scratched toward a grate 3039 from either direction on the scratching floor 3011. Upon reaching the grate 3039, the eggs roll or are scratched toward the respective egg conveyor 3028, such as, for example, in the direction of arrow A along the grate 3039, under the scratching floor 3011, and into the egg conveyor 3028. In an embodiment (not shown), eggs laid on a flat scratching floor 3011 are rolled by the scratching of the hens toward the grate 3039 and, upon reaching the grate 3039, are scratched by the hens into the egg conveyor 3028.

In the illustrated embodiment, a first cage tower 3018A includes a first aviary cage 3021A, and a second cage tower 3018B includes a second aviary cage 3021B, which second aviary cage 3021B is similar to the first aviary cage 3021A. A third cage tower 3018C includes a third aviary cage 3021C, which third aviary cage 3021C is similar to the first aviary cage 3021A and the second aviary cage 3021B. In an embodiment, multiple first aviary cages 3021A are stacked on top of one another. In an embodiment, each first aviary cage 3021A has a first outside surface 3022A enclosing an inside area 3013A. In an embodiment, multiple second aviary cages 3021B are stacked on top of one another. In an embodiment, each second aviary cage 3021B includes a second outside surface 3022B enclosing an inside area 3013B. In an embodiment, multiple third aviary cages 3021C are stacked on top of one another. In an embodiment, each third aviary cage 3021C includes a third outside surface 3022C enclosing an inside area 3013C. The second aviary cage 3021B is positioned adjacent the first aviary cage 3021A and an aisle 3020 is formed therebetween. The second aviary cage 3021B is also positioned adjacent the third aviary cage 3021C and an aisle 3020 is formed therebetween. The second aviary cage 3021B is positioned at a height 3019B from the grate 3039. The first aviary cage 3021A is positioned at a height 3019A from the scratching floor 3011. Height 3019B is greater than height 3019A.

Referring to an embodiment, a first perch 3029A extends from the first outside surface 3031A of the first cage tower 3018A and is positioned above a first egg conveyor 3028A that extends from the first outside surface 3031A along the sides 3025 and 3023 of the aviary cage 3021A. The first egg conveyor 3028A extends substantially the length of the first cage tower 3018A. When the hens lay their eggs, the eggs may be collected in the first egg conveyor 3028A. The first egg conveyor 3028A carries the eggs from the aviary cage 3021A to a collection area (not shown). The first perch 3029A extends into the aisle 3020 at a first vertical distance 3070 from the scratching floor 3011. A second perch 3029B extends from the second outside surface 3031B of the second cage tower 3018B and is positioned above a second egg conveyor 3028B that extends from the second outside surface 3031B along the sides 3025 and 3023 of the aviary cage 3021B. The second egg conveyor 3028B extends substantially the length of the second cage tower 3018B. The second egg conveyor 3028B carries the eggs from the aviary cage 3021B to a collection area (not shown). The second perch 3029B extends into the aisle 3020 at a second vertical distance 3072 from the scratching floor 3011. The first vertical distance 3070 is not equal to the second vertical distance 3072. In an embodiment, the first vertical distance 3070 and the second vertical distance 3072 define a third vertical distance 3074. The third vertical distance 3074 is configured to permit a bird to hop from the first perch 3029A to the second perch 3029B or vice versa.

In an embodiment, the first cage tower 3018A may include multiple first perches 3029A, corresponding to the number of first egg conveyors 3028A, and the second cage tower 3018B may include multiple second perches 3029B, corresponding to the number of second egg conveyors 3028B, wherein the first perches 3029A and the second perches 3029B are staggered in relation to each other along the first and second outside surfaces 3031A, 3031B of the cage towers 3018A, 3018B. In one embodiment, the first perches 3029A and the second perches 3029B are staggered vertically on the first and second outside surfaces 3031A, 3031B of the cage towers 3018A, 3018B. In one embodiment, the first perches 3029A and the second perches 3029B are staggered horizontally along the first and second outside surfaces 3031A, 3031B of the cage towers 3018A, 3018B. In one embodiment, the first perches 3029A and the second perches 3029B are staggered vertically and horizontally on the first and second outside surfaces 3031A, 3031B of the cage towers 3018A, 3018B.

In the illustrated embodiments, the scratching floors 3011 form three levels 3017 in the aviary 3010, wherein each level 3017 may be accessed by a worker. A hen may walk, peck, scratch, socialize, sleep, and lay eggs, as the bird desires in the inside areas 3013, 3032. These same daily activities can be carried out on the at least one scratching floor 3011. The at least one aviary cage 3021 may house a specific group of birds or it may be open to birds from other aviary cages 3021. In an embodiment, the cage tower 3018 may be configured to allow the birds to move freely up and down the cage tower 3018. In an embodiment, the cage tower 3018 may be configured to keep birds in the aviary segregated by vertical level 3017. When the hens lay their eggs, the eggs may be collected in egg conveyors 3028 that extend along the sides of the aviary cage 3021. The egg conveyors 3028 carry the eggs from the aviary cage 3021 to a collection area.

When a first perch 3029A and a second perch 3029B are included in an embodiment, the first vertical distance 3070 and the second vertical distance 3072 define a third vertical distance 3074, which third vertical distance 3074 is configured to facilitate the behavior of birds to hop from one surface to another and thereby create a ladder effect between the outside surfaces 3022A, 3022B of the aviary cages 3021A, 3021B and, concomitantly, outside surfaces 3031A, 3031B of the cage towers 3018A, 3018B.

In one embodiment, a method of forming an aviary 3010 including an aviary cage 3021 having a first side 3025, a second side 3023, and a nesting area 3027 is provided. The method includes positioning the nesting area 3027 between the first side 3025 and the second side 3023 and extending a belt 3036 through the nesting area 3027. A grate 3039 is positioned over the belt 3036 so that a first end 3041 of the grate 3039 extends to the first side 3025 of the aviary cage 3021, and a second end 3043 of the grate 3039 extends to a second side 3023 of the aviary cage 3021. A first egg conveyor 3028 is positioned at the first end 3041 of the grate 3039, and a second egg conveyor 3028 is positioned at the second end 3043 of the grate 3039.

In one embodiment, the grate 3039 is flat. In one embodiment, a first portion 3045 of the grate 3039 is angled downward toward the egg conveyor 3028 on side 3025 of aviary cage 3021, and a second portion 3047 of the grate 3039 is angled downward toward the egg conveyor 3028 on side 3023 of aviary cage 3021. In one embodiment, the belt 3036 is positioned to capture and transport debris that falls through the grate 3039. In one embodiment, a scratching floor 3011 is extended from the aviary cage 3021 adjacent to the grate 3039. In one embodiment, the scratching floor 3011 is sloped toward the grate 3039 to facilitate movement of a deposit on the scratching floor 3011 to the grate 3039. In one embodiment, the scratching floor 3011 is a solid floor. In one embodiment, a belt 3037 is extended above the aviary cage 3021. The belt 3037 is positioned to capture and transport deposits that fall onto it. Birds are allowed to move freely and walk on the belt 3037.

In an embodiment (not shown), the cage tower 3018 includes the belts 3036 without the grates 3039. In such an embodiment, the belts 3036, 3037 carry deposits from the cage tower 3018, as described previously. In particular, deposits may be scratched onto the belts 3036 from the scratching floor 3011. In one embodiment, eggs are laid directly on the belts 3036, 3037 and the birds walk on the moving belts 3036, 3037.

In one embodiment, a first aviary cage 3021A and a second aviary cage 3021B are provided and are positioned adjacent each other. In such an embodiment, the method includes extending an aisle 3020 between the first aviary cage 3021A and the second aviary cage 3021B. A first perch 3029A is extended from the first aviary cage 3021A and into the aisle 3020 at a first vertical distance 3070 from a scratching floor 3011. A second perch 3029B is extended from the second aviary cage 3021B and into the aisle 3020 at a second vertical distance 3072 from the scratching floor 3011. The first and second vertical distances 3070, 3072 from the scratching floor 3011 are not equal.

In one embodiment, the aviary 3010 includes a plurality of first perches 3029A and a plurality of second perches 3029B. The method in this embodiment includes horizontally offsetting the plurality of first perches 3029A from one another and horizontally offsetting the plurality of second perches 3029B from one another. In one embodiment, the aviary 3010 includes a plurality of first perches 3029A and a plurality of second perches 3029B, and the method includes vertically offsetting the plurality of first perches 3029A from one another and vertically offsetting the plurality of second perches 3029B from one another. In one embodiment, the first vertical distance 3070 and the second vertical distance 3072 define a third vertical distance 3074. The third vertical distance 3074 enables an animal to hop between the first perch 3029A and the second perch 3029B or vice versa. In such an embodiment, the perches 3029A, 3029B are offset as a result of the aviary cages 3021A, 3021B being positioned at different heights. Accordingly, by offsetting the heights 3019A, 3019B of the similar aviary cages 3021A, 3021B the perches 3029A, 3029B become offset.

It will be understood by one of ordinary skill in the art of aviary design that the offset cage and perch design may be replicated for as many cage tower combinations as are desired in an aviary 3010. In each case of an adjacent set of cage towers 3018, the perches 3029 of each cage tower 3018 should be offset from the perches 3029 of the adjacent cage tower 3018 by the third vertical distance 3027 to enable a bird to hop from perch 3029 to perch 3029 through aisle 3020 in a ladder-like manner. It will also be understood by one of ordinary skill that manufacturing, assembly, and installation time may be saved when building aviary 3010 when aviary cage units 3021 are similar to each other. Similar aviary cage units 3021 permit the construction of cage towers 3018 with perches 3029 that are offset in height from perches 3029 on cage towers 3018 that are separated by an aisle 3020 by simply installing the aviary cage unit 3021 in one cage tower 3018 at a height different from the height of installation for an aviary cage unit 3021 in an adjacent cage tower 3018.

Figure 29:
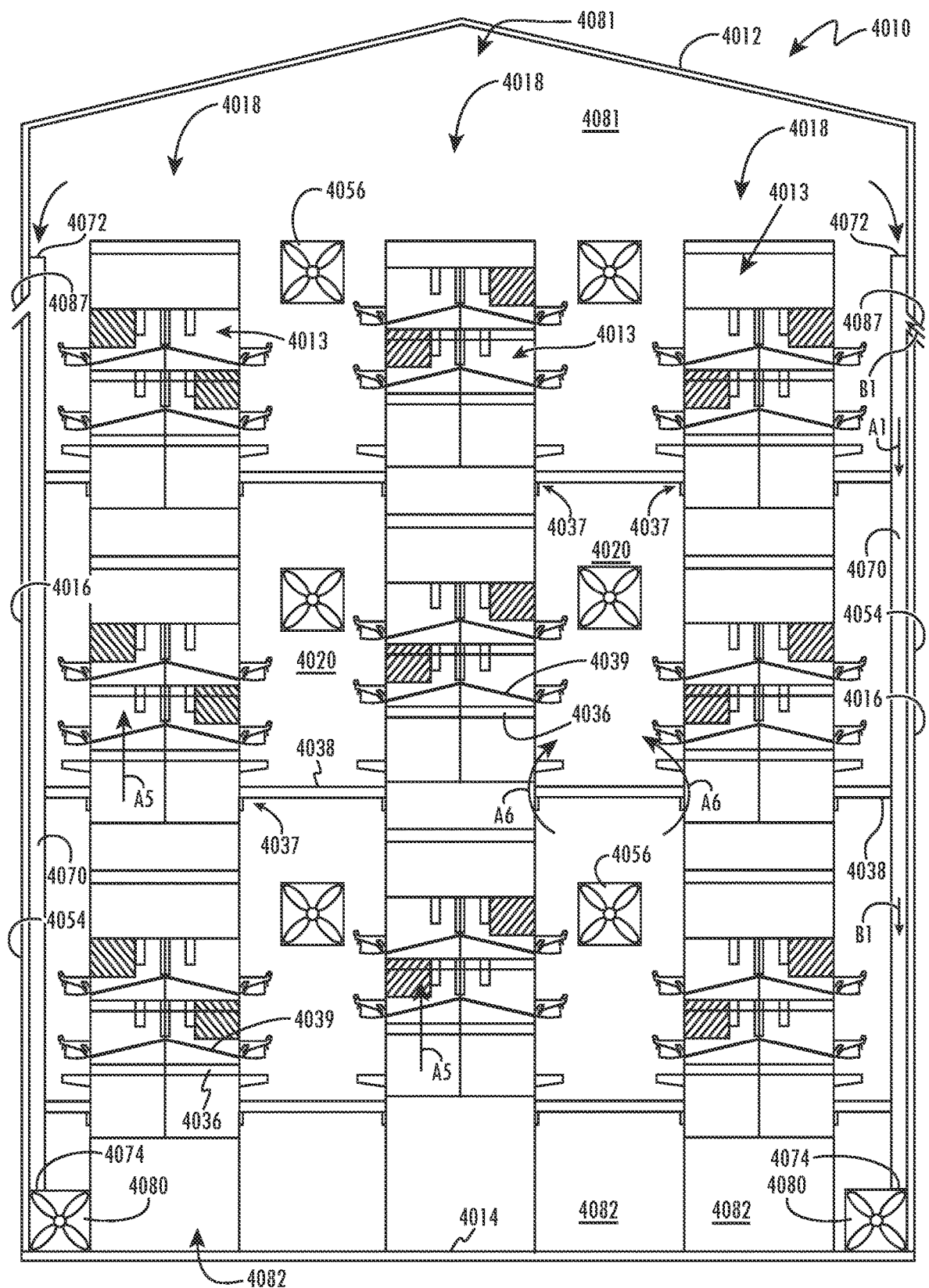
FIG. 29 is a front view of an aviary formed in accordance with an embodiment and having an end wall removed.
Figure 30:
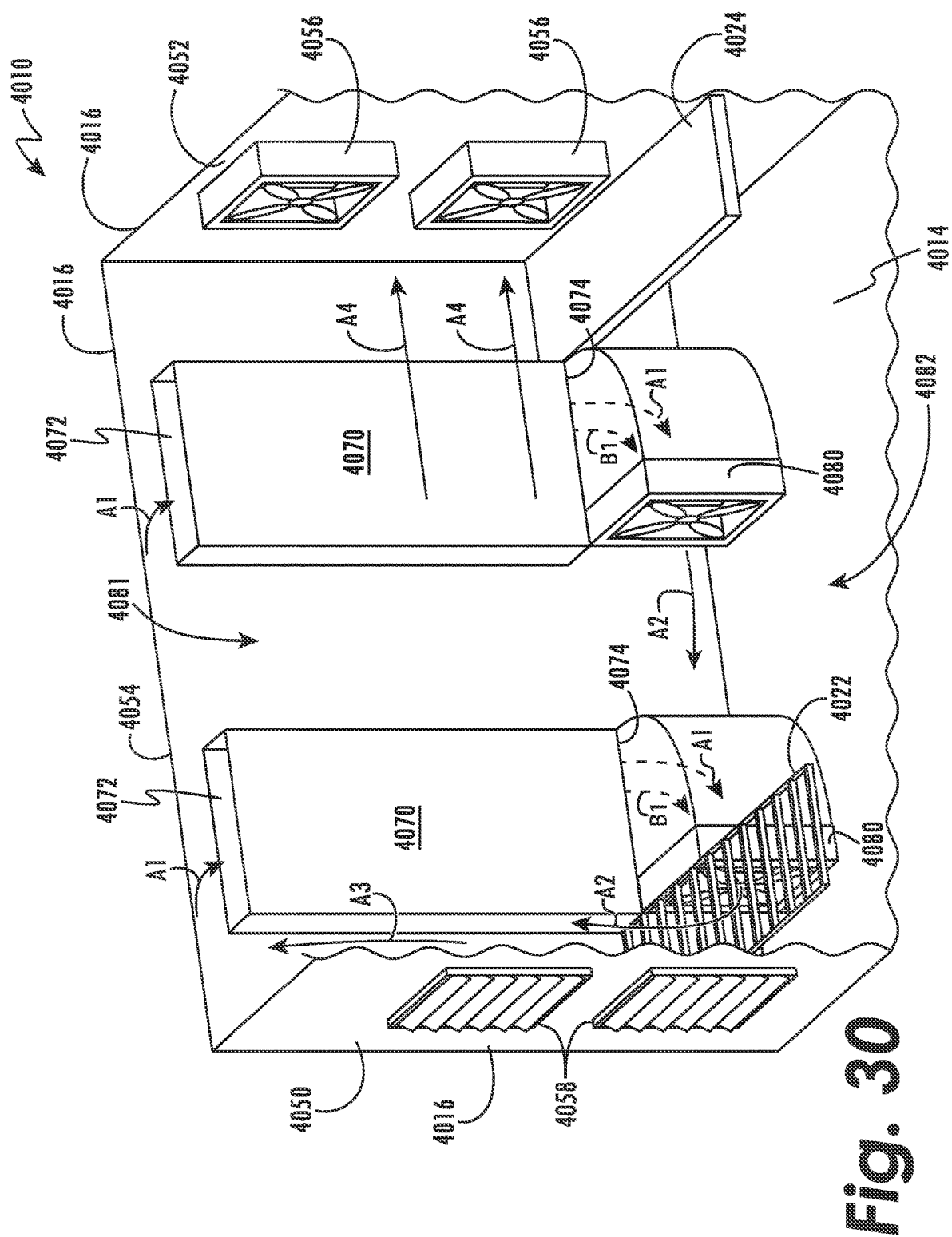
FIG. 30 is a perspective view of an aviary, without cage towers illustrated.

FIGS. 29 and 30 illustrate an aviary 4010 configured to house hens for egg production. It should be noted that the system and method described in FIGS. 29-32 may be utilized with any of the embodiments described in FIGS. 1-28 and the foregoing description. The aviary 4010 includes a floor 4014, exterior walls 4016, and a roof 4012. At least one cage tower 4018 where hens may be caged is disposed within the aviary 4010. Although the present embodiment illustrates three cage towers 4018, it should be noted that the aviary 4010 may be constructed with any number of cage towers 4018, including a single cage tower 4018. In an embodiment having more than one cage tower 4018, an open space 4020 extends between adjacent cage towers 4018 to provide an inspection area and to facilitate airflow through the aviary 4010. In an embodiment having a single cage tower 4018, an open space 4020 is present on at least one side of the cage tower 4018. In an embodiment, an open space 4020 may be positioned between a cage tower 4018 and one or more respective exterior walls 4016. The open space 4020 may include a scratching floor 4038 serving as a pecking area where hens can move freely, peck the floor with their beaks, and scratch the floor with their feet.

Each cage tower 4018 includes at least one inside area 4013 within the cage tower 4018. In an embodiment, the inside area 4013 includes at least one grate 4039 and at least one manure belt 4036 disposed below the at least one grate 4039. The grate 4039 enables the hens to move freely throughout the inside area 4013 of the cage tower 4018. In an embodiment, the grate 4039 includes openings therein that allow deposits to fall through the grate 4039 onto a respective belt 4036. The belt 4036 removes the deposits from the cage tower 4018. In an embodiment, the openings in the grate 4039 allow air to flow through the inside area 4013 of the cage tower 4018 to facilitate drying of manure and maintain poultry health through the concomitant temperature regulation and removal of harmful gases.

In an embodiment, a scratching floor 4038 extends from the cage tower 4018. In an embodiment, the scratching floor 4038 is solid. In an embodiment having more than one cage tower 4018, a scratching floor 4038 may extend between any adjacent cage towers 4018. In an embodiment, a scratching floor 4038 may extend between the cage tower 4018 and one or more respective exterior walls 4016. In an embodiment having more than two cage towers 4018, a scratching floor may extend from adjacent cage towers 4018 but not be continuous between adjacent cage towers 4018. In an embodiment, the scratching floor 4038 is disposed adjacent openings 4037 adjacent the cage tower 4018 that allow air to flow through the aviary 4010.

The exterior walls 4016 of the aviary include a front wall 4050, a back wall 4052, and at least two side walls 4054. In an embodiment, at least one first fan 4056 is positioned in the back wall 4052 in air communication with the aviary 4010 and the outside (not shown). In an embodiment, at least one vent 4058 is positioned in the front wall 4050 in air communication with the aviary 4010 and the outside (not shown). When the outside air temperature is high enough that bird health will not be risked if the unconditioned outside air is permitted to enter the aviary 4010 directly through the at least one vent 4058, the at least one vent 4058 is opened and the at least one first fan 4056 is operated so that the at least one first fan 4056 draws air from outside the aviary 4010 into the aviary 4010 through the at least one vent 4058. In an embodiment, the air in the aviary 4010 is drawn through and around the cage tower 4018 and toward the back wall 4052 of the aviary 4010. The at least one first fan 4056 discharges air from the aviary 4010 to outside the aviary 4010.

At least one plenum 4070 is disposed on at least one of the at least two side walls 4054. In an embodiment, at least one plenum 4070 is disposed in each of the at least two side walls 4054. In an embodiment, a plurality of plenums 4070 is spaced along at least one of the at least two side walls 4054. In an embodiment, a plurality of plenums 4070 is equally spaced along the at least two side walls 4054. In an embodiment, the at least one plenum 4070 is disposed on the back wall 4052. In an embodiment, a plurality of plenums 4070 is spaced to maximize air circulation through the aviary 4010. In an embodiment, each plenum in the plurality of plenums 4070 has the same width, depth, and length. In an embodiment, the width, depth, and length of each plenum in the plurality of plenums 4070 is selected to maximize air circulation through the aviary 4010.

In an embodiment, at least one grated floor 4022 extends from the front wall 4050 to the at least one cage tower 4018. The at least one grated floor 4022 is positioned adjacent to the at least one vent 4058. Although FIG. 30 illustrates only one grated floor 4022, the aviary 4010 may be constructed with any number of grated floors 4022. In an embodiment, the number of grated floors 4022 corresponds to a number of vertical levels of aviary cages in the at least one cage tower 4018. In an embodiment, the at least one grated floor 4022 is configured to allow airflow therethrough. In an embodiment, at least one solid floor 4024 extends from the back wall 4052 to the at least one cage tower 4018. In an embodiment, the at least one solid floor 4024 is positioned adjacent the at least one first fan 4056. Although FIG. 30 illustrates only one solid floor 4024, the aviary 4010 may be constructed with any number of solid floors 4024. In an embodiment, the number of solid floors 4024 corresponds to a number of vertical levels of aviary cages in the at least one cage tower 4018. In an embodiment, the solid floor 4024 is configured to prevent airflow therethrough.

Although the present embodiments are described with respect to the at least first fan 4056 being positioned in the back wall 4052, the at least one vent 4058 being positioned in the front wall 4050, and the at least one plenum 4070 being formed in the side walls 4054, it should be appreciated that other embodiments may include configurations wherein the at least one first fan 4056, the at least one vent 4058, and the at least one plenum 4070 may be positioned or formed on or in other exterior walls 4016.

The at least one plenum 4070 includes a top opening 4072 and a bottom opening 4074. In an embodiment, the top opening 4072 is positioned adjacent to a top space 4081 of the aviary 4010 that is adjacent to the roof 4012. In an embodiment, the bottom opening 4074 is positioned adjacent the floor 4014 of the aviary 4010. In the illustrated embodiment, the bottom opening 4074 is positioned below the lowest scratching floor 4038 extending between the cage tower 4018 and the respective exterior wall 4016. At least one second fan 4080 is positioned in flow communication with the at least one plenum 4070. In an embodiment, at least one second fan 4080 is positioned adjacent the bottom opening 4074 of the plenum 4070. In an embodiment (not shown), the at least one second fan 4080 is spaced from the bottom opening 4074 of the plenum 4070. In an embodiment (not shown), at least one second fan 4080 is positioned adjacent the top opening 4072 of the plenum 4070. In an embodiment (not shown), the at least one second fan 4080 is spaced from the top opening 4072 of the plenum 4070. In an embodiment, the at least one second fan 4080 is positioned within the plenum 4070. In an embodiment, the bottom opening 4074 of the plenum 4070 is connected to the second fan 4080. In an embodiment, the top opening 4072 of the plenum 4070 is connected to the second fan 4080. In an embodiment, at least one second plenum (not shown) connects the at least one plenum 4070 and the at least one second fan 4080. In an embodiment, the at least one second fan 4080 is positioned below the lowest scratching floor 4038. In an embodiment, the at least one second fan 4080 is oriented to facilitate airflow in a direction parallel to the at least two side walls 4054, which direction is shown in FIG. 30 by arrows A2.

The at least one plenum 4070 is configured to circulate warm air from the top space 4081 of the aviary 4010 to a bottom space 4082 of the aviary 4010 when desired to maintain poultry health. As used herein, "warm" air is defined by air that is warmer than a temperature of air outside the aviary 4010. In an embodiment, the at least one vent 4058 is closed when the at least one second fan 4080 is operating. In an embodiment, the at least one second fan 4080 draws air A through the top opening 4072 of the plenum 4070 to the bottom opening 4074 of the plenum 4070, as illustrated in FIG. 30 with arrows A1. In an embodiment, fresh outside air B is drawn through a fresh air vent 4087 in air communication with the plenum 4070 and the environment outside the aviary 4010, as illustrated in FIG. 30 with arrows B1. In an embodiment, the fresh outside air B mixes with the warm air A in the plenum 4070. In an embodiment, the fresh air vent 4087 may be closed so that only warm air A flows through the plenum 4070. In an embodiment, the top opening 4072 of the plenum 4070 may be closed so that only fresh outside air B flows through the plenum 4070.

In an embodiment, the air in the plenum 4070 is discharged by the at least one second fan 4080 toward the front wall 4050 of the aviary 4010, as illustrated in FIG. 30 by arrows A2. Because the at least one vent 4058 is closed, the air flowing in direction A2 hits the front wall 4050 and rises through the aviary 4010, as illustrated in FIG. 30 by arrow A3. In an embodiment, the air circulates upward through the at least one grated floor 4022. In an embodiment, the at least one first fan 4056 operates to draw the air through the at least one cage tower 4018 and open space 4020 toward the back wall 4052, as illustrated in FIG. 30 with arrows A4. In an embodiment, the air circulates through the at least one cage tower 4018 toward the top space 4081, as illustrated in FIG. 29 with arrows A5. In an embodiment, the air circulates upward through a spaced defined between the at least one scratching floor 4038 and the at least one cage tower 4018, as illustrated in FIG. 29 with arrows A6. In an embodiment, the air circulates around the at least one belt 4036. In an embodiment, as the air reaches the top space 4081 of the aviary 4010, it may be drawn back through the plenum 4070. In an embodiment, the air is drawn through the inside area 4013 of the at least one cage tower 4018 toward the back wall 4052, as illustrated in FIG. 30 by arrows A4. Air near the back wall 4052 of the aviary 4010 may be discharged through the at least one first fan 4056.

In an embodiment, the at least one first fan 4056 is disposed above the bottom space 4082 of the aviary 4010 and above the at least one solid floor 4024. In this embodiment, the at least one solid floor 4024 prevents the second fan 4080 from competing with the first fan 4056 for control of the airflow in the aviary 4010. That is, air discharged by the at least one first fan 4056 in this embodiment is relatively unaffected by the operation of the at least one second fan 4080 because the solid floor 4024 separates the air flow generated by each of the at least one first fan 4056 and the at least one second fan 4080. Those of skill in the art will recognize that the combination of at least one grated floor 4022 and at least one solid floor 4024 facilitates airflow in opposing directions A2 and A4 and prevents the action of the at least one first fan 4056 from overwhelming the action of the at least one second fan 4080 or vice versa.

By permitting warm air to rise from the floor 4014 through the cage tower 4018 and open space 4020 and up to the top space 4081 of the aviary 4010, lower fan speeds may be utilized since the air moves through natural convection in addition to forced air. The lower fan speeds provide lower noise and lower energy consumption within the aviary 4010. In an embodiment, the ventilation system described herein moves air around the at least one belt 4036 to assist in the drying of manure, thereby providing cost savings since drier manure takes less energy to dry out completely for storage, disposal, and/or sale. Additionally, the circulation of air through the aviary 4010 may reduce ammonia levels within the aviary 4010, thereby improving bird health within the aviary 4010. The circulation of air throughout the aviary reduces and may eliminate cold spots within the aviary 4010. "Cold" in the context of "cold spots" refers to any air temperature that is low enough to cause stress to the poultry. By reducing cold spots within the aviary 4010, the birds are less likely to huddle together to keep warm. As such, the circulation of air through the aviary 4010 may reduce overcrowding within the aviary 4010 due to stress.

In an embodiment, airflow throughout the aviary 4010 may be manually controlled. In an embodiment, airflow throughout the aviary 4010 may be controlled by means of automated controls. In an embodiment, airflow throughout the aviary 4010 may be controlled remotely. In an embodiment, one or more sensors (not shown) may be disposed adjacent the at least one plenum 4070 to monitor one or more conditions, including but not limited to conditions of a temperature and/or a humidity, of the air in the at least one plenum 4070. In an embodiment, the sensor senses a condition that initiates operation of the at least one second fan 4080. In an embodiment, the sensor senses a condition that increases the speed of the at least one second fan 4080. In an embodiment, the sensor senses a condition that decreases the speed of the at least one second fan 4080.

In an embodiment, one or more gates (not shown) may be disposed adjacent the at least one plenum 4070. In an embodiment, the sensor senses a condition that opens a fresh air gate in the fresh air vent 4087 to permit outside air B to enter the plenum 4070. In an embodiment, the sensor senses a condition that closes a fresh air gate in the fresh air vent 4087 to prevent outside air B from entering the plenum 4070. In an embodiment, the sensor senses a condition that opens a gate in the plenum 4070 to permit air A to enter the plenum 4070. In an embodiment, the sensor senses a condition that closes a gate in the plenum 4070 to prevent air A from entering the plenum 4070.

Figure 31:
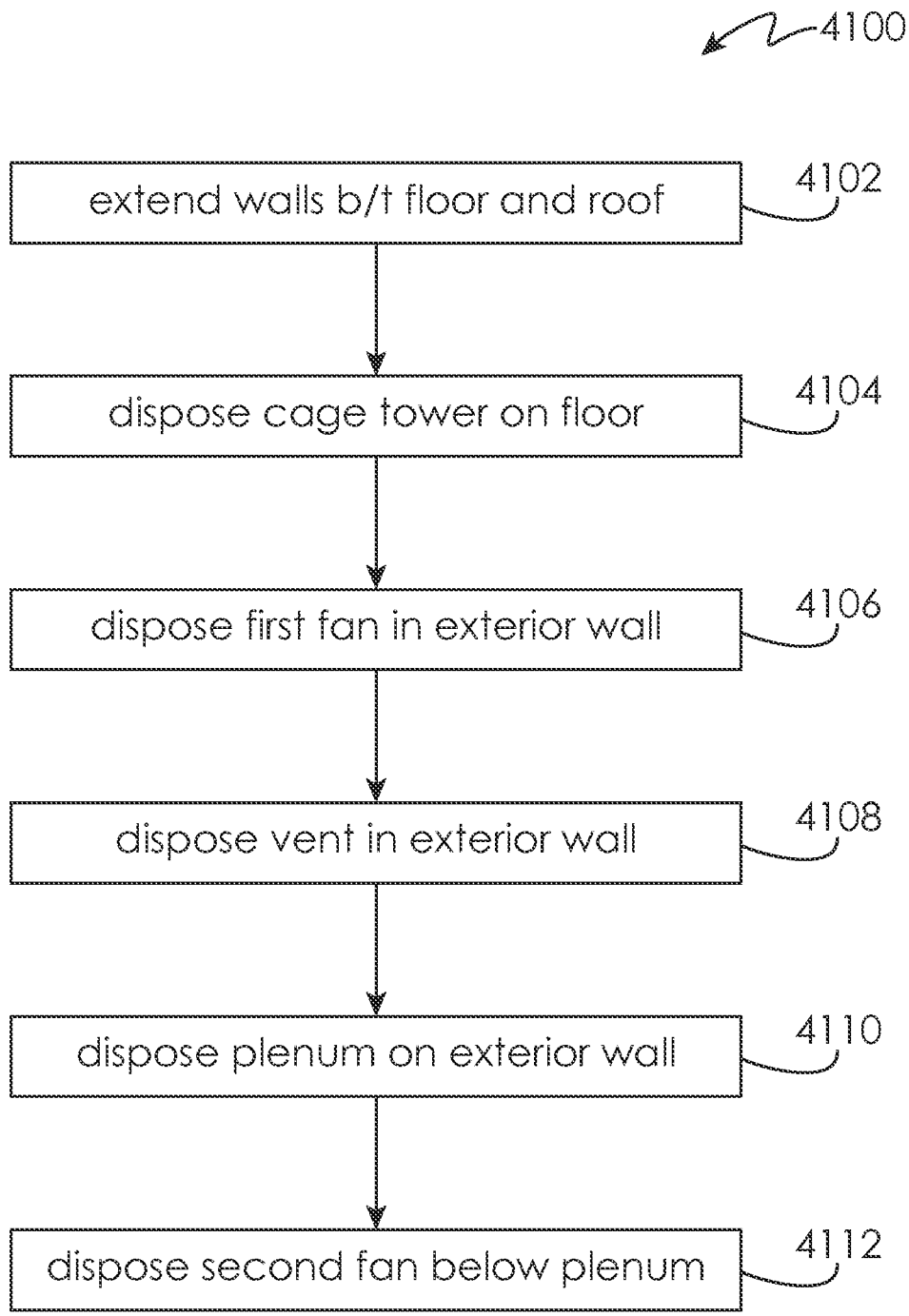
FIG. 31 illustrates a method for constructing a ventilation system in an aviary.

FIG. 31 illustrates a method 4100 of providing a ventilation system within an aviary, which aviary has at least one exterior wall, a floor, a roof, at least one first fan, and at least one plenum. The method 4100 includes disposing, at step 4102, the at least one exterior wall between the floor and the roof. In an exemplary embodiment, a front wall, a back wall, and at least two side walls are disposed between the floor and the roof. The method 4100 of an embodiment includes disposing, at step 4104, a cage tower on the floor. The at least one first fan is disposed in the at least one exterior wall, at step 4106. In an embodiment, the at least one first fan is disposed in the back wall. The method 4100 of an embodiment includes disposing, at step 4108, a vent in the at least one exterior wall. At least one plenum is disposed on at least one exterior wall, at step 4110. In an embodiment, at least one plenum is disposed on each of the at least two side walls. In an embodiment, at least one plenum may be disposed in the front wall. In an embodiment, at least one plenum may be disposed in the back wall. A plurality of plenums may be spaced along at least one exterior wall. At step 4112, at least one second fan is disposed in flow communication with the at least one plenum.

Figure 32:
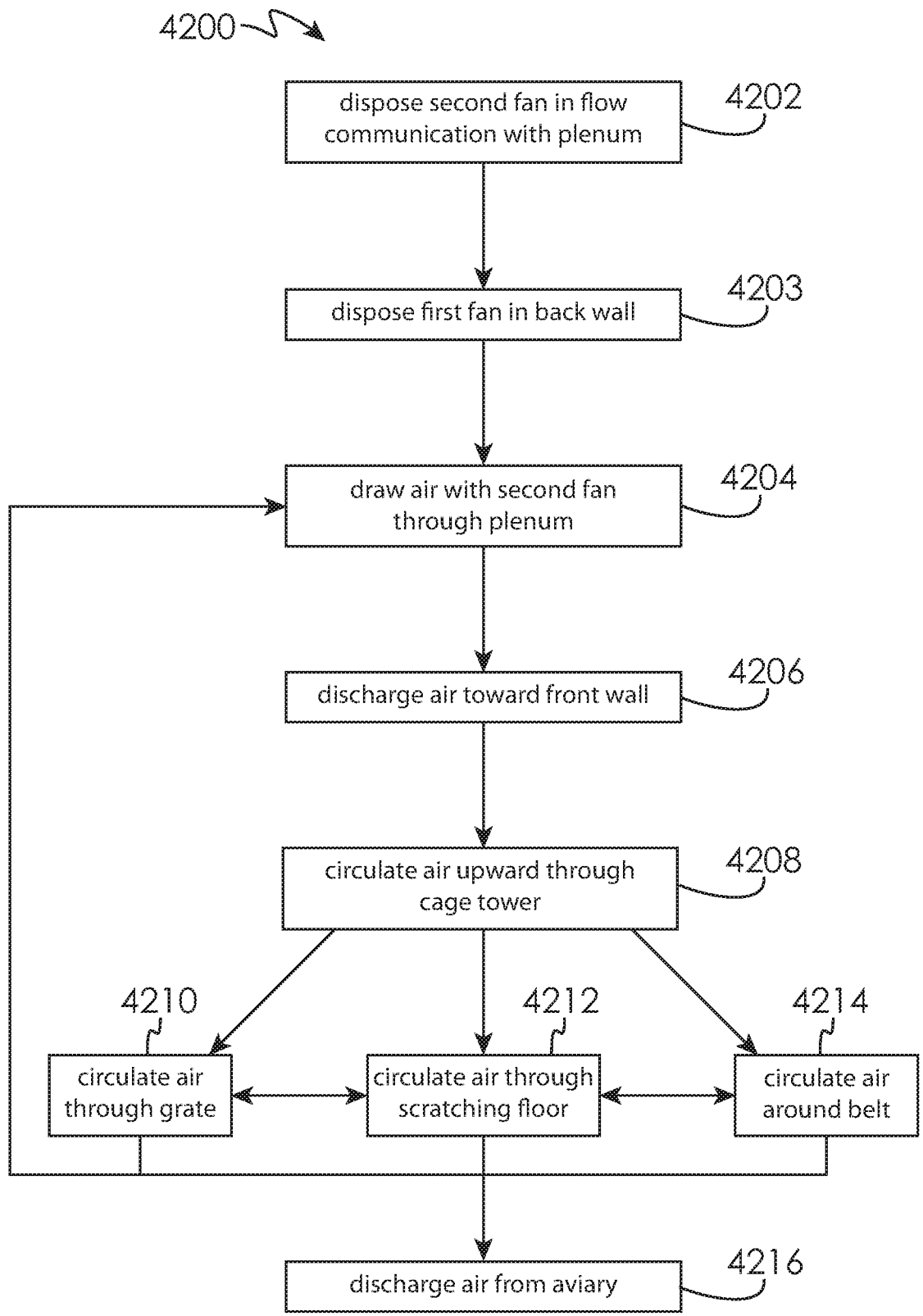
FIG. 32 illustrates a method for operating an aviary ventilation system.

FIG. 32 illustrates a method 4200 of operating a ventilation system in an aviary having at least one first fan, at least one second fan, at least one plenum having a top opening and a bottom opening, a front wall, a back wall, and at least one cage tower having at least one grate, at least one scratching floor, and at least one belt. At step 4202, the at least one second fan is disposed in flow communication with the at least one plenum. At step 4203, the at least one first fan is disposed in the back wall. In an embodiment, air is drawn by the at least one second fan, at step 4204, from the top opening of the at least one plenum to the bottom opening of the at least one plenum. The air is discharged, at step 4206, by the at least one second fan toward the front wall of the aviary. The air discharged at step 4206 hits the front wall and circulates through the at least one cage tower, at step 4208. In an embodiment, the air circulates through openings in the at least one grate of the at least one cage tower, at step 4210. In an embodiment, the air circulates through openings adjacent the scratching floor, at step 4212. In an embodiment, the air circulates around the at least one belt in the at least one cage tower, at step 4214. As the air reaches the top opening of the plenum, it may be drawn back through the plenum by repeating step 4204. In an embodiment, air near the back wall of the aviary may be discharged through the at least one first fan, at step 4216.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A ventilation system for an aviary including at least one exterior wall disposed between an aviary floor and a roof, wherein the at least one exterior wall, the floor, and the roof define an aviary interior, the ventilation system comprising:
  a cage tower disposed on the floor;
  a first fan disposed in one of the at least one exterior walls at a first level and operative to expel air out of the aviary interior;
  a plenum disposed on one of the at least one exterior walls, the plenum including a top opening located inside the aviary and a bottom opening located inside the aviary; and
  a second fan disposed in flow communication with the plenum to pull air from the plenum and positioned at a second level, the second level being lower than the first level, wherein air exits the second fan into the aviary interior; and
  a solid floor section extending between the cage tower and the one of the at least one exterior walls and positioned above the aviary floor, above the second fan, and below the first fan, the solid floor section extending only partially into the aviary interior from the one of the at least one exterior walls in which the first fan is disposed.

2. The system of claim 1, wherein the plenum is disposed on a side wall and further wherein the first fan is disposed in a back wall.

3. The system of claim 2 further comprising:
  a first plenum disposed on a first side wall; and
  a second plenum disposed on a second side wall.

4. The system of claim 1, wherein the plenum is disposed on one of the at least one exterior walls so that the top opening of the plenum is positioned adjacent a top space adjacent the roof, and the bottom opening of the plenum is positioned adjacent a bottom space adjacent the floor.

5. The system of claim 1 further comprising a grate disposed within the at least one cage tower that permits air to pass through the grate when said air is circulating through the at least one cage tower.

6. The system of claim 1 further comprising a belt disposed within the at least one cage tower around which belt air passes when said air is circulating through the at least one cage tower.

7. The system of claim 1 wherein the plenum comprises a plurality of plenums spaced along one of the at least one exterior walls.

8. The system of claim 1, wherein openings are disposed between the solid floor section and the cage tower to facilitate airflow through the aviary.

* * * * *